(12) United States Patent
Fujisaki

(10) Patent No.: US 8,095,187 B1
(45) Date of Patent: *Jan. 10, 2012

(54) COMMUNICATION DEVICE

(76) Inventor: Iwao Fujisaki, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/848,109

(22) Filed: Jul. 31, 2010

Related U.S. Application Data

(63) Continuation of application No. 11/554,023, filed on Oct. 29, 2006, now Pat. No. 7,853,295, which is a continuation of application No. 10/236,355, filed on Sep. 6, 2002, now abandoned.

(60) Provisional application No. 60/329,964, filed on Oct. 18, 2001.

(51) Int. Cl.
*H04B 1/38* (2006.01)
*H04K 3/00* (2006.01)

(52) U.S. Cl. ............... 455/566; 455/456.1; 704/235; 704/246

(58) Field of Classification Search .......... 455/564, 455/566, 456.1; 704/209, 235, 246, 270; 379/88.01

See application file for complete search history.

(56) References Cited

U.S. PATENT DOCUMENTS

| 7,853,295 B1 * | 12/2010 | Fujisaki ............ 455/566 |
| 2003/0054830 A1 * | 3/2003 | Williams et al. ........ 455/456 |

* cited by examiner

*Primary Examiner* — Lee Nguyen

(57) ABSTRACT

The communication device which includes a multiple & simultaneous speech-to-text mode implementor which converts a 1st voice data to a 1st text data and a 2nd voice data to a 2nd text data, wherein the conversions are performed simultaneously, and the 1st text data and the 2nd text data are displayed on the display, wherein the 1st text data includes alphanumeric data indicated by the 1st voice and the 2nd text data includes alphanumeric data indicated by the 2nd voice, and a current location identifier which identifies the current geographic location of the communication device.

18 Claims, 80 Drawing Sheets

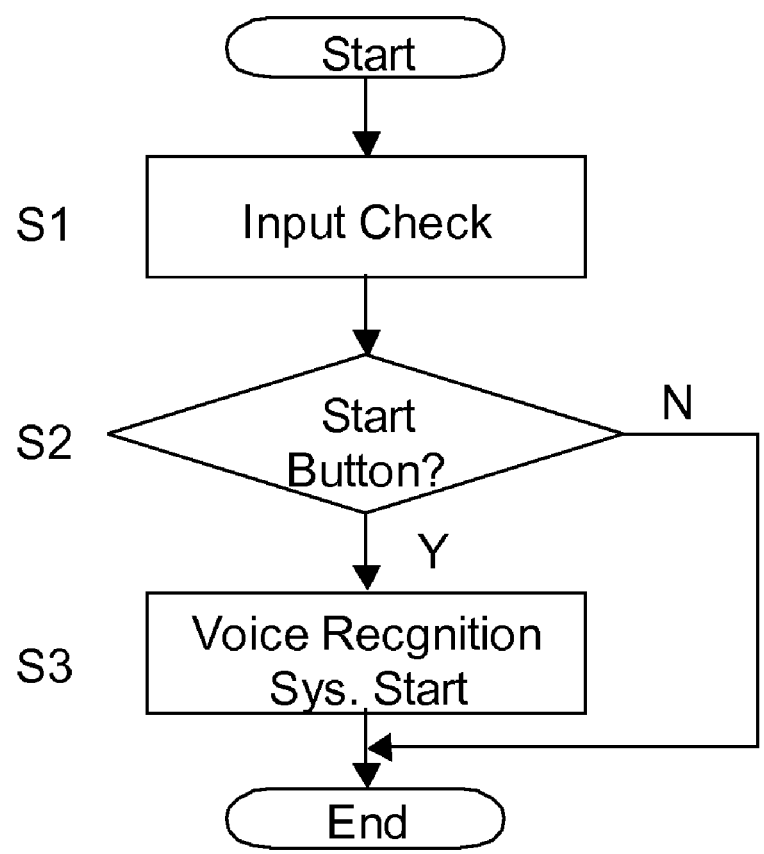

Table #1

| Audio Info #1 | Scott |
|---|---|
| Audio Info #2 | Carol |
| Audio Info #3 | Peter |
| Audio Info #4 | Amy |
| Audio Info #5 | Brian |

Fig. 8

Table #2

| Scott | (916) 411-2526 |
|---|---|
| Carol | (418) 675-6566 |
| Peter | (220) 890-1567 |
| Amy | (615) 125-3411 |
| Brian | (042) 645-2097 |

Fig. 9

Table #A

| Audio Info #1 | (916) 411-2526 |
|---|---|
| Audio Info #2 | (418) 675-6566 |
| Audio Info #3 | (220) 890-1567 |
| Audio Info #4 | (615) 125-3411 |
| Audio Info #5 | (042) 645-2097 |

Fig. 10

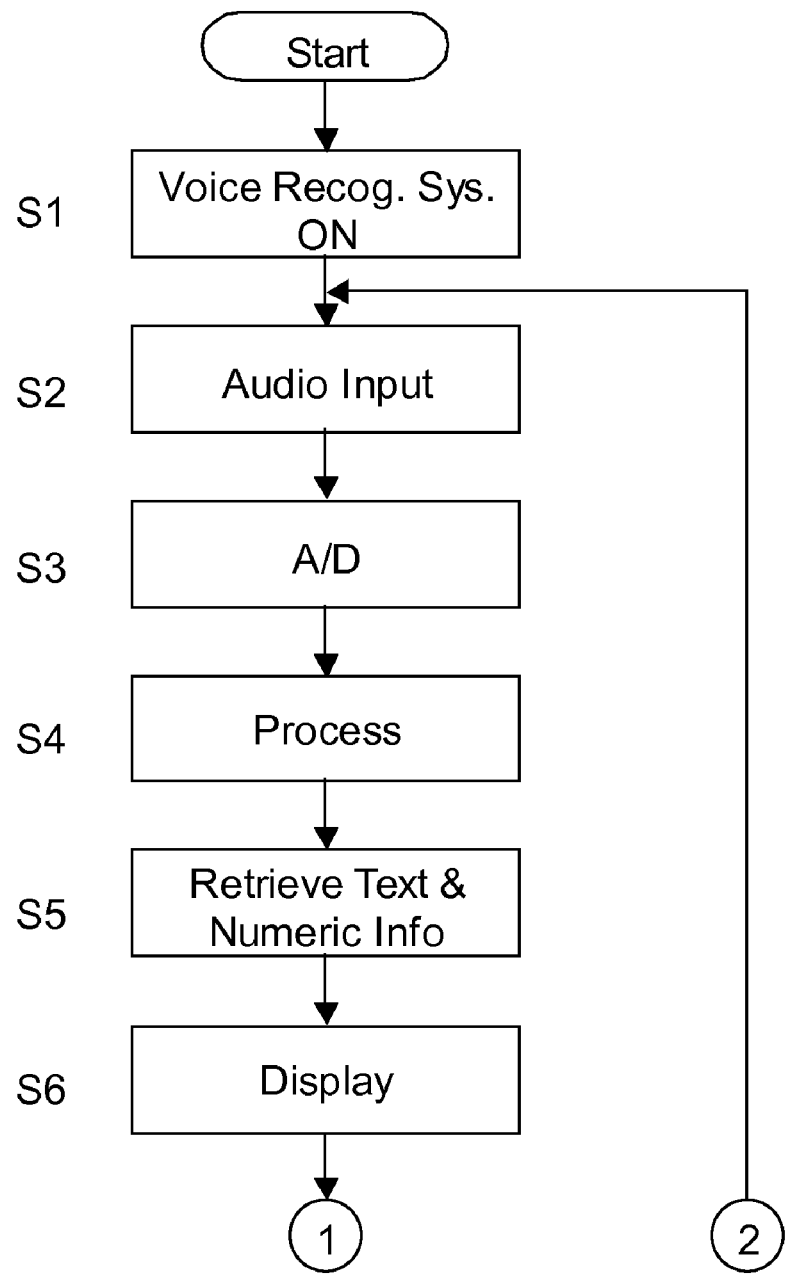

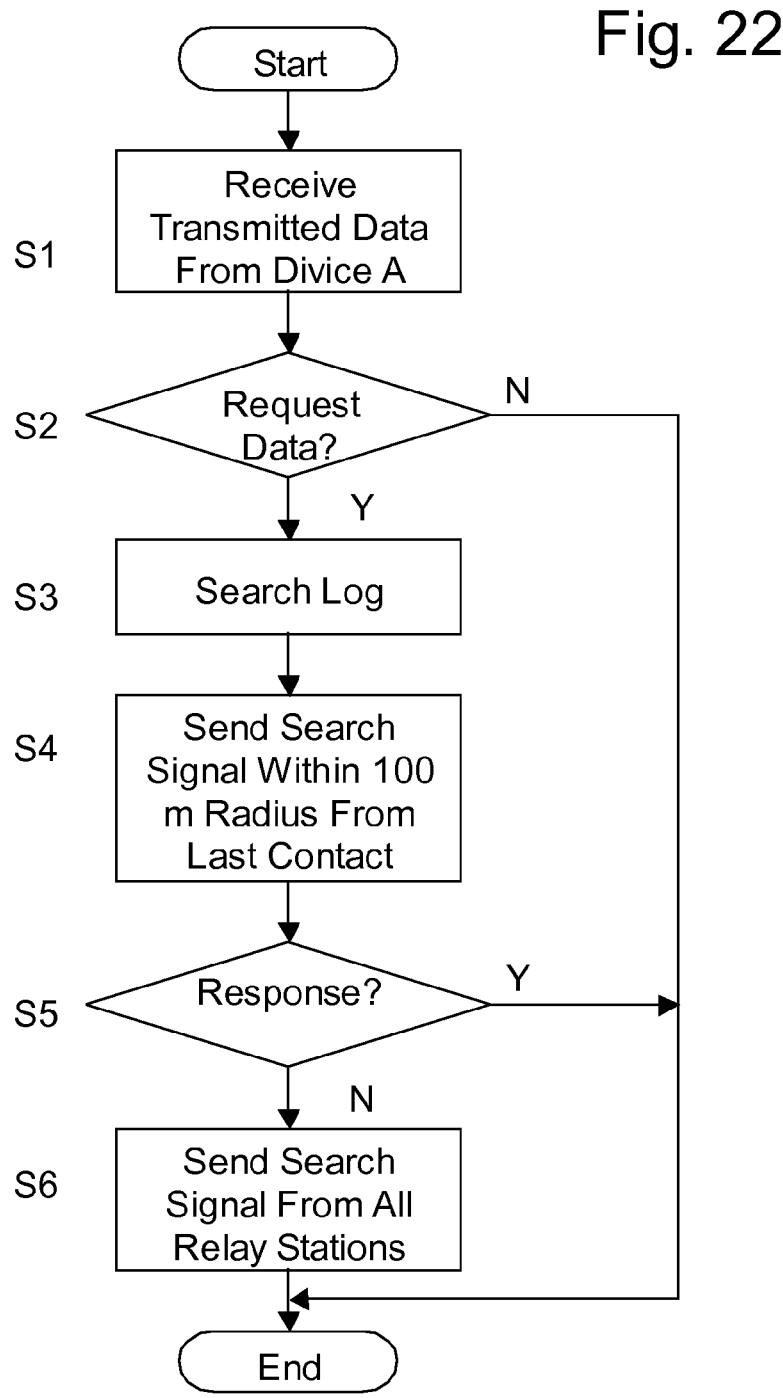

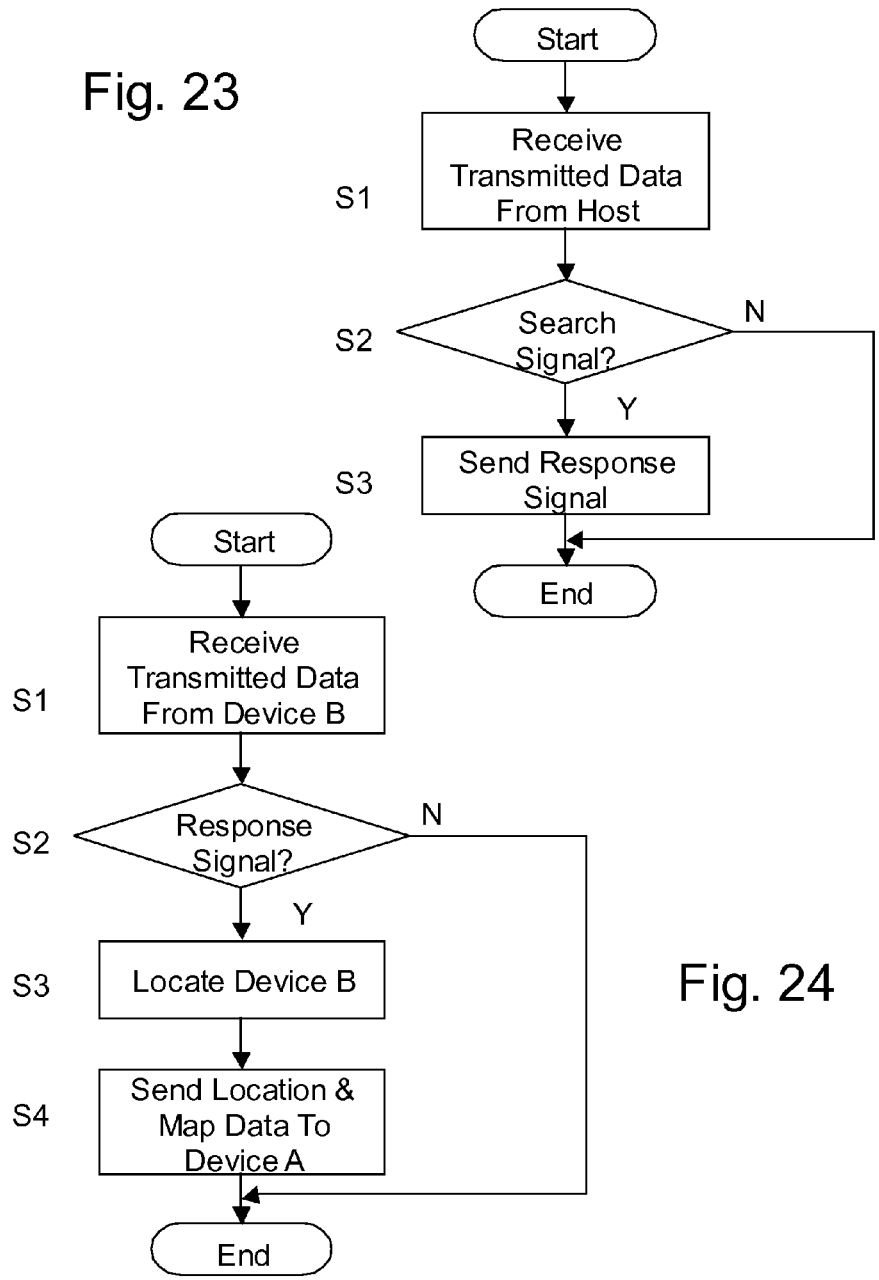

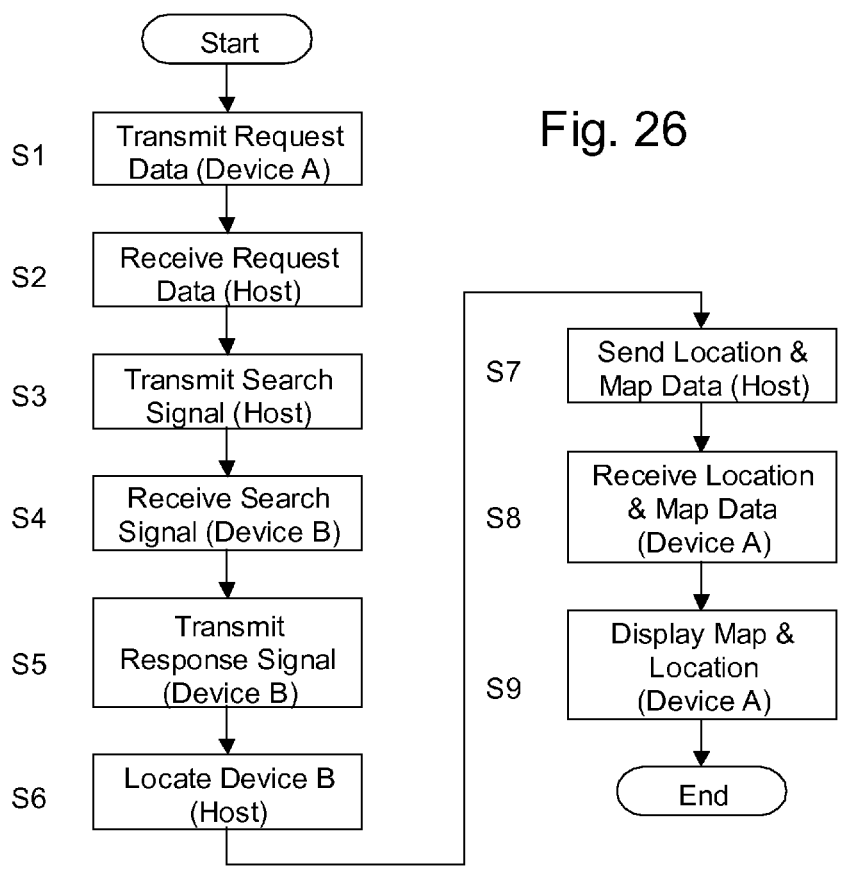

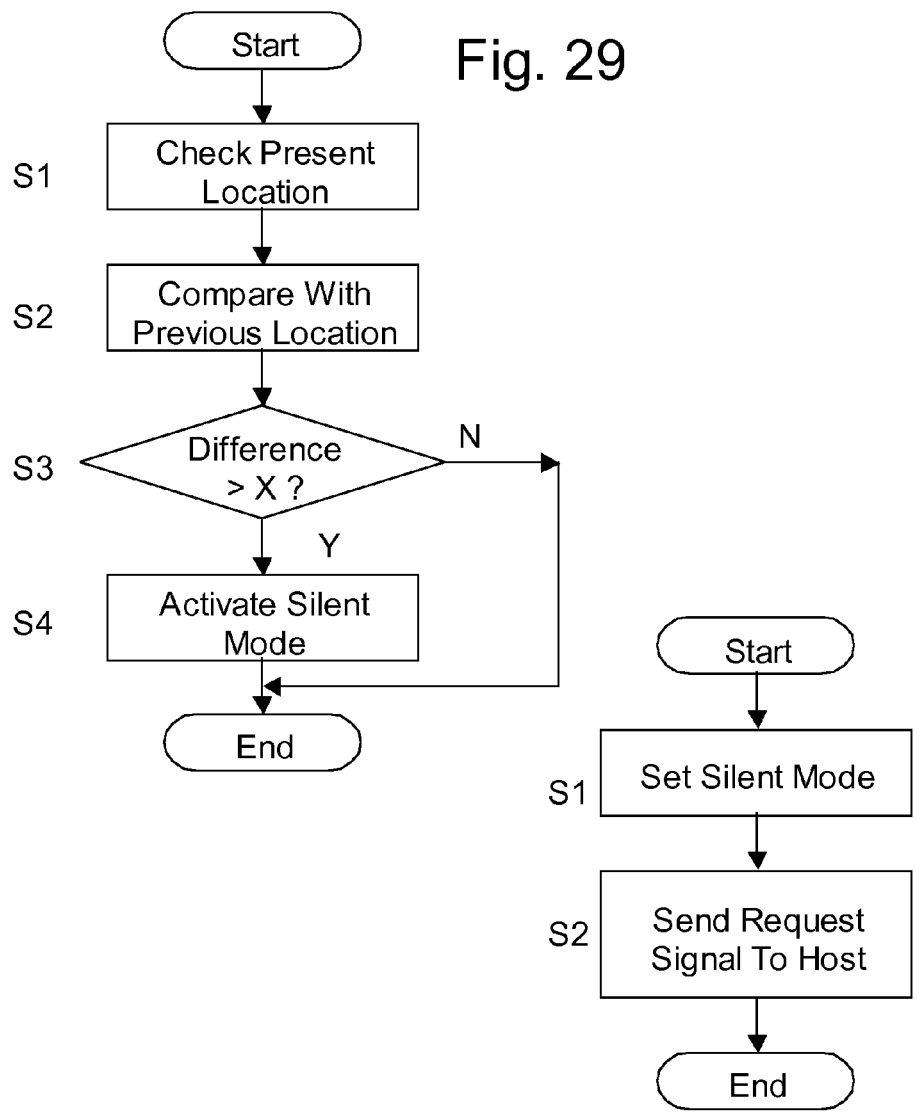

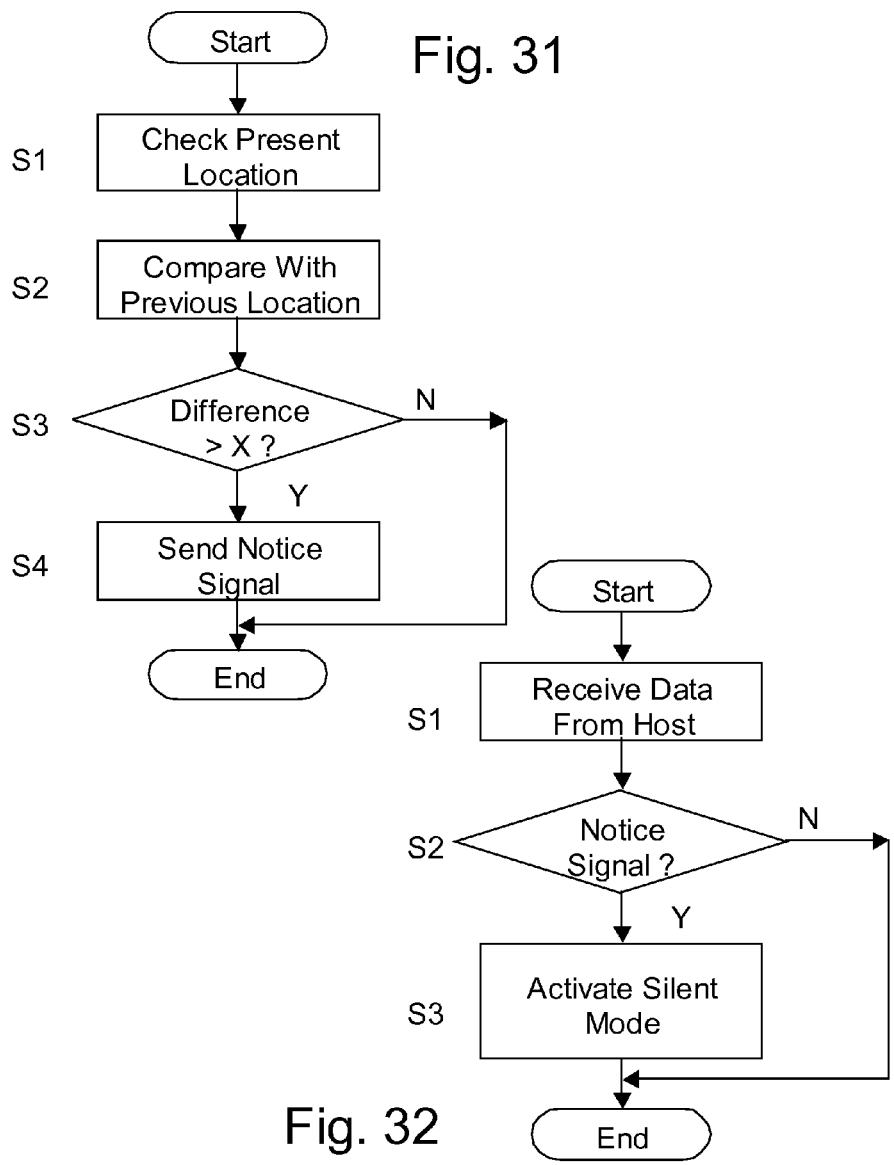

Fig. 32a
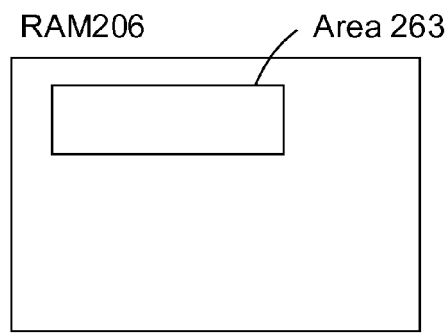
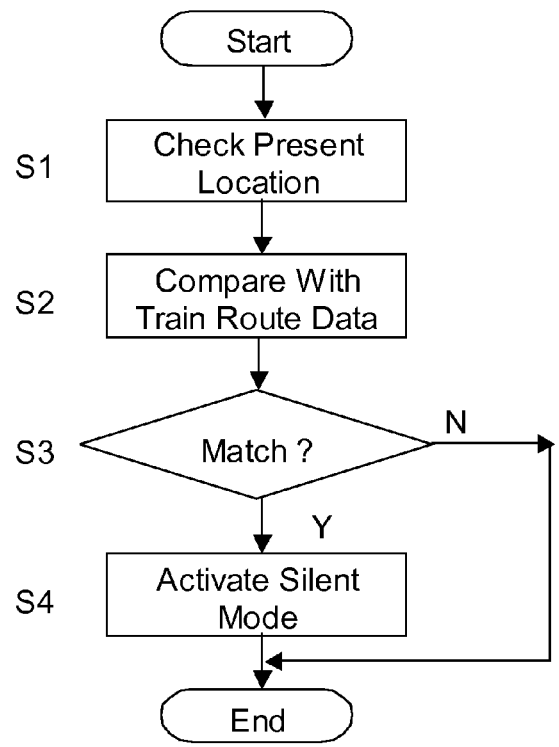
Fig. 32b

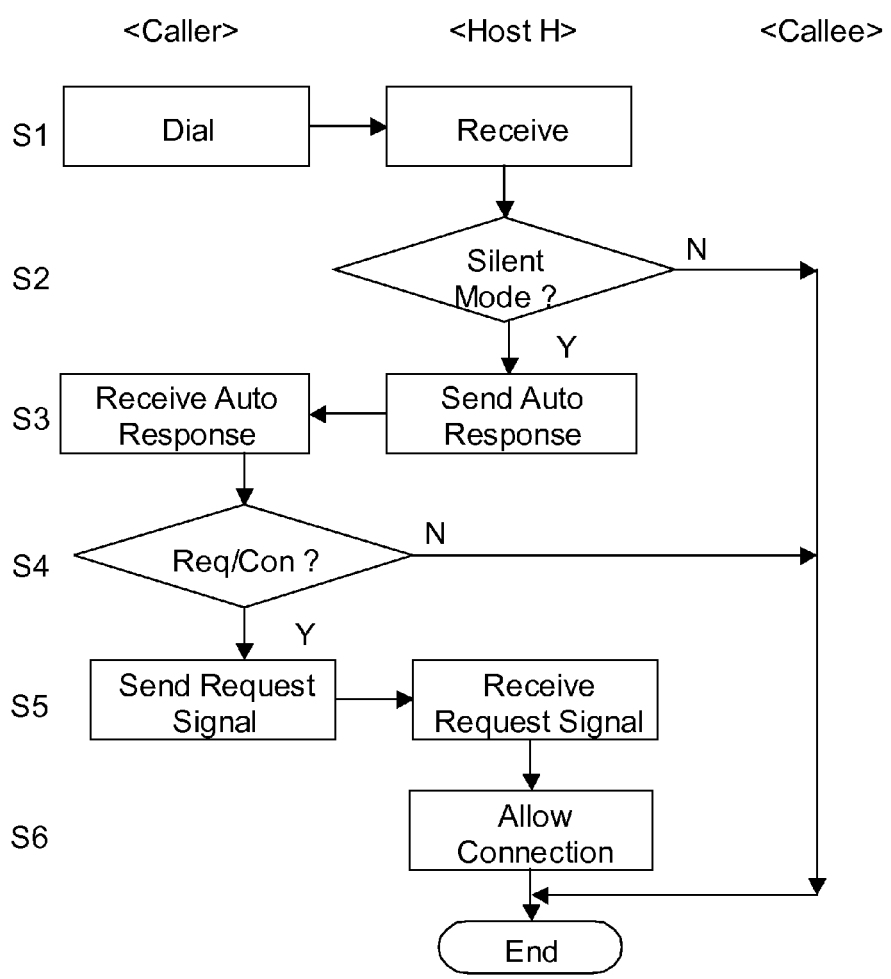

Transferred Data 601

Header 602   Device ID 603   Selected Data 604   Footer 605

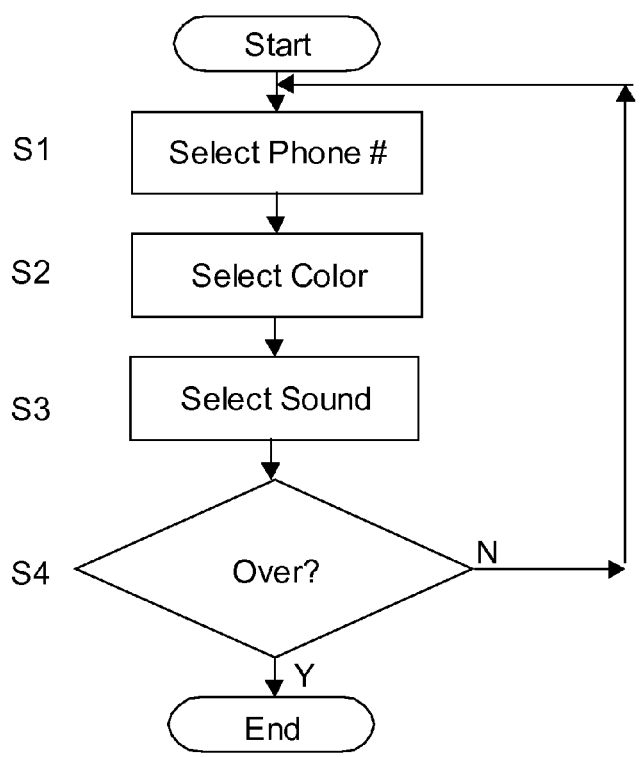

COMMUNICATION DEVICE

CROSS REFERENCE TO RELATED APPLICATIONS

The application is a continuation of U.S. Ser. No. 11/554,023, filed Oct. 29, 2006, which is a continuation of U.S. Ser. No. 10/236,355, filed Sep. 6, 2002, which claims the benefit of U.S. Provisional Application No. 60/329,964, filed Oct. 18, 2001, all of which are hereby incorporated herein by reference in their entirety.

FIELD OF THE INVENTION

The invention relates to communication device and more particularly to the communication device which has a capability to communicate with another communication device in a wireless fashion.

BACKGROUND OF THE INVENTION

U.S. Patent Publication No. 2002/0137470 is introduced as prior art of the present invention of which the summary is the following: "A method for multiple stage dialing using voice recognition (VR) includes the steps of receiving a first voice command that designates an entry in an address book; dialing a first portion of a dialing stream until a pause code is detected; receiving a second voice command; and dialing a second portion of the dialing stream in response to the second voice command. The first and second portions of the dialing stream may include a long distance carrier address and an access code, respectively. The third voice command may correspond to an entry name field of the further address book entry." However, the foregoing prior art does not disclose the communication device which includes a multiple & simultaneous speech-to-text mode implementor which converts a 1st voice data to a 1st text data and a 2nd voice data to a 2nd text data, wherein the conversions are performed simultaneously, and the 1st text data and the 2nd text data are displayed on the display, wherein the 1st text data includes alphanumeric data indicated by the 1st voice and the 2nd text data includes alphanumeric data indicated by the 2nd voice, and a current location identifier which identifies the current geographic location of the communication device.

SUMMARY OF THE INVENTION

It is an object of the present invention to provide more convenience to the user of the wireless communication device.

Still another object is to overcome the shortcomings associated with the prior art.

The present invention introduces the communication device which includes a multiple & simultaneous speech-to-text mode implementor which converts a 1st voice data to a 1st text data and a 2nd voice data to a 2nd text data, wherein the conversions are performed simultaneously, and the 1st text data and the 2nd text data are displayed on the display, wherein the 1st text data includes alphanumeric data indicated by the 1st voice and the 2nd text data includes alphanumeric data indicated by the 2nd voice, and a current location identifier which identifies the current geographic location of the communication device.

BRIEF DESCRIPTION OF THE DRAWINGS

The above and other aspects, features, and advantages of the invention will be better understood by reading the following more particular description of the invention, presented in conjunction with the following drawings, wherein:

FIG. 5 is a flowchart illustrating an exemplary embodiment of the present invention.

FIG. 8 is a simplified illustration illustrating an exemplary embodiment of the present invention.

FIG. 9 is a simplified illustration illustrating an exemplary embodiment of the present invention.

FIG. 10 is a simplified illustration illustrating an exemplary embodiment of the present invention.

FIG. 17a is a flowchart illustrating an exemplary embodiment of the present invention.

FIG. 22 is a flowchart illustrating an exemplary embodiment of the present invention.

FIG. 23 is a flowchart illustrating an exemplary embodiment of the present invention.

FIG. 24 is a flowchart illustrating an exemplary embodiment of the present invention.

FIG. 26 is a flowchart illustrating an exemplary embodiment of the present invention.

FIG. 29 is a flowchart illustrating an exemplary embodiment of the present invention.

FIG. 30 is a flowchart illustrating an exemplary embodiment of the present invention.

FIG. 31 is a flowchart illustrating an exemplary embodiment of the present invention.

FIG. 32 is a flowchart illustrating an exemplary embodiment of the present invention.

FIG. 32a is a block diagram illustrating an exemplary embodiment of the present invention.

FIG. 32b is a flowchart illustrating an exemplary embodiment of the present invention.

FIG. 32d is a flowchart illustrating an exemplary embodiment of the present invention.

FIG. 45 is a block diagram illustrating an exemplary embodiment of the present invention.

FIG. 46 is a flowchart illustrating an exemplary embodiment of the present invention.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. For example, each description of random access memory in this specification illustrates only one function or mode in order to avoid complexity in its explanation, however, such description does not mean that only one function or mode can be implemented at a time. In other words, more than one function or mode can be implemented simultaneously by way of utilizing the same random access memory. In addition, the figure numbers are cited after the elements in parenthesis in a manner for example "RAM 206 (FIG. 1)". It is done so merely to assist the readers to have a better understanding of this specification, and must not be used to limit the scope of the claims in any manner since the figure numbers cited are not exclusive. The scope of the invention should be determined by referencing the appended claims.

Figure 1:
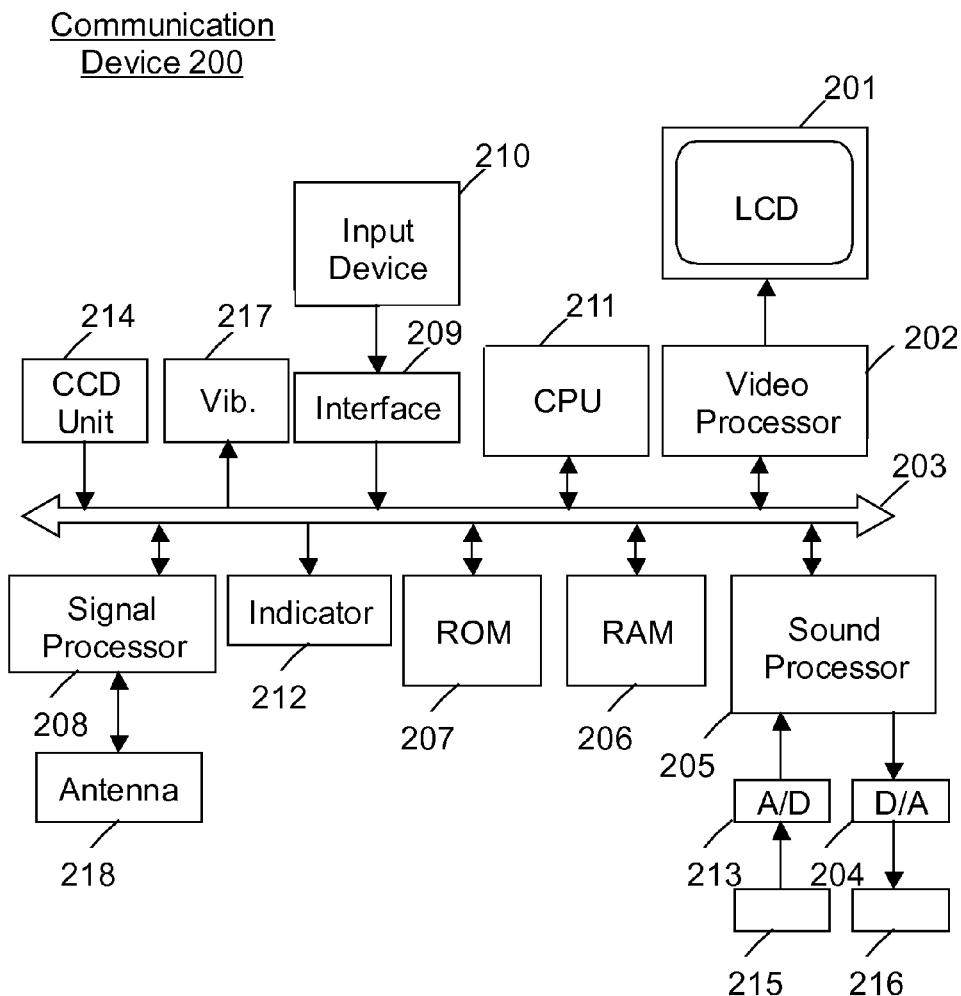
FIG. 1 is a block diagram illustrating an exemplary embodiment of the present invention.

FIG. 1 is a simplified block diagram of the communication device 200 utilized in the present invention. In FIG. 1 communication device 200 includes CPU 211 which controls and administers the overall function and operation of communication device 200. CPU 211 uses RAM 206 to temporarily store data and/or to perform calculation to perform its function, and to implement the present invention, modes, and functions explained hereinafter. Video processor 202 generates analog and/or digital video signals which are displayed on LCD 201. ROM 207 stores data and programs which are essential to operate communication device 200. Wireless signals are received by antenna 218 and processed by signal processor 208. Input signals are input by input device 210, such as dial pad, joy stick, and/or keypad, and the signal is transferred via input interface 209 and data bus 203 to CPU 211. Indicator 212 is an LED lamp which is designed to output different colors (e.g., red, blue, green, etc). Analog audio data is input to microphone 215. A/D 213 converts the analog audio data into a digital format. Speaker 216 outputs analog audio data which is converted into an analog format from digital format by D/A 204. Sound processor 205 produces digital audio signals that are transferred to D/A 204 and also processes the digital audio signals transferred from A/D 213. CCD unit 214 captures video image which is stored in RAM 206 in a digital format. Vibrator 217 vibrates the entire device by the command from CPU 211. For the avoidance of doubt, the definition of communication device 200 includes so-called "PDA".

Figure 2A:
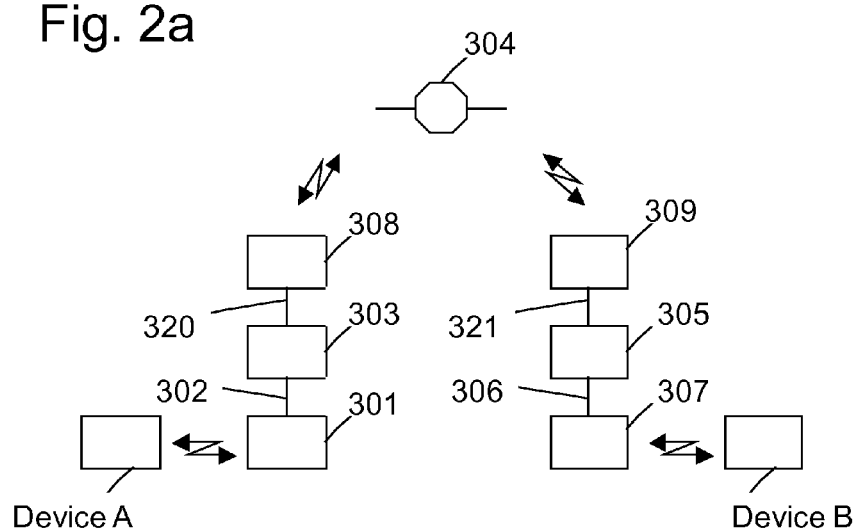
FIG. 2a is a simplified illustration illustrating an exemplary embodiment of the present invention.

FIG. 2a illustrates one of the preferred methods of the communication between two communication devices. In FIG. 2a, both device A and device B represents communication device 200 in FIG. 1. Device A transfers wireless data to transmitter 301 which relays the data to host H via cable 302. The data is transferred to transmitter 308 (e.g., a satellite dish) via cable 320 and then to artificial satellite 304. Artificial satellite 304 transfers the data to transmitter 309 which transfers the data to host H via cable 321. The data is then transferred to transmitter 307 via cable 306 and to device B in a wireless fashion. Device B transfers wireless data to device A in the same manner.

Figure 2B:
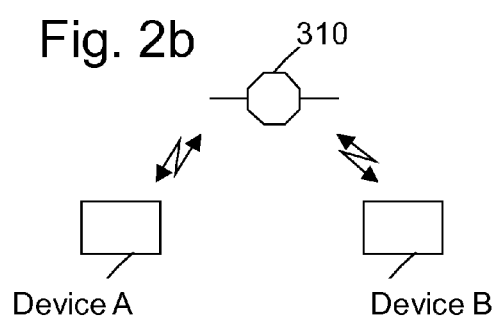
FIG. 2b is a simplified illustration illustrating an exemplary embodiment of the present invention.

FIG. 2b illustrates another preferred method of the communication between two communication devices. In this example, device A directly transfers the wireless data to host H, an artificial satellite, which transfers the data directly to device B. Device B transfers wireless data to device A in the same manner.

Figure 2C:
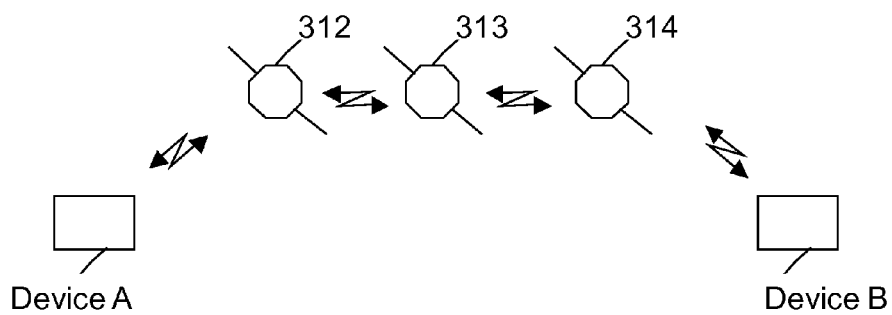
FIG. 2c is a simplified illustration illustrating an exemplary embodiment of the present invention.

FIG. 2c illustrates another preferred method of the communication between two communication devices. In this example, device A transfers wireless data to transmitter 312, an artificial satellite, which relays the data to host H, which is also an artificial satellite, in a wireless fashion. The data is transferred to transmitter 314, an artificial satellite, which relays the data to device B in a wireless fashion. Device B transfers wireless data to device A in the same manner.

<<Voice Recognition>>

Communication device 200 (FIG. 1) has a function to operate the device by the user's voice or convert the user's voice into a text format (i.e., the voice recognition). Such function can be enabled by the technologies primarily introduced in the following inventions and the references cited thereof: U.S. Pat. No. 6,282,268; U.S. Pat. No. 6,278,772; U.S. Pat. No. 06,269,335; U.S. Pat. No. 6,269,334; U.S. Pat. No. 6,260,015; U.S. Pat. No. 6,260,014; U.S. Pat. No. 6,253,177; U.S. Pat. No. 6,253,175; U.S. Pat. No. 6,249,763; U.S. Pat. No. 6,246,990; U.S. Pat. No. 6,233,560; U.S. Pat. No. 6,219,640; U.S. Pat. No. 6,219,407; U.S. Pat. No. 6,199,043; U.S. Pat. No. 6,199,041; U.S. Pat. No. 6,195,641; U.S. Pat. No. 6,192,343; U.S. Pat. No. 6,192,337; U.S. Pat. No. 6,188,976; U.S. Pat. No. 6,185,530; U.S. Pat. No. 6,185,529; U.S. Pat. No. 6,185,527; U.S. Pat. No. 6,182,037; U.S. Pat. No. 6,178,401; U.S. Pat. No. 6,175,820; U.S. Pat. No. 6,163,767; U.S. Pat. No. 6,157,910; U.S. Pat. No. 6,119,086; U.S. Pat. No. 6,119,085; U.S. Pat. No. 6,101,472; U.S. Pat. No. 6,100,882; U.S. Pat. No. 6,092,039; U.S. Pat. No. 6,088,669; U.S. Pat. No. 6,078,807; U.S. Pat. No. 6,075,534; U.S. Pat. No. 6,073,101; U.S. Pat. No. 6,073,096; U.S. Pat. No. 6,073,091; U.S. Pat. No. 6,067,517; U.S. Pat. No. 6,067,514; U.S. Pat. No. 6,061,646; U.S. Pat. No. 6,044,344; U.S. Pat. No. 6,041,300; U.S. Pat. No. 6,035,271; U.S. Pat. No. 6,006,183; U.S. Pat. No. 5,995,934; U.S. Pat. No. 5,974,383; U.S. Pat. No. 5,970,239; U.S. Pat. No. 5,963,905; U.S. Pat. No. 5,956,671; U.S. Pat. No. 5,953,701; U.S. Pat. No. 5,953,700; U.S. Pat. No. 5,937,385; U.S. Pat. No. 5,937,383; U.S. Pat. No. 5,933,475; U.S. Pat. No. 5,930,749; U.S. Pat. No. 5,909,667; U.S. Pat. No. 5,899,973; U.S. Pat. No. 5,895,447; U.S. Pat. No. 5,884,263; U.S. Pat. No. 5,878,117; U.S. Pat. No. 5,864,819; U.S. Pat. No. 5,848,163; U.S. Pat. No. 5,819,225; U.S. Pat. No. 5,805,832; U.S. Pat. No. 5,802,251; U.S. Pat. No. 5,799,278; U.S. Pat. No. 5,797,122; U.S. Pat. No. 5,787,394; U.S.

Pat. No. 5,768,603; U.S. Pat. No. 5,751,905; U.S. Pat. No. 5,729,656; U.S. Pat. No. 5,704,009; U.S. Pat. No. 5,671,328; U.S. Pat. No. 5,649,060; U.S. Pat. No. 5,615,299; U.S. Pat. No. 5,615,296; U.S. Pat. No. 5,544,277; U.S. Pat. No. 5,524,169; U.S. Pat. No. 5,522,011; U.S. Pat. No. 5,513,298; U.S. Pat. No. 5,502,791; U.S. Pat. No. 5,497,447; U.S. Pat. No. 5,477,451; U.S. Pat. No. 5,475,792; U.S. Pat. No. 5,465,317; U.S. Pat. No. 5,455,889; U.S. Pat. No. 5,440,663; U.S. Pat. No. 5,425,129; U.S. Pat. No. 5,353,377; U.S. Pat. No. 5,333,236; U.S. Pat. No. 5,313,531; U.S. Pat. No. 5,293,584; U.S. Pat. No. 5,293,451; U.S. Pat. No. 5,280,562; U.S. Pat. No. 5,278,942; U.S. Pat. No. 5,276,766; U.S. Pat. No. 5,267,345; U.S. Pat. No. 5,233,681; U.S. Pat. No. 5,222,146; U.S. Pat. No. 5,195,167; U.S. Pat. No. 5,182,773; U.S. Pat. No. 5,165,007; U.S. Pat. No. 5,129,001; U.S. Pat. No. 5,072,452; U.S. Pat. No. 5,067,166; U.S. Pat. No. 5,054,074; U.S. Pat. No. 5,050,215; U.S. Pat. No. 5,046,099; U.S. Pat. No. 5,033,087; U.S. Pat. No. 5,031,217; U.S. Pat. No. 5,018,201; U.S. Pat. No. 4,980,918; U.S. Pat. No. 4,977,599; U.S. Pat. No. 4,926,488; U.S. Pat. No. 4,914,704; U.S. Pat. No. 4,882,759; U.S. Pat. No. 4,876,720; U.S. Pat. No. 4,852,173; U.S. Pat. No. 4,833,712; U.S. Pat. No. 4,829,577; U.S. Pat. No. 4,827,521; U.S. Pat. No. 4,759,068; U.S. Pat. No. 4,748,670; U.S. Pat. No. 4,741,036; U.S. Pat. No. 4,718,094; U.S. Pat. No. 4,618,984; U.S. Pat. No. 4,348,553; U.S. Pat. No. 6,289,140; U.S. Pat. No. 6,275,803; U.S. Pat. No. 6,275,801; U.S. Pat. No. 6,272,146; U.S. Pat. No. 6,266,637; U.S. Pat. No. 6,266,571; U.S. Pat. No. 6,223,153; U.S. Pat. No. 6,219,638; U.S. Pat. No. 6,163,535; U.S. Pat. No. 6,115,820; U.S. Pat. No. 6,107,935; U.S. Pat. No. 6,092,034; U.S. Pat. No. 6,088,361; U.S. Pat. No. 6,073,103; U.S. Pat. No. 6,073,095; U.S. Pat. No. 6,067,084; U.S. Pat. No. 6,064,961; U.S. Pat. No. 6,055,306; U.S. Pat. No. 6,047,301; U.S. Pat. No. 6,023,678; U.S. Pat. No. 6,023,673; U.S. Pat. No. 6,009,392; U.S. Pat. No. 5,995,933; U.S. Pat. No. 5,995,931; U.S. Pat. No. 5,995,590; U.S. Pat. No. 5,991,723; U.S. Pat. No. 5,987,405; U.S. Pat. No. 5,974,382; U.S. Pat. No. 5,943,649; U.S. Pat. No. 5,916,302; U.S. Pat. No. 5,897,616; U.S. Pat. No. 5,897,614; U.S. Pat. No. 5,893,133; U.S. Pat. No. 5,873,064; U.S. Pat. No. 5,870,616; U.S. Pat. No. 5,864,805; U.S. Pat. No. 5,857,099; U.S. Pat. No. 5,809,471; U.S. Pat. No. 5,805,907; U.S. Pat. No. 5,799,273; U.S. Pat. No. 5,764,852; U.S. Pat. No. 5,715,469; U.S. Pat. No. 5,682,501; U.S. Pat. No. 5,680,509; U.S. Pat. No. 5,668,854; U.S. Pat. No. 5,664,097; U.S. Pat. No. 5,649,070; U.S. Pat. No. 5,640,487; U.S. Pat. No. 5,621,809; U.S. Pat. No. 5,577,249; U.S. Pat. No. 5,502,774; U.S. Pat. No. 5,471,521; U.S. Pat. No. 5,467,425; U.S. Pat. No. 5,444,617; U.S. Pat. No. 4,991,217; U.S. Pat. No. 4,817,158; U.S. Pat. No. 4,725,885; U.S. Pat. No. 4,528,659; U.S. Pat. No. 3,995,254; U.S. Pat. No. 3,969,700; U.S. Pat. No. 3,925,761; U.S. Pat. No. 3,770,892. The voice recognition function can be performed in terms of software by using area 261, the voice recognition working area, of RAM 206 (FIG. 1) which is specifically allocated to perform such function as described in FIG. 3, or can also be performed in terms of hardware circuit where such space is specifically allocated in area 282 of sound processor 205 (FIG. 1) for the voice recognition system as described in FIG. 4.

Figure 3:
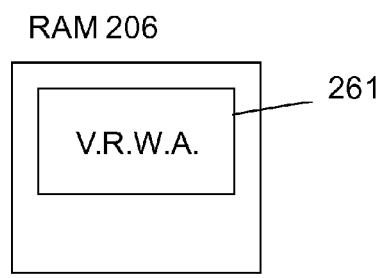
FIG. 3 is a block diagram illustrating an exemplary embodiment of the present invention.
Figure 4:
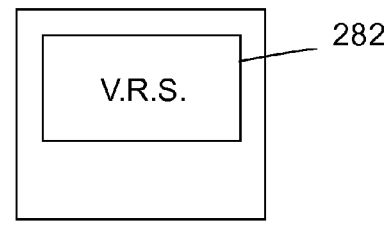
FIG. 4 is a block diagram illustrating an exemplary embodiment of the present invention.

FIG. 5 illustrates how the voice recognition function is activated. CPU 211 (FIG. 1) periodically checks the input status of input device 210 (FIG. 1) (S1). If the CPU 211 detects a specific signal input from input device 210 (S2) the voice recognition system which is described in FIG. 2 and/or FIG. 3 is activated. As another embodiment, the voice recognition system can also be activated by entering predetermined phrase, such as "start voice recognition system" via microphone 215 (FIG. 1).

<<Voice Recognition—Dialing/Auto-Off During Call>>

Figure 6A:
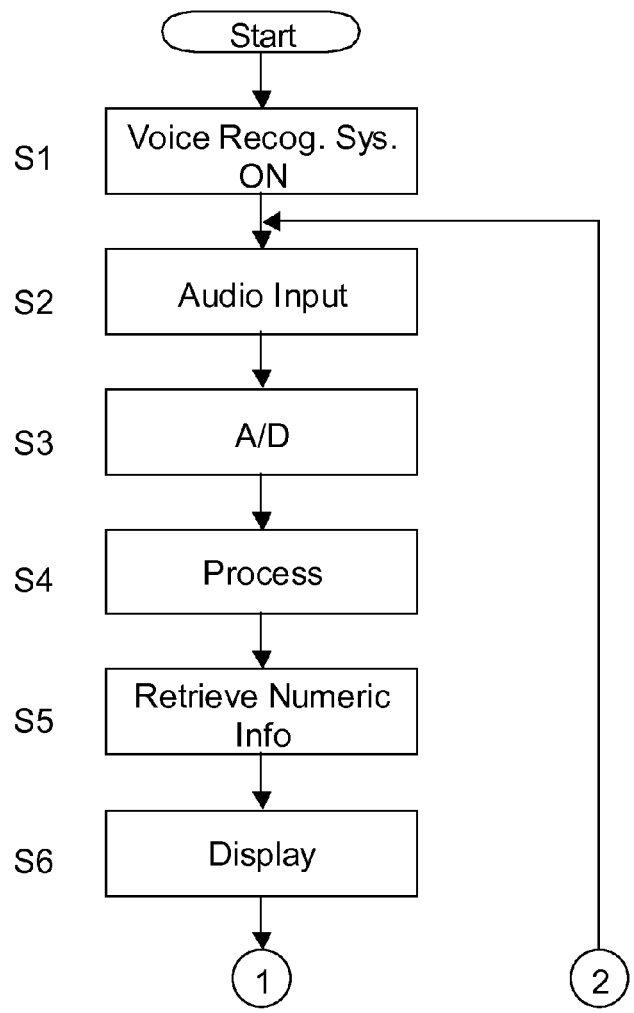
FIG. 6a is a flowchart illustrating an exemplary embodiment of the present invention.
Figure 6B:
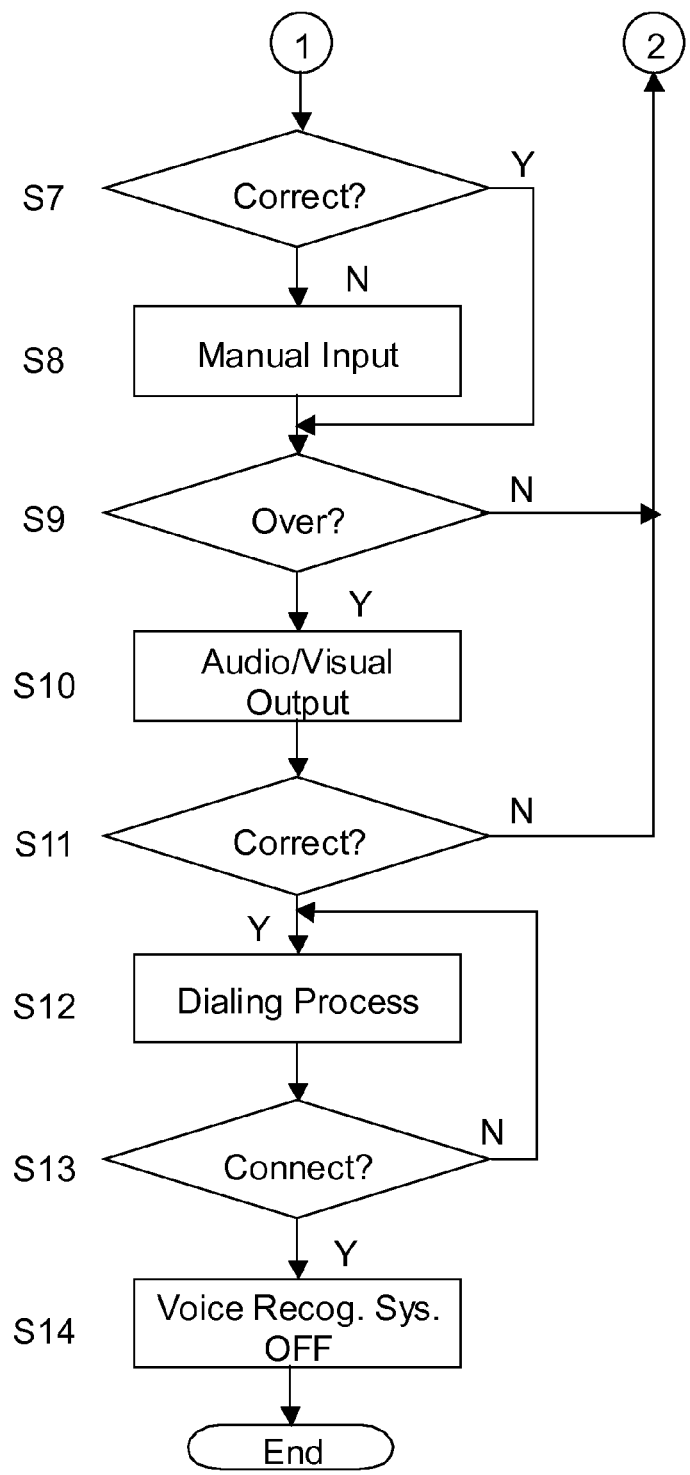
FIG. 6b is a flowchart illustrating an exemplary embodiment of the present invention.

FIG. 6a and FIG. 6b illustrate the operation of the voice recognition in the present invention. Once the voice recognition system is activated (S1) the analog audio data is input from microphone 215 (FIG. 1) (S2). The analog audio data is converted into digital data by A/D 213 (FIG. 1) (S3). The digital audio data is processed by sound processor 205 (FIG. 1) to retrieve the text and numeric information therefrom (S4). Then the numeric information is retrieved (S5) and displayed on LCD 201 (FIG. 1) (S6). If the retrieved numeric information is not correct (S7), the user can input the correct numeric information manually by using input device 210 (FIG. 1) (S8). Once the sequence of inputting the numeric information is completed and after the confirmation process is over (S9), the entire numeric information is displayed on LCD 201 and the sound is output from speaker 216 under control of CPU 211 (S10). If the numeric information is correct (S11), communication device 200 (FIG. 1) initiates the dialing process by utilizing the numeric information (S12). The dialing process continues until communication device 200 is connected to another device (S13). Once CPU 211 detects that the line is connected it automatically deactivates the voice recognition system (S14).

Figure 7:
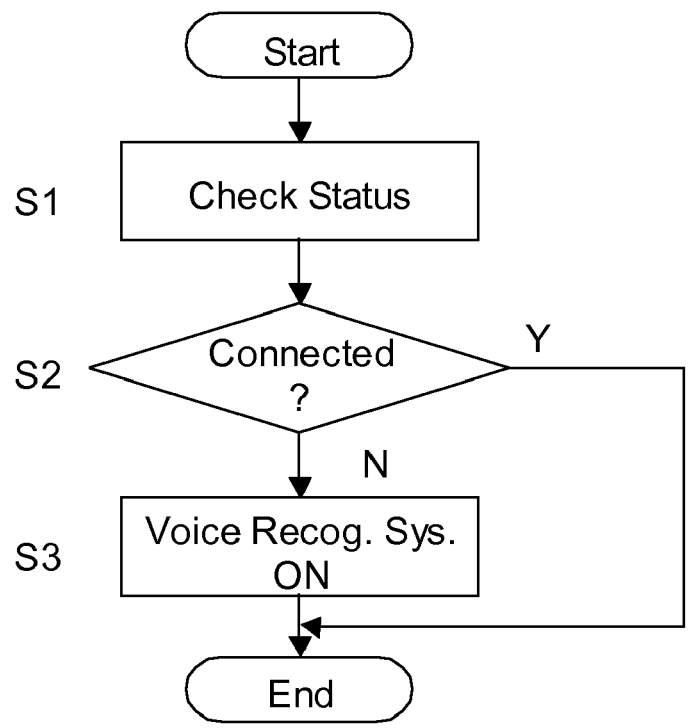
FIG. 7 is a flowchart illustrating an exemplary embodiment of the present invention.

As described in FIG. 7, CPU 211 (FIG. 1) checks the status of communication device 200 periodically (S1) and remains the voice recognition system offline during call (S2). If the connection is severed, i.e., user hangs up, then CPU 211 reactivates the voice recognition system (S3).

<<Voice Recognition—Tag>>

FIGS. 8 through 12 describes the method of inputting the numeric information in a convenient manner.

Figure 11:
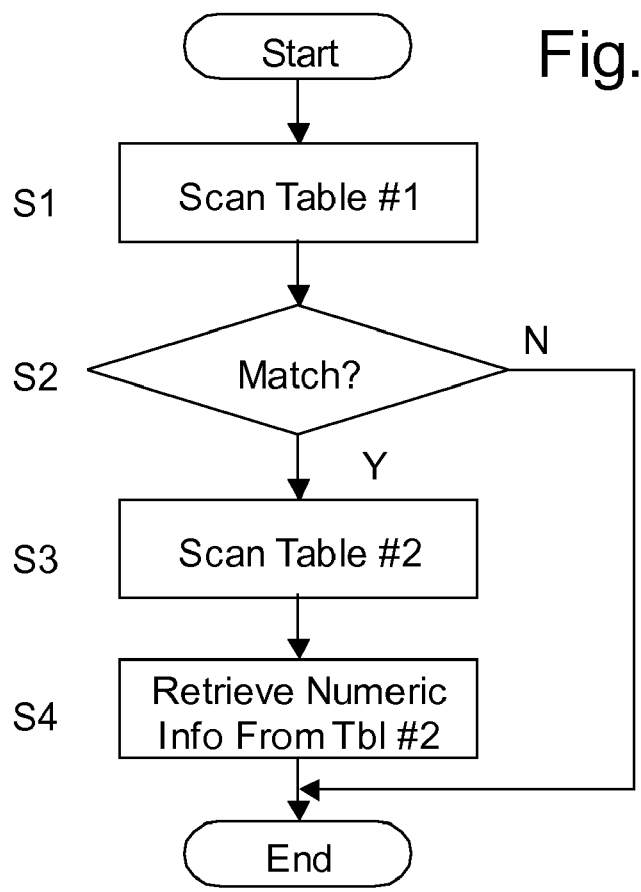
FIG. 11 is a flowchart illustrating an exemplary embodiment of the present invention.

As described in FIG. 8, RAM 206 includes Table #1 (FIG. 8) and Table #2 (FIG. 9). In FIG. 8, audio information #1 corresponds to tag "Scott." Namely audio information, such as wave data, which represents the sound of "Scott" (sounds like "S-ko-t") is registered in Table #1, which corresponds to tag "Scott". In the same manner audio information #2 corresponds to tag "Carol"; audio information #3 corresponds to tag "Peter"; audio information #4 corresponds to tag "Amy"; and audio information #5 corresponds to tag "Brian." In FIG. 9, tag "Scott" corresponds to numeric information "(916) 411-2526"; tag "Carol" corresponds to numeric information "(418) 675-6566"; tag "Peter" corresponds to numeric information "(220) 890-1567"; tag "Amy" corresponds to numeric information "(615) 125-3411"; and tag "Brian" corresponds to numeric information "(042) 645-2097." FIG. 11 illustrates how CPU 211 (FIG. 1) operates by utilizing both Table #1 and Table #2. Once the audio data is processed as described in S4 of FIG. 6, CPU 211 scans Table #1 (S1). If the retrieved audio data matches with one of the audio information registered in Table #1 (S2), CPU 211 scans Table #2 (S3) and retrieves the corresponding numeric information from Table #2 (S4).

Figure 12:
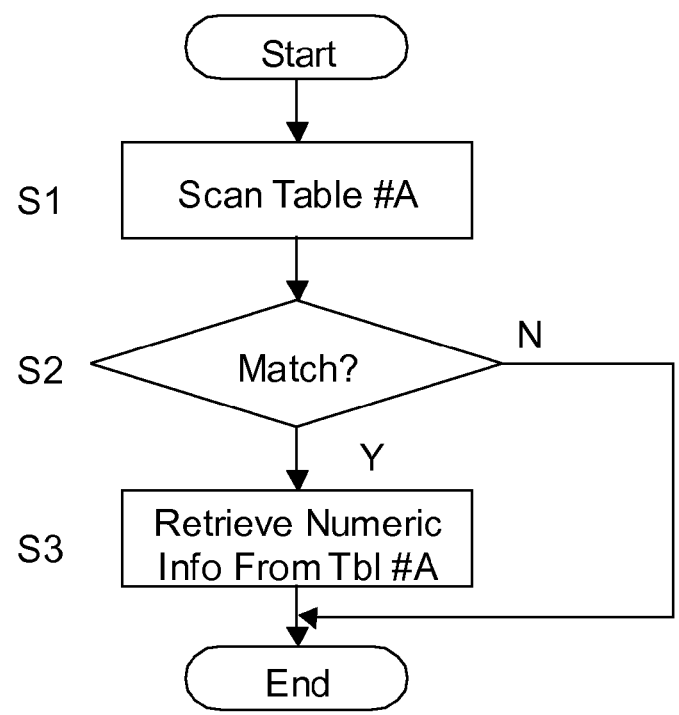
FIG. 12 is a flowchart illustrating an exemplary embodiment of the present invention.

FIG. 10 illustrates another embodiment of the present invention. Here, RAM 206 includes Table #A instead of Table #1 and Table #2 described above. In this embodiment, audio info #1 (i.e., wave data which represents the sound of "Scot") directly corresponds to numeric information "(916) 411-2526." In the same manner audio info #2 corresponds to numeric information "(410) 675-6566"; audio info #3 corresponds to numeric information "(220) 890-1567"; audio info #4 corresponds to numeric information "(615) 125-3411"; and audio info #5 corresponds to numeric information "(042) 645-2097." FIG. 12 illustrates how CPU 211 (FIG. 1) operates by utilizing Table #A. Once the audio data is processed as described in S4 of FIG. 6, CPU 211 scans Table #A (S1). If the retrieved audio data matches with one of the audio information registered in Table #A (S2), it retrieves the corresponding numeric information therefrom (S3).

As another embodiment, RAM 206 may contain only Table #2 and tag can be retrieved from the voice recognition system explained in FIGS. 3 through 7. Namely, once the audio data is processed by CPU 211 (FIG. 1) as described in S4 of FIG. 6 and retrieves the text data therefrom and detects one of the tags registered in Table #2 (e.g., "Scot"), CPU 211 retrieves the corresponding numeric information (e.g., "(916) 411-2526") from the same table.

<<Voice Recognition—Background Noise Filter>>

Figure 13:
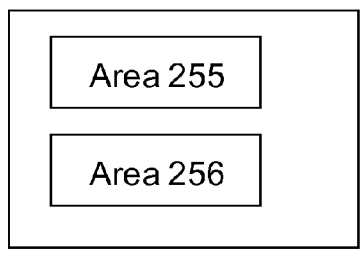
FIG. 13 is a block diagram illustrating an exemplary embodiment of the present invention.
Figure 14:
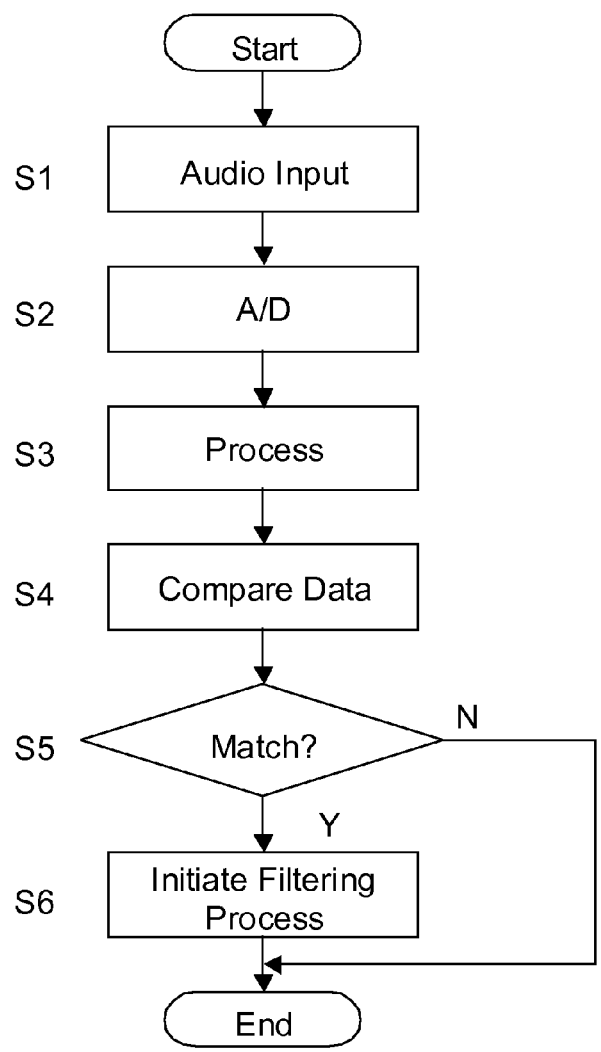
FIG. 14 is a flowchart illustrating an exemplary embodiment of the present invention.
Figure 15:
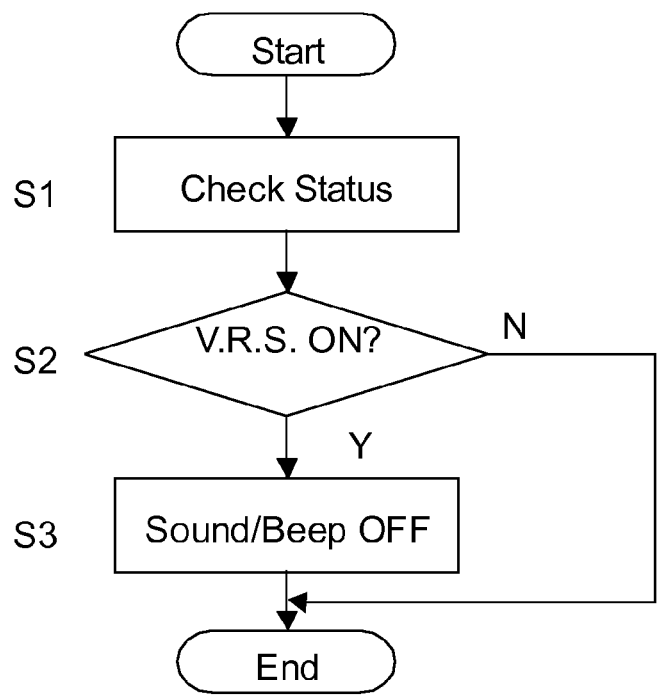
FIG. 15 is a flowchart illustrating an exemplary embodiment of the present invention.

FIGS. 13 through 15 describes the method of minimizing the undesired effect of the background noise when utilizing the voice recognition system.

As described in FIG. 13, RAM 206 (FIG. 1) includes area 255 and area 256. Sound audio data which represents background noise is stored in area 255, and sound audio data which represents the beep, ringing sound and other sounds which are emitted from the communication device 200 are stored in area 256.

FIG. 14 describes the method to utilize the data stored in area 255 and area 256 described in FIG. 13. When the voice recognition system is activated as described in FIG. 5, the analog audio data is input from microphone 215 (FIG. 1) (S1). The analog audio data is converted into digital data by A/D 213 (FIG. 1) (S2). The digital audio data is processed by sound processor 205 (FIG. 1) (S3) and compared to the data stored in area 255 and area 256 (S4). Such comparison can be done by either sound processor 205 or CPU 211 (FIG. 1). If the digital audio data matches to the data stored in area 255 and/or area 256, the filtering process is initiated and the matched portion of the digital audio data is deleted as background noise. Such sequence of process is done before retrieving text and numeric information from the digital audio data.

Figure 14A:
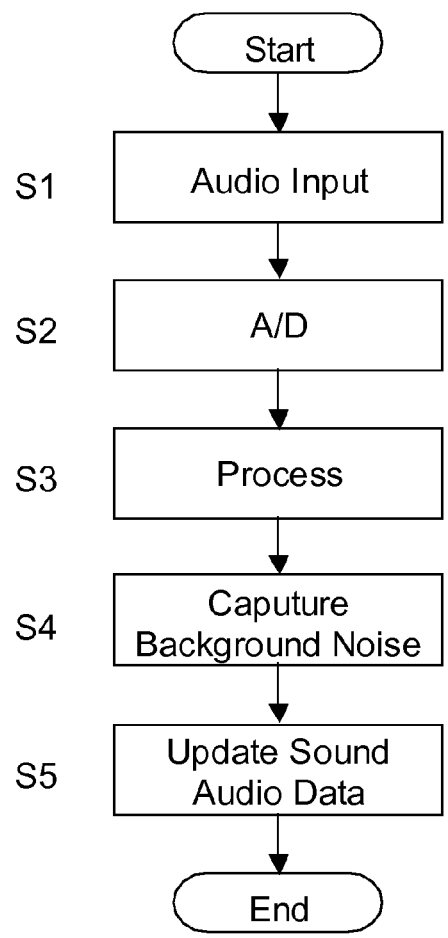
FIG. 14a is a flowchart illustrating an exemplary embodiment of the present invention.

FIG. 14a describes the method of updating area 255. When the voice recognition system is activated as described in FIG. 5, the analog audio data is input from microphone 215 (FIG. 1) (S1). The analog audio data is converted into digital data by A/D 213 (FIG. 1) (S2). The digital audio data is processed by sound processor 205 (FIG. 1) or CPU 211 (FIG. 1) (S3) and the background noise is captured (S4). CPU 211 (FIG. 1) scans area 255 and if the captured background noise is not registered in area 255, it updates the sound audio data stored therein (S5).

FIG. 15 describes another embodiment of the present invention. CPU 211 (FIG. 1) routinely checks whether the voice recognition system is activated (S1). If the system is activated (S2), the beep, ringing sound, and other sounds which are emitted from communication device 200 are automatically turned off in order to minimize the miss recognition process of the voice recognition system (S3).

<<Voice Recognition—Automatic Turn-Off>>

Figure 16:
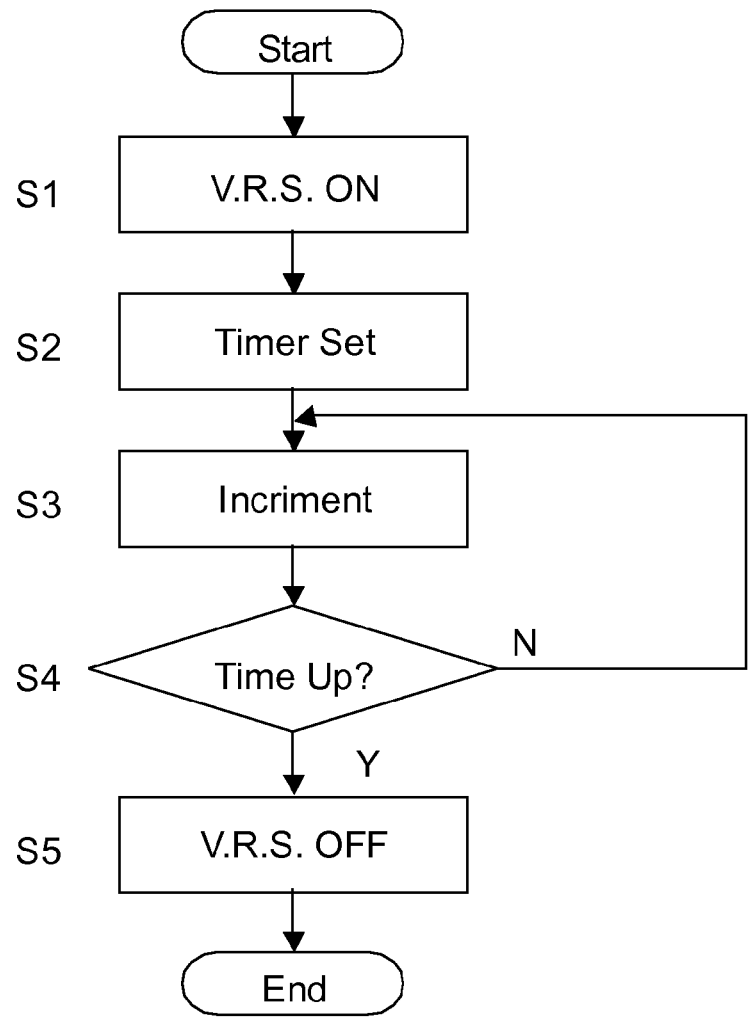
FIG. 16 is a flowchart illustrating an exemplary embodiment of the present invention.

The voice recognition system can be automatically turned off to avoid glitch as described in FIG. 16. When the voice recognition system is activated (S1), CPU 211 (FIG. 1) automatically sets a timer (S2). The value of timer (i.e., the length of time until the system is deactivated) can be set manually by the user. The timer is incremented periodically (S3), and if the incremented time equals to the predetermined value of time as set in S2 (S4), the voice recognition system is automatically deactivated (S5).

<<Voice Recognition—E-mail (1)>>

Figure 17B:
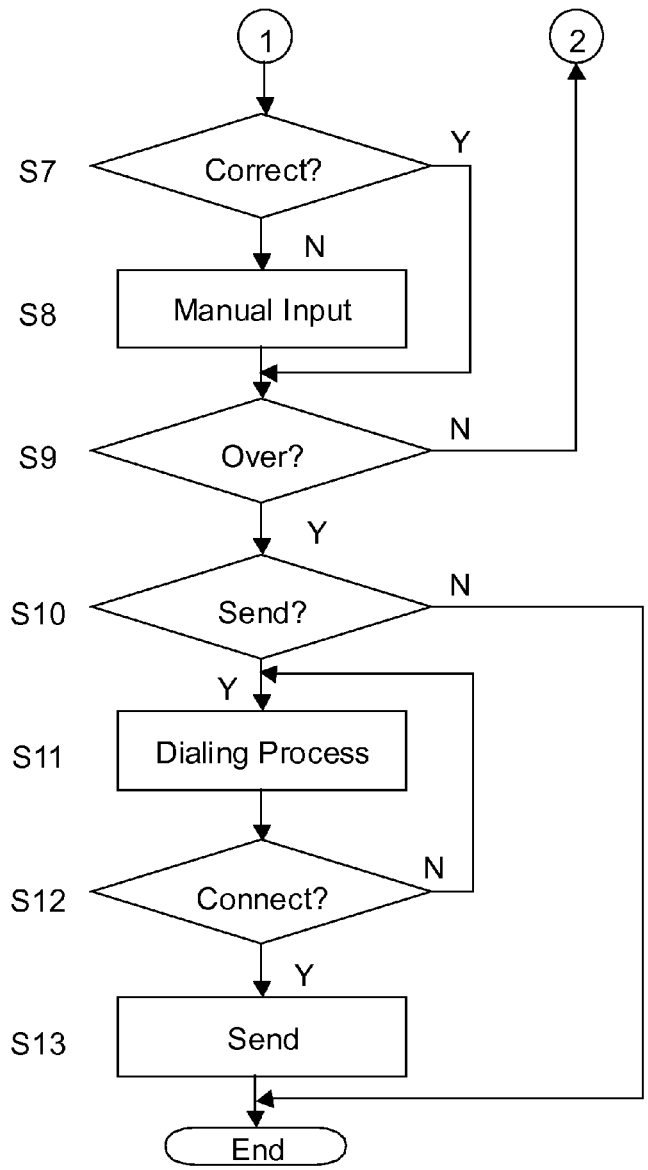
FIG. 17b is a flowchart illustrating an exemplary embodiment of the present invention.

FIGS. 17a and 17b illustrate the first embodiment of typing and sending e-mails by utilizing the voice recognition system. Once the voice recognition system is activated (S1), the analog audio data is input from microphone 215 (FIG. 1) (S2). The analog audio data is converted into digital data by A/D 213 (FIG. 1) (S3). The digital audio data is processed by sound processor 205 (FIG. 1) or CPU 211 (FIG. 1) to retrieve the text and numeric information therefrom (S4). The text and numeric information are retrieved (S5) and are displayed on LCD 201 (FIG. 1) (S6). If the retrieved information is not correct (S7), the user can input the correct text and/or numeric information manually by using the input device 210 (FIG. 1) (S8). If inputting the text and numeric information is completed (S9) and CPU 211 detects input signal from input device 210 to send the e-mail (S10), the dialing process is initiated (S11). The dialing process is repeated until communication device 200 is connected to host H (S12), and the e-mail is sent to the designated address (S13).

<<Voice Recognition—Speech-to-Text>>

Figure 18:
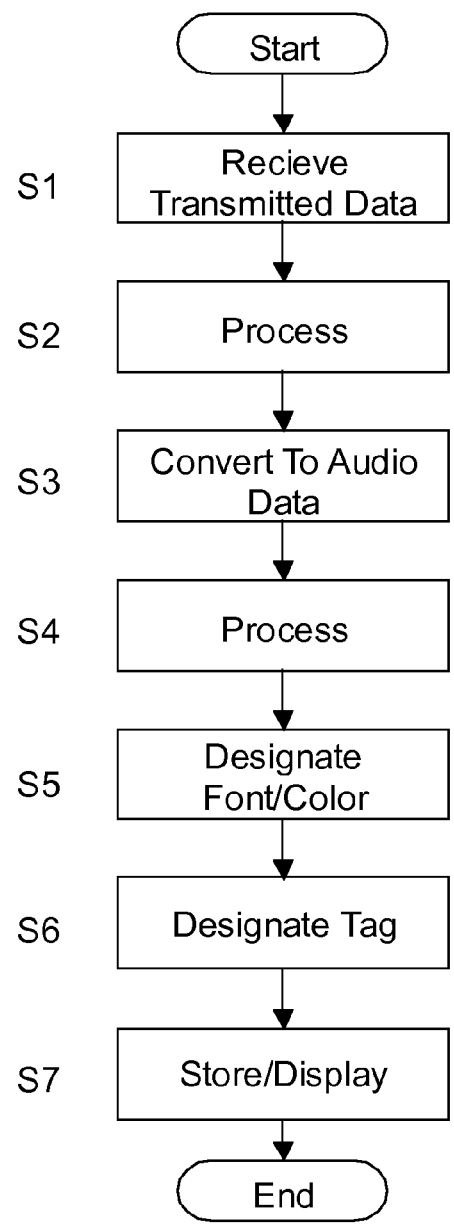
FIG. 18 is a flowchart illustrating an exemplary embodiment of the present invention.

FIG. 18 illustrates the speech-to-text function of communication device 200 (FIG. 1).

Once communication device 200 receives a transmitted data from another device via antenna 218 (FIG. 1) (S1), signal processor 208 (FIG. 1) processes the data (e.g., wireless signal error check and decompression) (S2), and the transmitted data is converted into digital audio data (S3). Such conversion can be rendered by either CPU 211 (FIG. 1) or signal processor 208. The digital audio data is transferred to sound processor 205 (FIG. 1) via data bus 203 and text and numeric information are retrieved therefrom (S4). CPU 211 designates the predetermined font and color to the text and numeric information (S5) and also designates a tag to such information (S6). After these tasks are completed the tag and the text and numeric information are stored in RAM 206 and displayed on LCD 201 (S7).

Figure 19:
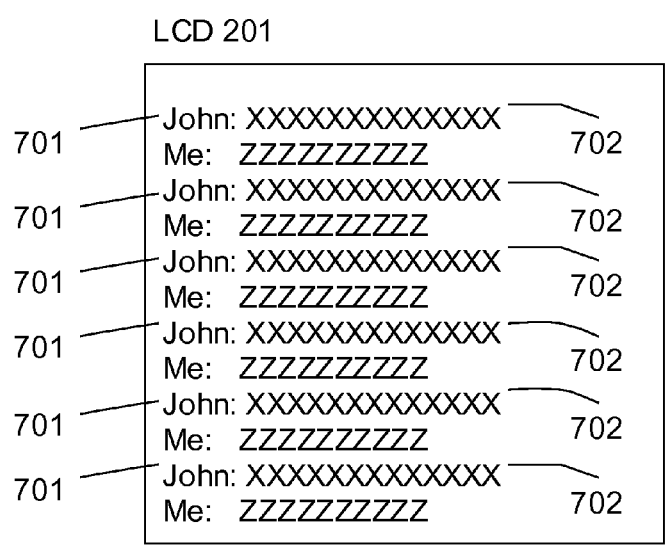
FIG. 19 is a simplified illustration illustrating an exemplary embodiment of the present invention.

FIG. 19 illustrates how the text and numeric information as well as the tag are displayed. On LCD 201 the text and numeric information 702 ("XXXXXXXXX") are displayed with the predetermined font and color as well as with the tag 701 ("John").

<<Voice Recognition—Summary>>

The foregoing inventions may be summarized as the following.

(1) A communication device which has a function to retrieve text and numeric information from a user's voice input from a microphone wherein said function is deactivated when said communication device is connected to another device in order to avoid undesired operation of said communication device.

(2) A communication device which has a function to retrieve text and numeric information from a user's voice input from a microphone wherein said communication device retrieves a numeric information from said user's voice and initiates a dialing process by utilizing said numeric information thereby enabling said user to initiate said dialing process only by his/her voice and/or by without physically contacting said communication device.

(3) A communication device which has a function to retrieve text and numeric information from a user's voice input from a microphone wherein said communication device retrieves audio information from which numeric information can not be retrieved from said user's voice and retrieves predetermined corresponding numeric information therefrom thereby enabling said user to initiate a dialing process in a convenient manner and without memorizing said numeric information or without referring to other sources for said information.

(4) A communication device which has a function to retrieve text and numeric information from a user's voice input from a microphone wherein said communication device compares audio information retrieved from said user's voice with pre-stored audio data and erases said audio data from said audio information before retrieving text and numeric information therefrom thereby enabling said function to be more accurate and minimizing error in retrieving said text and numeric information.

(5) A communication device which has a function to retrieve text and numeric information from a user's voice input from a microphone wherein said communication device retrieves text and numeric information from data transmitted from another device and displays said text and numeric information with predetermined font and color thereby enabling the user to visually confirm the content of conversation by way of observing the said text and numeric information displayed.

(6) A wireless communication device comprising a microphone, a display, an input device, an antenna, an alphanumeric data modification means and, a voice recognition system, wherein when said voice recognition system is activated and said wireless communication is in an email producing mode to produce an email, a series of audio data is input from said microphone and said voice recognition system converts said series of audio data into a first series of alphanumeric data which are displayed on said display, said first series of alphanumeric data are modified by said alphanumeric data modification means to a second series of alphanumeric data when said second series of alphanumeric data are input from said input device, said email including said second series of alphanumeric data is transmitted in a wireless manner from said antenna.

<<Positioning System>>

Figure 20A:
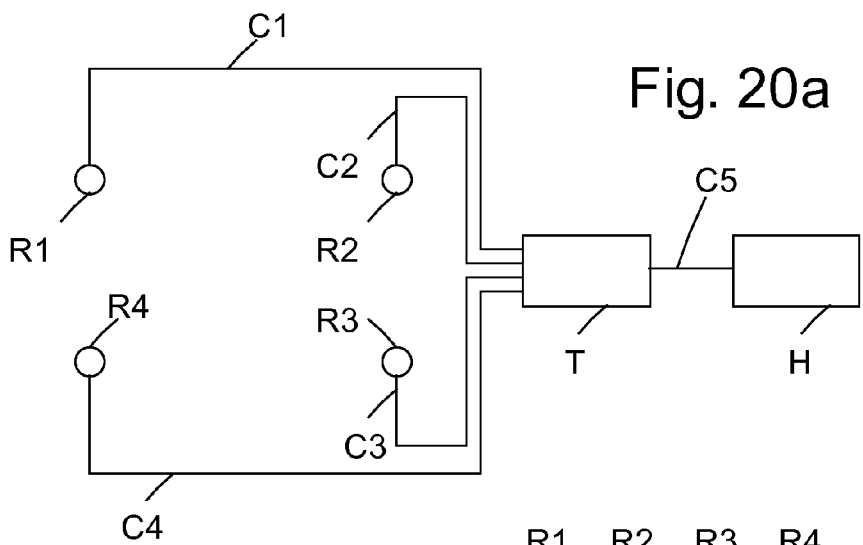
FIG. 20a is a simplified illustration illustrating an exemplary embodiment of the present invention.

FIG. 20a illustrates the simplified block diagram to detect the position of communication device 200 (FIG. 1).

Figure 20B:
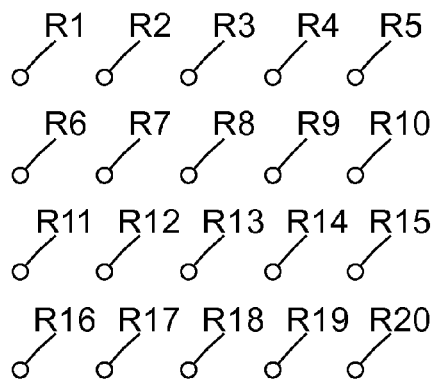
FIG. 20b is a simplified illustration illustrating an exemplary embodiment of the present invention.

In FIG. 20a, relay R1 is connected to cable C1, relay R2 is connected to cable C2, relay R3 is connected to cable C3, and relay R4 is connected to cable C4. Cables C1, C2, C3, and C4 are connected to transmitter T, which is connected to host H by cable C5. The relays (R1-R 20) are located throughout the predetermined area in the pattern illustrated in FIG. 20b. The system illustrated in FIG. 20a and FIG. 20b is designed to pin-point the position of communication device 200 by using the method so-called "global positioning system" or "GPS." Such function can be enabled by the technologies primarily introduced in the following inventions and the references cited thereof: U.S. Pat. No. 6,429,814; U.S. Pat. No. 6,427,121; U.S. Pat. No. 6,427,120; U.S. Pat. No. 6,424,826; U.S. Pat. No. 6,415,227; U.S. Pat. No. 6,415,154; U.S. Pat. No. 6,411,811; U.S. Pat. No. 6,392,591; U.S. Pat. No. 6,389,291; U.S. Pat. No. 6,369,751; U.S. Pat. No. 6,347,113; U.S. Pat. No. 6,324,473; U.S. Pat. No. 6,301,545; U.S. Pat. No. 6,297,770; U.S. Pat. No. 6,278,404; U.S. Pat. No. 6,275,771; U.S. Pat. No. 6,272,349; U.S. Pat. No. 6,266,012; U.S. Pat. No. 6,259,401; U.S. Pat. No. 6,243,647; U.S. Pat. No. 6,236,354; U.S. Pat. No. 6,233,094; U.S. Pat. No. 6,232,922; U.S. Pat. No. 6,211,822; U.S. Pat. No. 6,188,351; U.S. Pat. No. 6,182,927; U.S. Pat. No. 6,163,567; U.S. Pat. No. 6,101,430; U.S. Pat. No. 6,084,542; U.S. Pat. No. 5,971,552; U.S. Pat. No. 5,963,167; U.S. Pat. No. 5,944,770; U.S. Pat. No. 5,890,091; U.S. Pat. No. 5,841,399; U.S. Pat. No. 5,808,582; U.S. Pat. No. 5,777,578; U.S. Pat. No. 5,774,831; U.S. Pat. No. 5,764,184; U.S. Pat. No. 5,757,786; U.S. Pat. No. 5,736,961; U.S. Pat. No. 5,736,960; U.S. Pat. No. 5,594,454; U.S. Pat. No. 5,585,800; U.S. Pat. No. 5,554,994; U.S. Pat. No. 5,535,278; U.S. Pat. No. 5,534,875; U.S. Pat. No. 5,519,620; U.S. Pat. No. 5,506,588; U.S. Pat. No. 5,446,465; U.S. Pat. No. 5,434,574; U.S. Pat. No. 5,402,441; U.S. Pat. No. 5,373,531; U.S. Pat. No. 5,349,531; U.S. Pat. No. 5,347,286; U.S. Pat. No. 5,341,301; U.S. Pat. No. 5,339,246; U.S. Pat. No. 5,293,170; U.S. Pat. No. 5,225,842; U.S. Pat. No. 5,223,843; U.S. Pat. No. 5,210,540; U.S. Pat. No. 5,193,064; U.S. Pat. No. 5,187,485; U.S. Pat. No. 5,175,557; U.S. Pat. No. 5,148,452; U.S. Pat. No. 5,134,407; U.S. Pat. No. 4,928,107; U.S. Pat. No. 4,928,106; U.S. Pat. No. 4,785,463; U.S. Pat. No. 4,754,465; U.S. Pat. No. 4,622,557; and U.S. Pat. No. 4,457,006. The relays R1-R20 are preferably located on ground, however, are also permitted to be installed in artificial satellites as described in the foregoing patents and the references cited thereof in order to cover wider geographical range. In addition, host H may be carried by an artificial satellite and utilize the formation as described in FIGS. 2a, 2b, and 2c.

FIGS. 21 through 26 illustrate how the positioning system is performed. Assuming that device A, communication device 200, seeks to detect the position of device B, another communication device 200, which is located somewhere in the matrix of relays illustrated in FIG. 20b.

Figure 21:
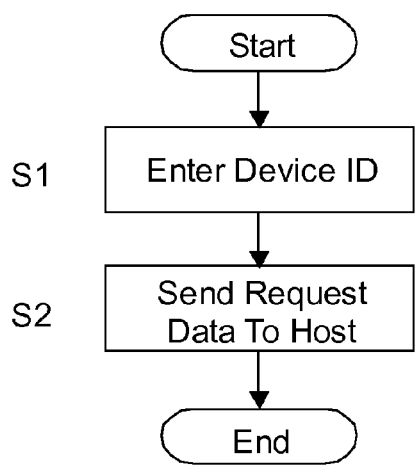
FIG. 21 is a flowchart illustrating an exemplary embodiment of the present invention.

As described in FIG. 21, first of all the device ID of device B is entered by utilizing input device 210 (FIG. 1) or the voice recognition system of device A installed therein (S1). The device ID may be its corresponding phone number. A request data including the device ID is sent to host H (FIG. 20a) from device A (S2).

As illustrated in FIG. 22, host H (FIG. 20a) periodically receives data from device A (S1). If the received data is a request data (S2), host H first of all searches its communication log which records the location of device B when it last communicated with host H (S3). Then host H sends search signal from the relays described in FIG. 20b which are located within 100 meter radius from the location registered in the communication log. If there is no response from Device B (S5), host H sends a search signal from all relays (from R1 to R20 in FIG. 20b) (S6).

As illustrated in FIG. 23, device B periodically receives data from host H (FIG. 20a) (S1). If the data received is a search signal (S2), device B sends a response signal to host H (S3).

As illustrated in FIG. 24 host H (FIG. 20a) periodically receives data from device B (S1). If the data received is a response signal (S2), host H locates the geographic position of device B by utilizing the method described in FIGS. 20a and 20b (S3), and sends the location data and the relevant map data of the area where device B is located to device A (S4).

Figure 25:
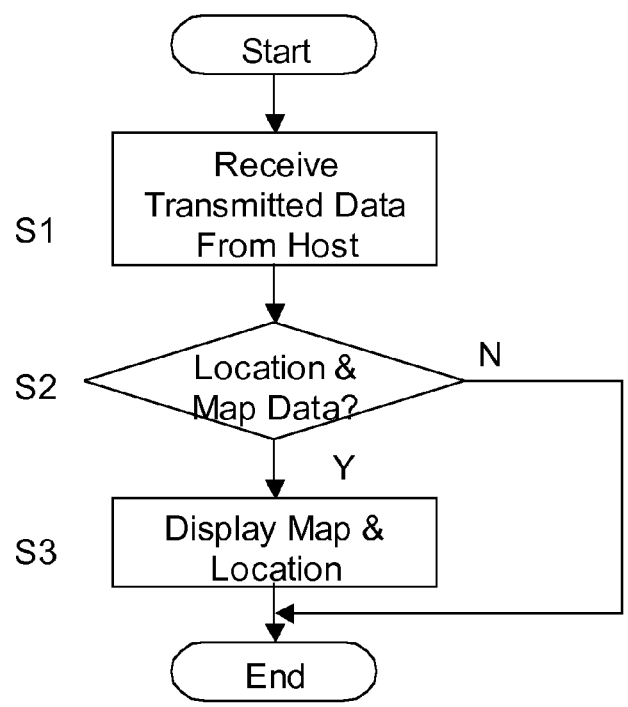
FIG. 25 is a flowchart illustrating an exemplary embodiment of the present invention.

As illustrated in FIG. 25, device A periodically receives data from host H (FIG. 20a) (S1). If the data received is the location data and the relevant map data mentioned above (S2), device A displays the map based on the relevant map data and indicates the current location of device B thereon based on the location data received (S3).

Device A can continuously track down the current location of device B as illustrated in FIG. 26. First, device A sends a request data to host H (FIG. 20a) (S1). As soon as host H receives the request data (S2), it sends a search signal in the manner illustrated in FIG. 22 (S3). As soon as device B receives the search signal (S4), it sends a response signal to host H (S5). Based on the response signal, host H locates the geographic location of device B with the method described in FIGS. 20a and 20b (S6). Then host H sends to device A a renewed location data and a relevant map data of the area where device B is currently located (S7). As soon as these data are received (S8), device A displays the map based on the relevant map data and indicates the updated location based on the renewed location data (S9). If device B is still within the specified area device A may use the original relevant map data. As another embodiment of the present invention, S1 through S4 may be omitted and make device B send a response signal continuously to host H until host H sends a command signal to device B to cease sending the response signal.

<<Positioning System—Automatic Silent Mode>>

FIGS. 27a through 32g illustrate the automatic silent mode of communication device 200 (FIG. 1).

Figure 27A:
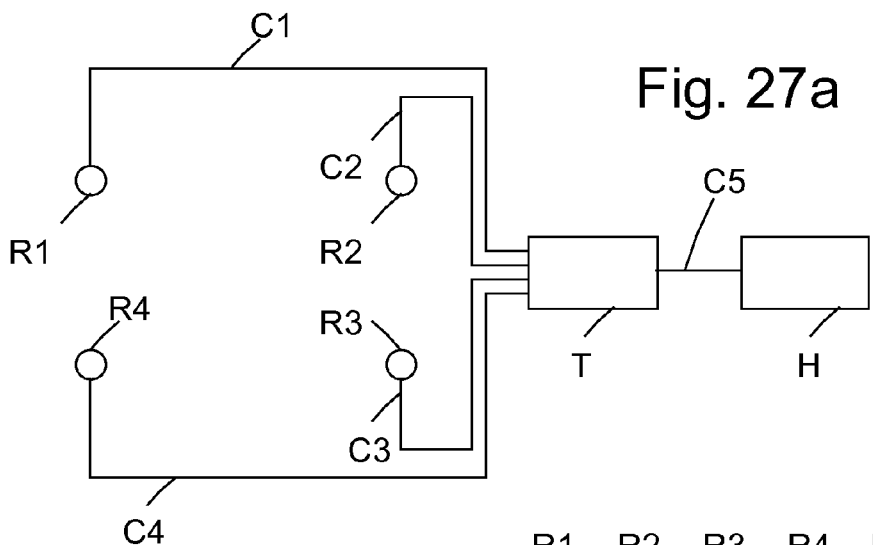
FIG. 27a is a simplified illustration illustrating an exemplary embodiment of the present invention.
Figure 27B:
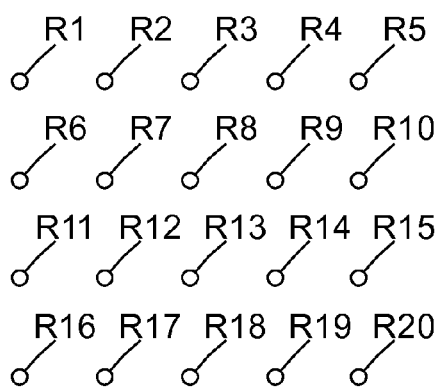
FIG. 27b is a simplified illustration illustrating an exemplary embodiment of the present invention.

In FIG. 27a, relay R1 is connected to cable C1, relay R2 is connected to cable C2, relay R3 is connected to cable C3, and relay R4 is connected to cable C4. Cables C1, C2, C3, and C4 are connected to transmitter T, which is connected to host H by cable C5. The relays (R1-R 20) are located throughout the predetermined area in the pattern illustrated in FIG. 27b. The system illustrated in FIGS. 27a and 27b is designed to pinpoint the position of communication device 200 by using the method so-called "global positioning system" or "GPS." As stated hereinbefore, such function can be enabled by the technologies primarily introduced in the inventions in the foregoing patents and the references cited thereof. The relays R1—R20 are preferably located on ground, however, are also permitted to be installed in artificial satellites as described in the foregoing patents and the references cited thereof in order to cover wider geographical range. In addition, host H may be carried by an artificial satellite and utilize the formation as described in FIGS. 2a, 2b, and 2c.

Figure 28:
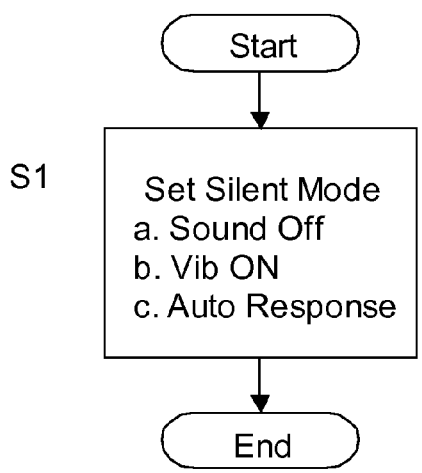
FIG. 28 is a flowchart illustrating an exemplary embodiment of the present invention.

As illustrated in FIG. 28, the user of communication device 200 may set the silent mode by input device 210 (FIG. 1) or by utilizing the voice recognition system installed therein. When communication device 200 is in the silent mode, (a) the ringing sound is turned off, (b) vibrator 217 (FIG. 1) activates when communication device 200 receives call, and/or (c) communication device 200 sends an automatic response to the caller device when a call is received (S1). The user may, at his discretion, select any of these predetermined function of the automatic silent mode.

FIG. 29 illustrates how the automatic silent mode is activated. Communication device 200 periodically checks its present location with the method so-called "global positioning system" or "GPS" by using the system illustrated in FIGS. 27a and 27b (S1). Communication device 200 then compares the present location and the previous location (S2). If the difference of the two values is more than the specified amount X, i.e., when the moving velocity of communication device 200 exceeds the predetermined value (S3), the silent mode is activated and (a) the ringing sound is automatically turned off, (b) vibrator 217 (FIG. 1) activates, and/or (c) communication device 200 sends an automatic response to the caller device according to the user's setting (S4). Here, the silent mode is automatically activated because the user of communication device 200 is presumed to be on an automobile and is not in a situation to freely answer the phone, or the user is presumed to be riding a train and does not want to disturb other passengers.

As another embodiment of the present invention, the automatic silent mode may be administered by host H (FIG. 27a). As illustrated in FIG. 30, the silent mode is set in the manner described in FIG. 28 (S1) and communication device 200 sends to host H a request signal indicating that it is in the silent mode (S2).

As described in FIG. 31, when host H (FIG. 27a) detects a call to communication device 200 after receiving the request signal, it checks the current location of communication device 200 (S1) and compares it with the previous location (S2). If the difference of the two values is more than the specified amount X, i.e., when the moving velocity of communication device 200 exceeds the predetermined value (S3), host H sends a notice signal to communication device 200 indicating that it has received an incoming call (S4).

As illustrated in FIG. 32, communication device 200 receives data periodically from host H (FIG. 27a) (S1). If the received data is a notice signal (S2), communication device 200 activates the silent mode (S3) and (a) the ringing sound is automatically turned off, (b) vibrator 217 (FIG. 1) activates, and/or (c) communication device 200 sends an automatic response to the caller device according to the user's setting. The automatic response may be sent from host H instead.

As another embodiment of the present invention, a train route data may be utilized. As illustrated in FIG. 32a, a train route data is stored in area 263 of RAM 206. The train route data contains three-dimensional train route map including the location data of the train route. FIG. 32b illustrates how the train route data is utilized. CPU 211 (FIG. 1) periodically checks the present location of communication device 200 by the method described in FIGS. 27a and 27b (S1). Then CPU 211 compares with the train route data stored in area 263 of RAM 206 (S2). If the present location of communication 200 matches the train route data (i.e., if communication device is located on the train route) (S3), the silent mode is activated in the manner described above (S4). The silent mode is activated because the user of communication device 200 is presumed to be currently on a train and may not want to disturb the other passengers on the same train.

Figure 32C:
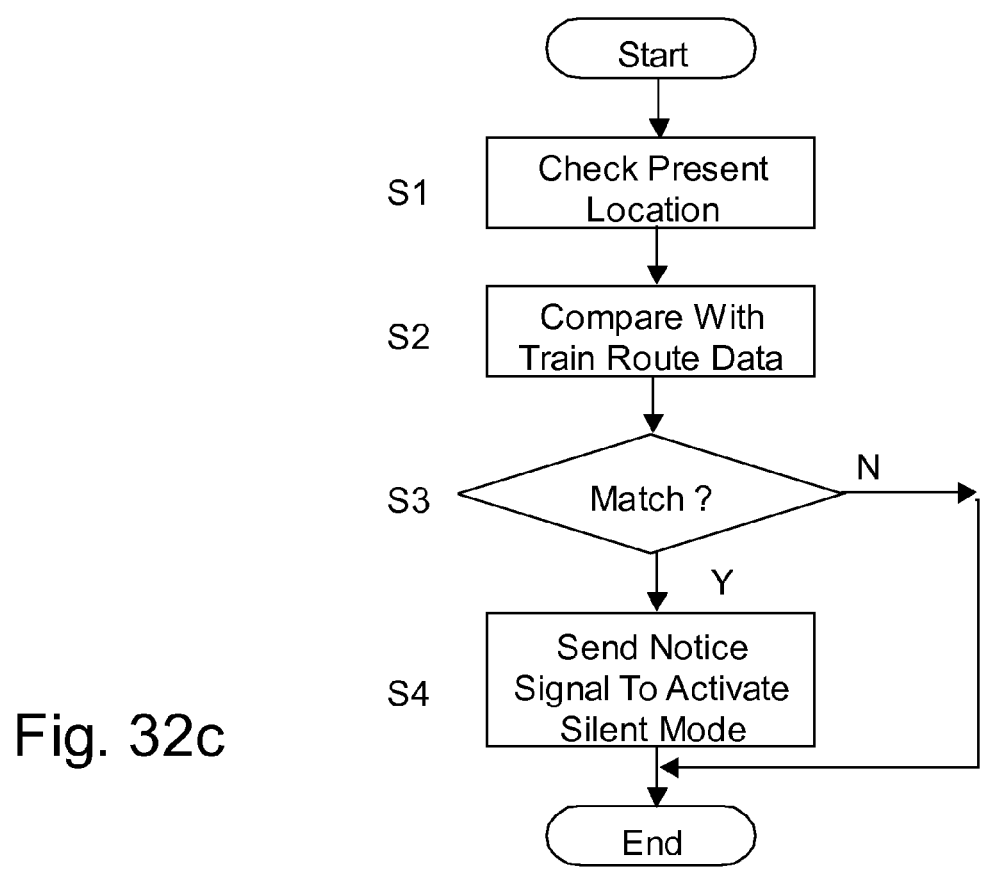
FIG. 32c is a flowchart illustrating an exemplary embodiment of the present invention.

As another embodiment of the present invention, such function can be delegated to host H (FIG. 27a) as described in FIG. 32c. Namely, host H (FIG. 27a) periodically checks the present location of communication device 200 by the method described in FIGS. 27a and 27b (S1). Then host H compares the present location with the train route data stored in its own storage (not shown) (S2). If the present location of communication 200 matches the train route data (i.e., if communication device is located on the train route) (S3) host H sends a notice signal to communication device 200 thereby activating the silent mode in the manner described above (S4).

Figure 32E:
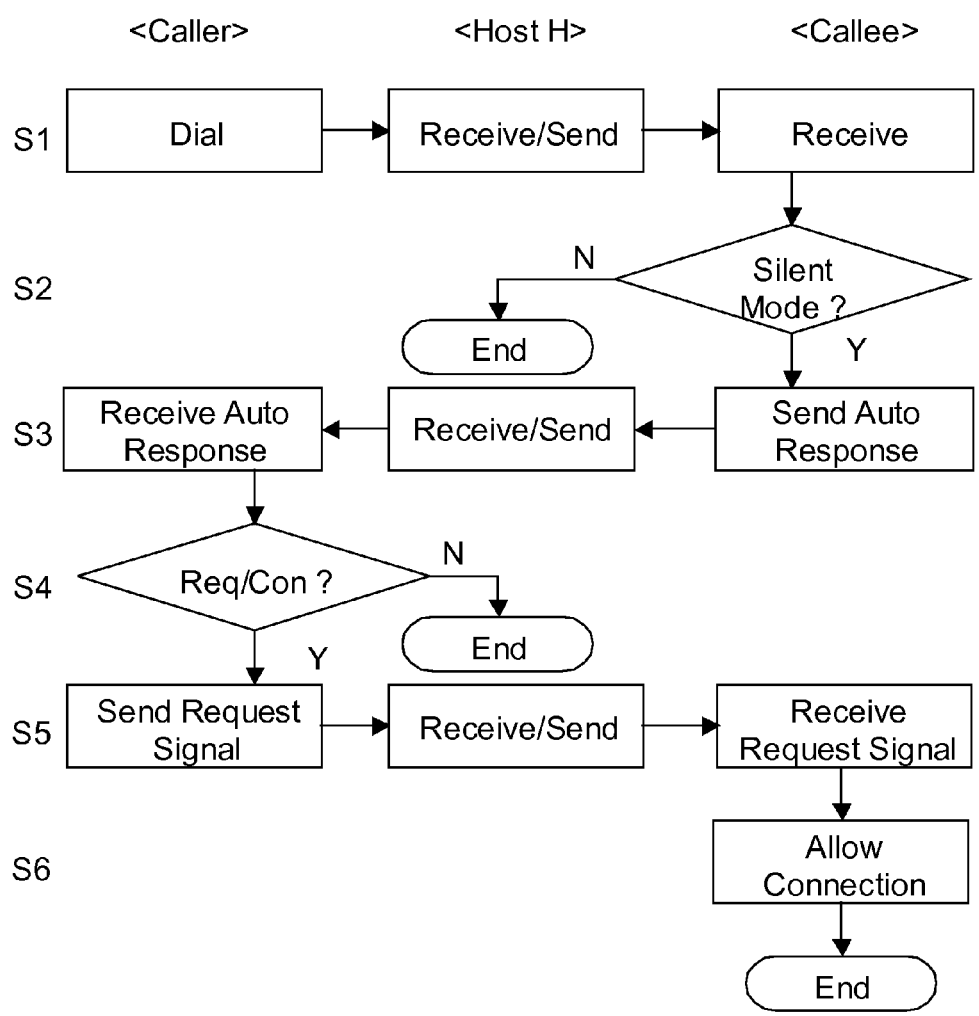
FIG. 32e is a flowchart illustrating an exemplary embodiment of the present invention.
Figure 32F:
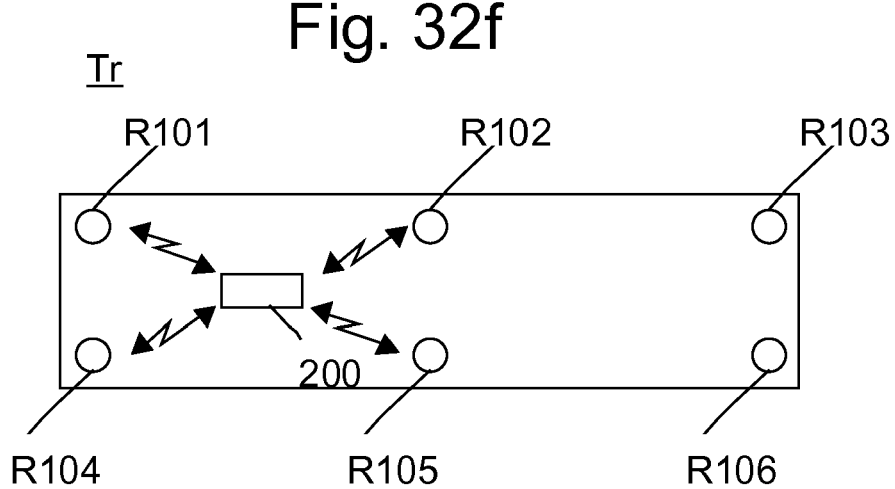
FIG. 32f is a simplified illustration illustrating an exemplary embodiment of the present invention.
Figure 32G:
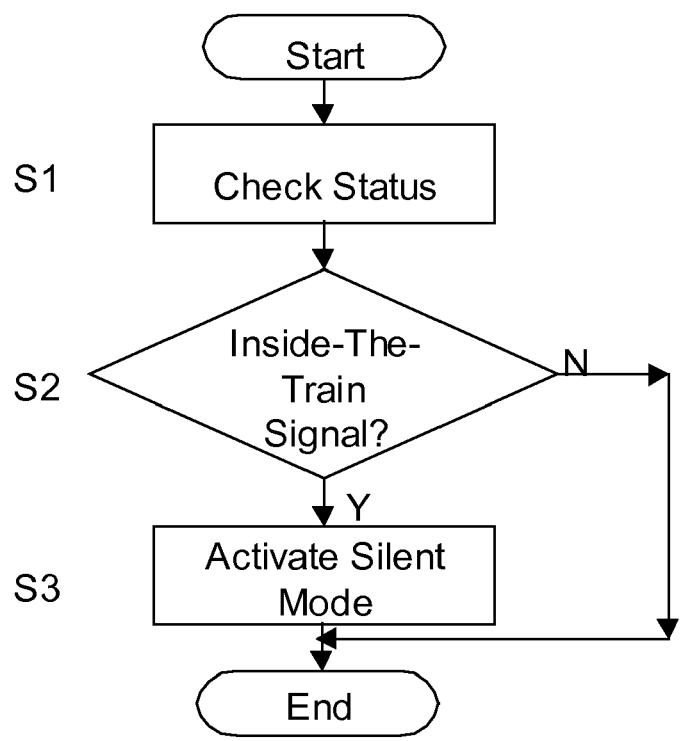
FIG. 32g is a flowchart illustrating an exemplary embodiment of the present invention.

Another embodiment is illustrated in FIGS. 32f and 32g. As illustrated in FIG. 32f, relays R 101, R 102, R 103, R 104, R 105, R 106, which perform the same function to the relays described in FIG. 27a and FIG. 27b, are installed in train Tr. The signals from these relays are sent to host H illustrated in FIG. 27a. Relays R 101 through R 106 emit inside-the-train signals which are emitted only inside train Tr. FIG. 32g illustrates how communication device 200 operates inside train Tr. Communication device 200 periodically checks the signal received in train Tr (S1). If communication device 200 determines that the signal received is an inside-the-train signal (S2), it activates the silent mode in the manner described above (S3).

<<Positioning System—Auto Response>>

FIG. 32d and FIG. 32e illustrates the method to send an automatic response to a caller device when the silent mode is activated.

Assume that the caller device, a communication device 200, intends to call a callee device, another communication device 200 via host H (FIG. 27a). As illustrated in FIG. 32d, the caller device dials the callee device and the dialing signal is sent to host H (S1). Host H checks whether the callee device is in the silent mode (S2). If host H detects that the callee device is in the silent mode, it sends a predetermined auto response which indicates that the callee is probably on a train and may currently not be available, which is received by the caller device (S3). If the user of the caller device still desires to request for connection and certain code is input from input device 210 (FIG. 1) or by the voice recognition system (S4), a request signal for connection is sent and received by host H (S5), and the line is connected between the caller device and the callee device via host H (S6).

As another embodiment of the present invention, the task of host H (FIG. 27a) which is described in FIG. 32d may be delegated to the callee device as illustrated in FIG. 32e. The caller device dials the callee device and the dialing signal is sent to the callee device via host H (S1). The callee device checks whether it is in the silent mode (S2). If the callee device detects that it is in the silent mode, it sends an predetermined auto response which indicates that the callee is probably on a train and may currently not be available, which is sent to the caller device via host H (S3). If the user of the caller device still desires to request for connection and certain code is input from input device 210 (FIG. 1) or by the voice recognition system (S4), a request signal for connection is sent to the callee device via host H (S5), and the line is connected between the caller device and the callee device via host H (S6).

<<Positioning System—Summary>>

The foregoing inventions may be summarized as the following.

(1) A positioning system consisting of a first device, a host, and a second device wherein a device ID of said second device is input into said first device, said device ID is sent to said host, said host sends a search signal to which said second device responds, said host sends to the first device location data indicating the location of said second device, and said first device displays the location of said second device thereby enabling said first device to identify the location of said second device. Where said first device is a communication device, said first device includes an antenna, said antenna sends positioning signal to identify the location of said second device, and said antenna also sends communication signal thereby enabling the user of said first device to identify the location of said second device as well as utilizing said communication device for means of communication.

(2) A communication device wherein the moving velocity of said communication device is checked and when said moving velocity exceeds a predetermined value said communication device refrains from emitting sound thereby preventing other persons being present near said communication device from being disturbed.

(3) A communication device wherein the location of said communication device is compared to a route data and said communication device refrains from emitting sound if said location of said communication device is determined to match said route data thereby preventing other persons being present near said communication device from being disturbed.

(4) A communication system consisting of a first communication device and a second communication device wherein said first communication device receives an automatic response if said second communication device is in a certain mode and said first communication device is enable to be connected to said second communication device upon said second device sending a request thereby preventing other persons being present near said first communication device from being disturbed.

(5) A communication system consisting of a communication device and a plurality of signal emitter wherein said communication device refrains from emitting sound upon receiving a certain signal from said signal emitter thereby preventing other persons being present near said communication device from being disturbed.

<<Auto Backup>>

FIGS. 33 through 37 illustrate the automatic backup system of communication device 200 (FIG. 1).

Figure 33:
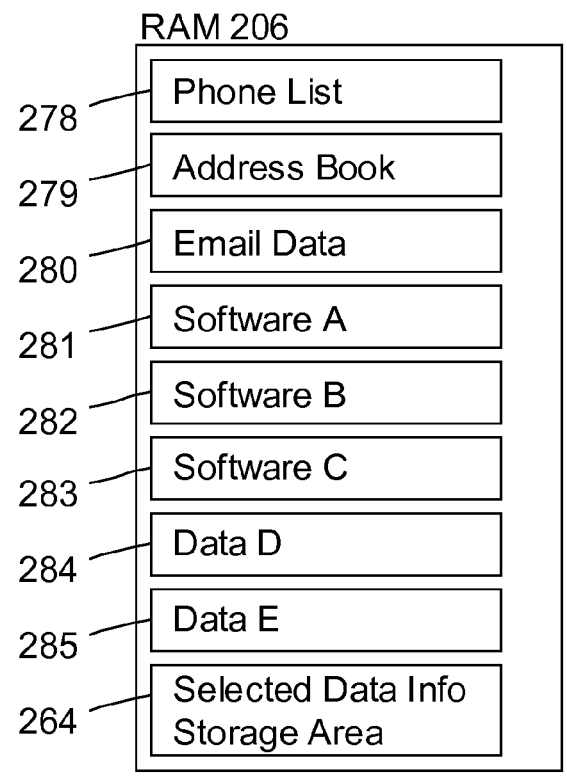
FIG. 33 is a block diagram illustrating an exemplary embodiment of the present invention.

As illustrated in FIG. 33, RAM 206 (FIG. 1) includes areas to store the data essential to the user of communication device 200, such as area 278 for a phone list, area 279 for an address book, area 280 for email data, area 281 for software A, area 282 for software B, area 283 for software C, area 284 for data D, area 285 for data E. RAM 206 also includes area 264, i.e., the selected data info storage area, which will be explained in details hereinafter.

Figure 34:
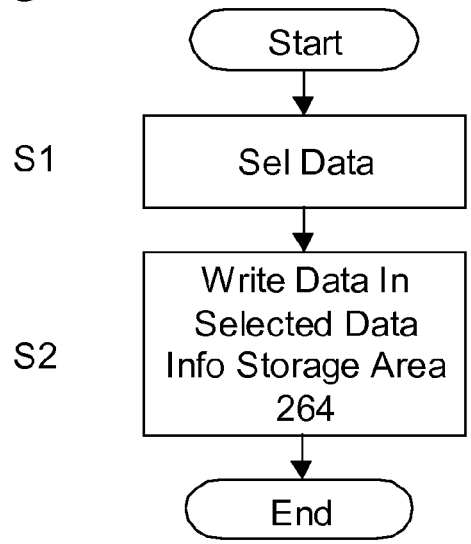
FIG. 34 is a flowchart illustrating an exemplary embodiment of the present invention.

As described in FIG. 34, the user selects data by utilizing input device 210 (FIG. 1) or the voice recognition system which he/she intends to be automatically backed up (S1). The selected data are written in area 264, the selected data info storage area (S2).

Figure 35A:
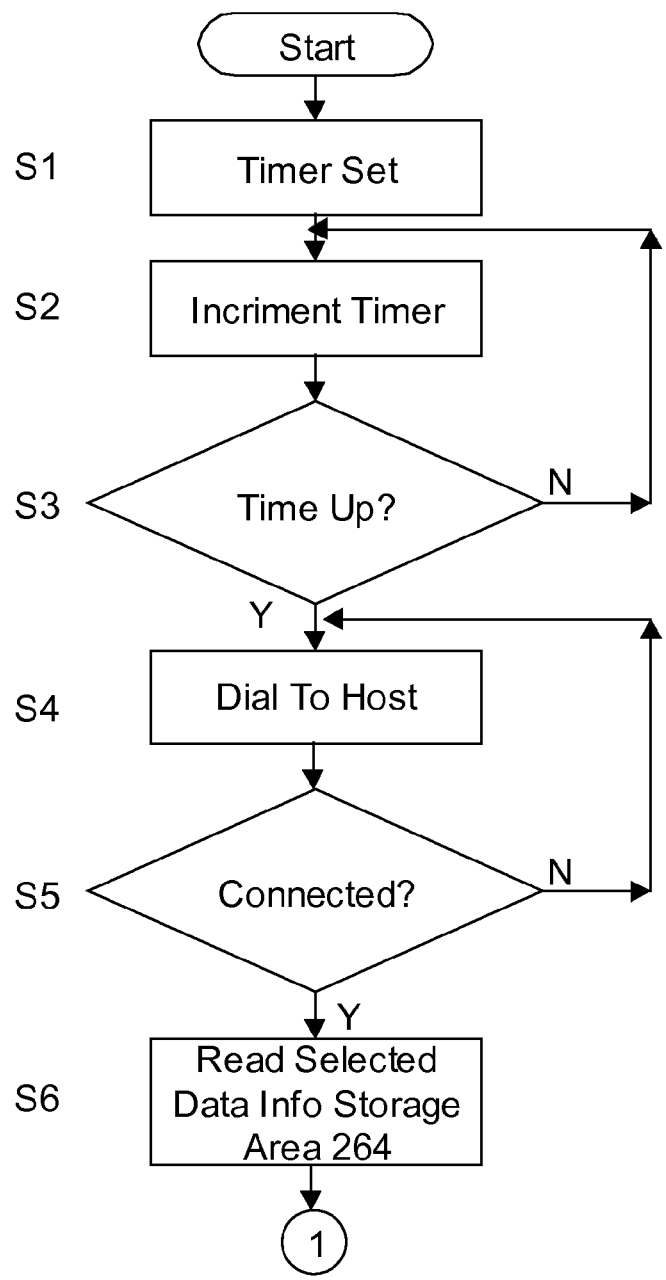
FIG. 35a is a flowchart illustrating an exemplary embodiment of the present invention.
Figure 35B:
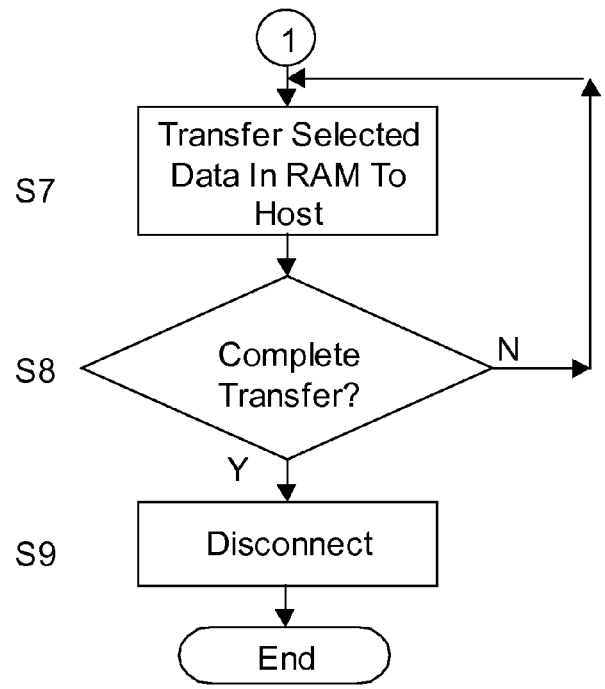
FIG. 35b is a flowchart illustrating an exemplary embodiment of the present invention.

The overall operation of this function is illustrated in FIGS. 35a and 35b. First of all, a timer (not shown) is set by a specific input signal produced by input device 210 (FIG. 1) or by the voice recognition system (S1). The timer is incremented periodically (S2) and when the incremented value equals the predetermined value (S3), CPU 211 (FIG. 1) initiates the dialing process (S4). The dialing process continues until communication device 200 is connected to host H explained in FIG. 37 (S5). Once the line is connected, CPU 211 reads the information stored in area 264 (S6) and based on such information it initiates to transfer the selected data from RAM 206 to host H (S7). The transfer continues until all of the selected data are transferred to host H (S8), and the line is disconnected thereafter (S9). This backup sequence can be initiated automatically and periodically by using a timer or manually. As another embodiment of the present invention, instead of selecting the data that are to be backed up, all data in RAM 206 (FIG. 1) can be transferred to host H.

Figure 36:
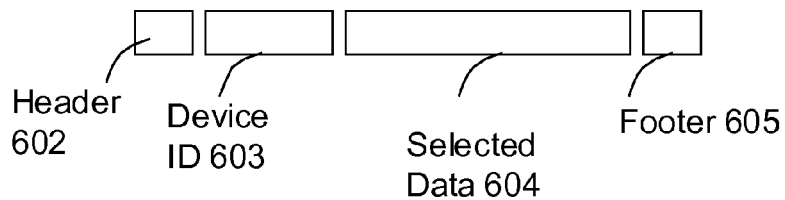
FIG. 36 is a simplified illustration illustrating an exemplary embodiment of the present invention.

FIG. 36 illustrates the basic structure of the data transferred to host H. Transferred data 601 includes header 602, device ID 603, selected data 604 and footer 605. Device ID 603 is the identification number of communication device 200 preferably its phone number, and selected data 604 is a pack of data which is transferred from RAM 206 to host H based on information stored in area 264. Header 602 and footer 605 indicates the beginning and the end of the transferred data 601 respectively.

Figure 37:
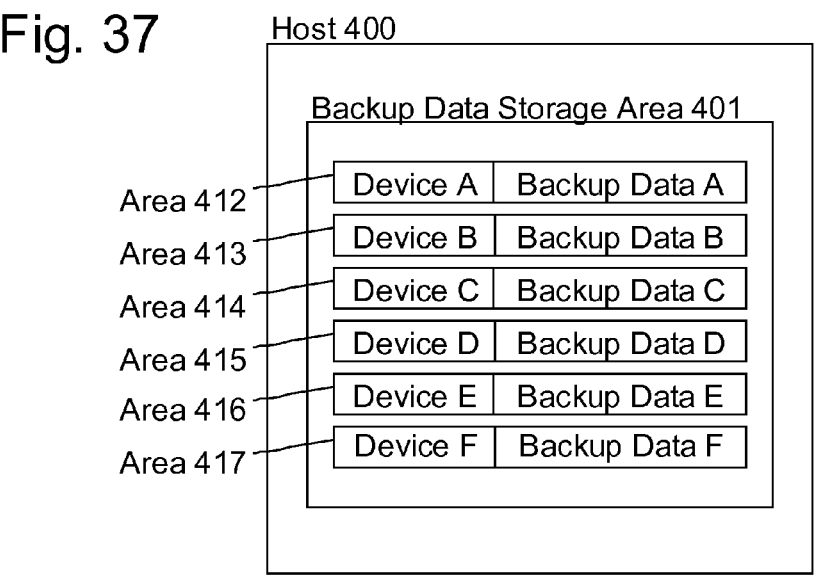
FIG. 37 is a block diagram illustrating an exemplary embodiment of the present invention.

FIG. 37 illustrates the basic structure of host H. Host H includes backup data storage area 401 which is used to backup all of the backup data transferred from all communication devices. Host H stores the transferred data 601 (FIG. 36) to the designated area based on the device ID included in transferred data 601. For example, transferred data 601 transferred from device A is stored in area 412 as backup data A. In the same manner transferred data 601 transferred from device B is stored in area 413 as backup data B; transferred data 601 transferred from device C is stored in area 414 as backup data C; transferred data 601 transferred from device D is stored in area 415 as backup data D; transferred data 601 transferred from device E is stored in area 416 as backup data E; and transferred data 601 transferred from device F is stored in area 417 as backup data F.

<<Auto Backup—Summary>>

The foregoing invention may be summarized as the following.

A communication system consisting of a host and a plurality of communication device wherein said host includes a plurality of storage areas and each of said plurality of communication device includes a storage area, and data stored in said storage area of said communication device are manually and/or periodically transferred to one of the designated storage areas of said host thereby enabling the users of said plurality of communication device to retrieve data when said plurality of communication device are lost or broken.

<<Signal Amplifier>>

Figure 38:
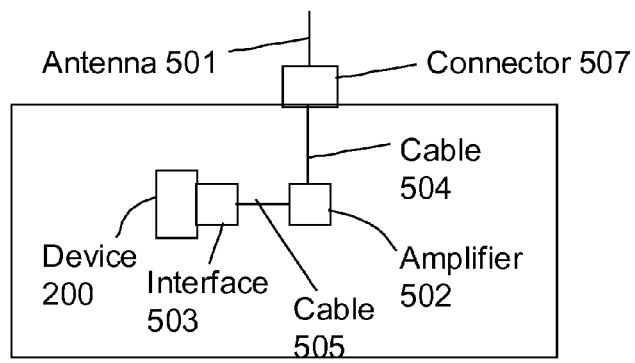
FIG. 38 is a simplified illustration illustrating an exemplary embodiment of the present invention.

FIG. 38 illustrates a signal amplifier utilized for automobiles and other transportation carriers, such as trains, airplanes, space shuttles, and motor cycles.

As described in FIG. 38, automobile 835 includes interface 503, an interface detachably connectable to communication device 200, which is connected to amplifier 502 via cable 505. Amplifier 502 is connected to antenna 501 via cable 504 and connector 507 as described in this drawing. The signal produced by communication device 200 is transferred to interface 503. Then the signal is transferred to amplifier 502 via cable 505 where the signal is amplified. The amplified signal is transferred to antenna 501 via cable 504 and connector 507, which transmits the amplified signal to host H (not shown). The receiving signal is received by antenna 501 and transferred to amplifier 502 via connector 507 and cable 504, and then is transferred to interface 503 via cable 505, which transfers the amplified signal to communication device 200.

<<Signal Amplifier—Summary>>

The foregoing invention may be summarized as the following.

A transportation carrier which is primarily designed to carry person or persons consisting of an interface which is detachably connectable to a communication device, an amplifier which is connected to said interface and which amplifies the signal produced by said communication device, and an transmitter which is connected to said amplifier and which transmits said signal amplified by said amplifier.

<<Audio/Video Data Capturing System>>

FIGS. 39 through 44 illustrate the audio/video capturing system of communication device 200 (FIG. 1).

Assuming that device A, a communication device 200, captures audio/video data and transfers such data to device B, another communication device 200, via a host (not shown). Primarily video data is input from CCD unit 214 (FIG. 1) and audio data is input from microphone 215 of (FIG. 1) of device A.

Figure 39:
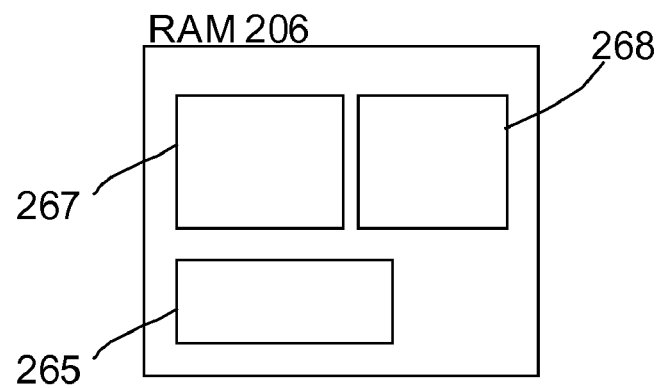
FIG. 39 is a block diagram illustrating an exemplary embodiment of the present invention.

As illustrated in FIG. 39, RAM 206 (FIG. 1) includes area 267 which stores video data, area 268 which stores audio data, and area 265 which is a work area utilized for the process explained hereinafter.

Figure 40:
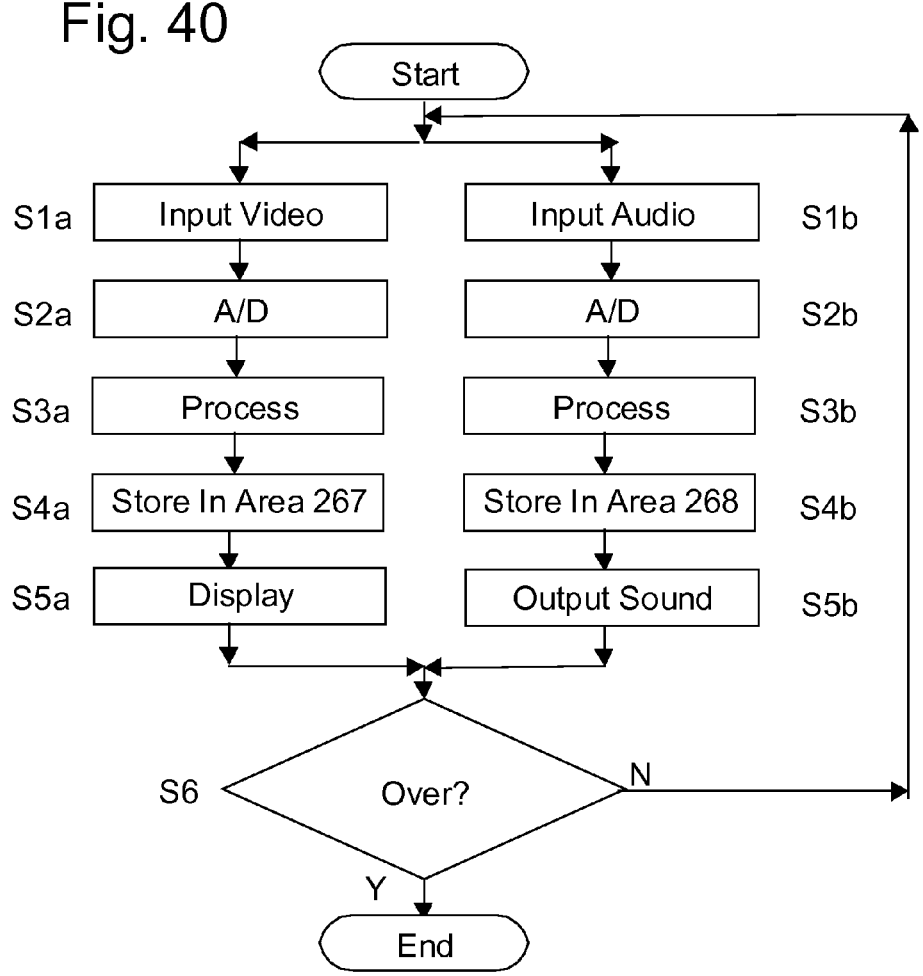
FIG. 40 is a flowchart illustrating an exemplary embodiment of the present invention.

As described in FIG. 40, the video data input from CCD unit 214 (FIG. 1) (S1a) is converted from analog data to digital data (S2a) and is processed by video processor 202 (FIG. 1) (S3a). Area 265 (FIG. 39) is used as work area for such process. The processed video data is stored in area 267 (FIG. 39) of RAM 206 (S4a) and is displayed on LCD 201 (FIG. 1) (S5a). As described in the same drawing, the audio data input from microphone 215 (FIG. 1) (S1b) is converted from analog data to digital data by A/D 213 (FIG. 1) (S2b) and is processed by sound processor 205 (FIG. 1) (S3b). Area 265 is used as work area for such process. The processed audio data is stored in area 268 (FIG. 39) of RAM 206 (S4b) and is transferred to sound processor 205 and is output from speaker 216 (FIG. 1) via D/A 204 (FIG. 1) (S5b). The sequences of S1a through S5a and S1b through S5b are continued until a specific signal indicating to stop such sequence is input from input device 210 (FIG. 1) or by the voice recognition system (S6).

Figure 41:
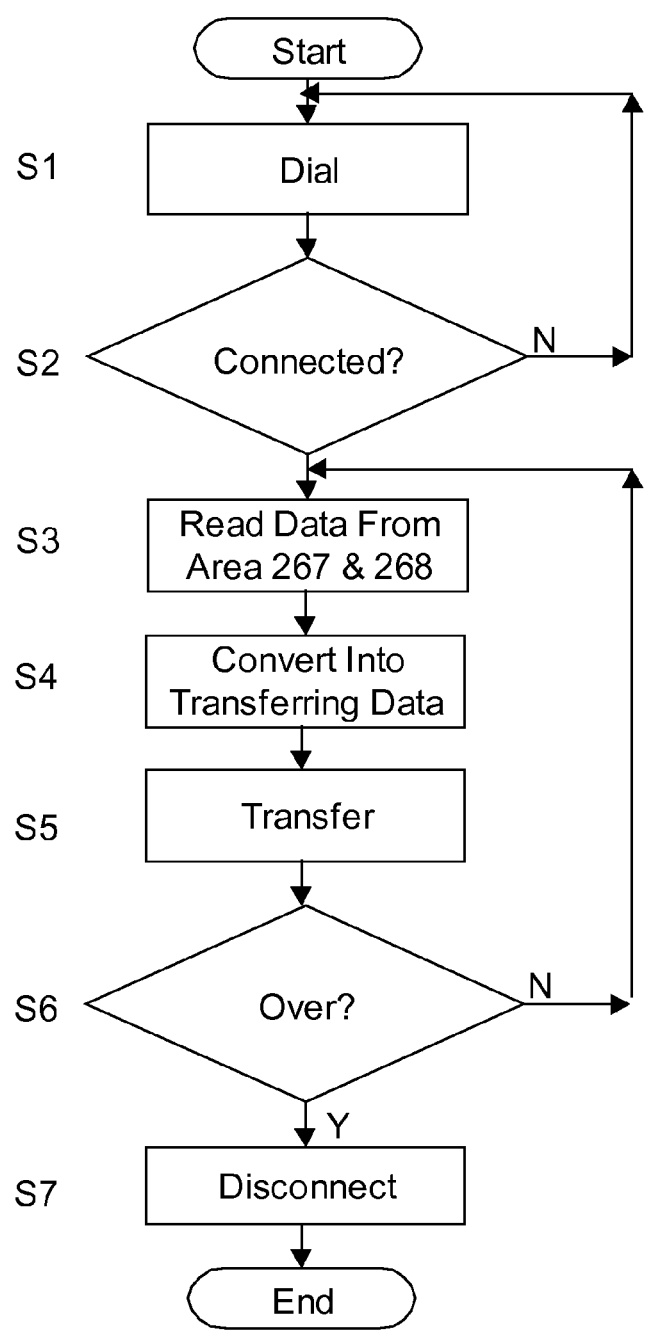
FIG. 41 is a flowchart illustrating an exemplary embodiment of the present invention.

FIG. 41 illustrates the sequence to transfer the video data and the audio data via antenna 218 (FIG. 1) in a wireless fashion. As described in FIG. 41, CPU 211 (FIG. 1) of device A initiates a dialing process (S1) until the line is connected to a host (not shown) (S2). As soon as the line is connected, CPU 211 reads the video data and the audio data stored in area 267 (FIG. 39) and area 268 (FIG. 39) (S3) and transfer them to signal processor 208 (FIG. 1) where the data are converted into a transferring data (S4). The transferring data is transferred from antenna 218 (FIG. 1) in a wireless fashion (S5). The sequence of S1 through S5 is continued until a specific signal indicating to stop such sequence is input from input device 210 (FIG. 1) or via the voice recognition system (S6). The line is disconnected thereafter (S7).

Figure 42:
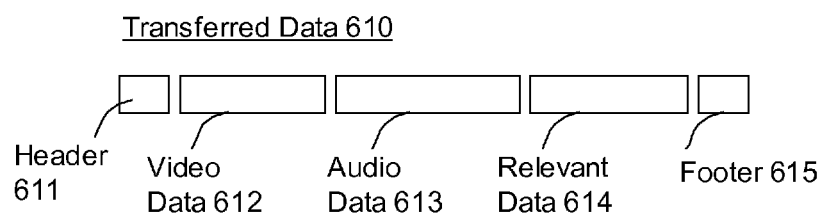
FIG. 42 is a simplified illustration illustrating an exemplary embodiment of the present invention.

FIG. 42 illustrates the basic structure of the transferred data which is transferred from device A as described in S4 and S5 of FIG. 41. Transferred data 610 is primarily composed of header 611, video data 612, audio data 613, relevant data 614, and footer 615. Video data 612 corresponds to the video data stored in area 267 (FIG. 39) of RAM 206, and audio data 613 corresponds to the audio data stored in area 268 (FIG. 39) of RAM 206. Relevant data 614 includes various types of data, such as the identification numbers of device A (i.e., transferor device) and device B (i.e., transferee device), a location data which represents the location of device A, email data transferred from device A to device B, etc. Header 611 and footer 615 represent the beginning and the end of transferred data 610 respectively.

Figure 43:
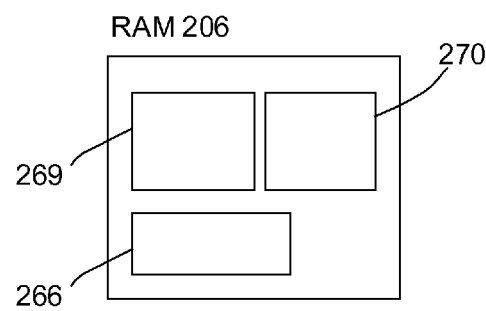
FIG. 43 is a block diagram illustrating an exemplary embodiment of the present invention.

FIG. 43 illustrates the data contained in RAM 206 (FIG. 1) of device B. As illustrated in FIG. 43, RAM 206 includes area 269 which stores video data, area 270 which stores audio data, and area 266 which is a work area utilized for the process explained hereinafter.

Figure 44A:
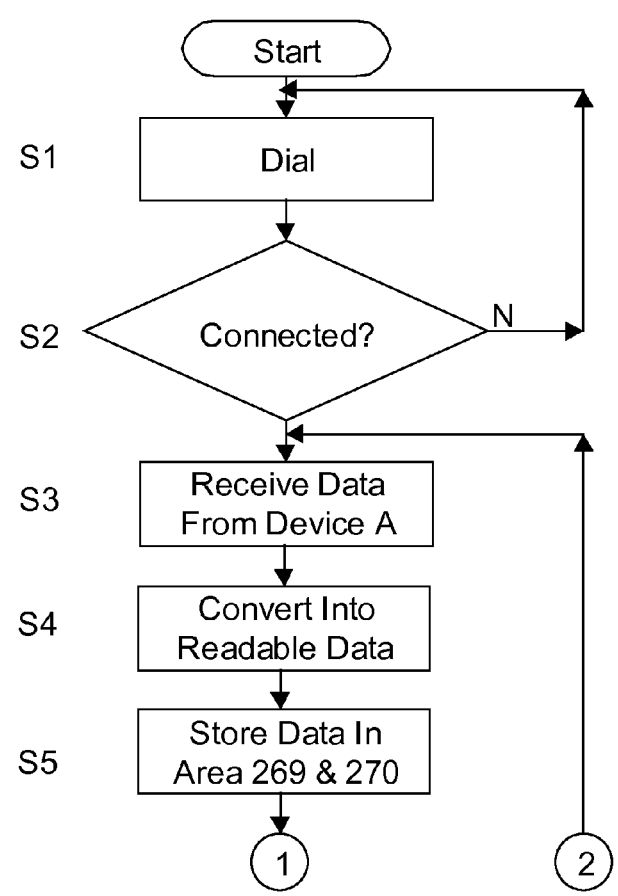
FIG. 44a is a flowchart illustrating an exemplary embodiment of the present invention.
Figure 44B:
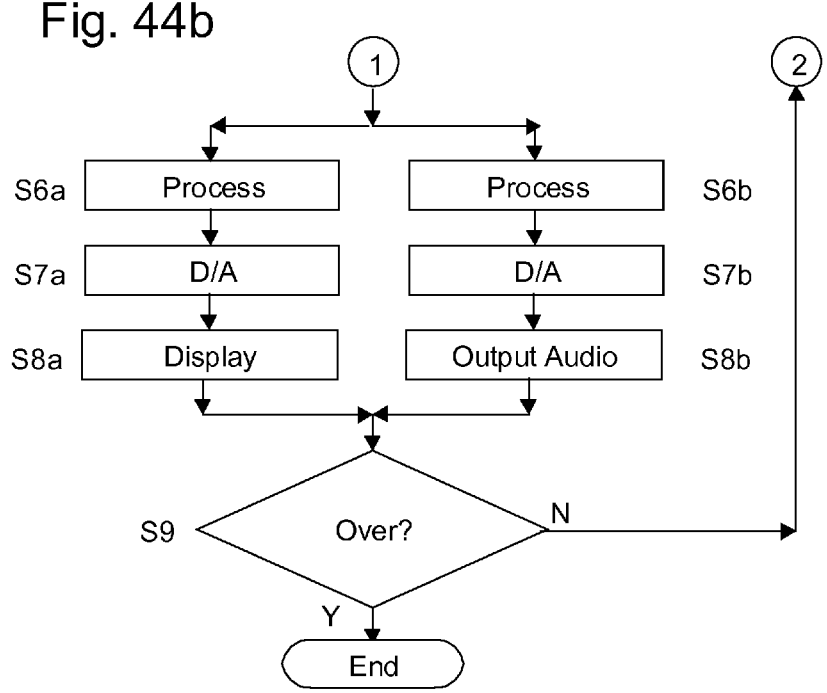
FIG. 44b is a flowchart illustrating an exemplary embodiment of the present invention.

As described in FIG. 44a and FIG. 44b, CPU 211 (FIG. 1) of device B initiates a dialing process (S1) until device B is connected to a host (not shown) (S2). Transferred data 610 is received by antenna 218 (FIG. 1) of device B (S3) and is converted by signal processor 208 (FIG. 1) into data readable by CPU 211 (S4). Video data and audio data are retrieved from transferred data 610 and stored into area 269 (FIG. 43) and area 270 (FIG. 43) of RAM 206 respectively (S5). The video data stored in area 269 is processed by video processor 202 (FIG. 1) (S6a). The processed video data is converted into an analog data (S7a) and displayed on LCD 201 (FIG. 1) (S8a). S7a may not be necessary depending on the type of LCD 201 used. The audio data stored in area 270 is processed by sound processor 205 (FIG. 1) (S6b). The processed audio data is converted into analog data by D/A 204 (FIG. 1) (S7b) and output from speaker 216 (FIG. 1) (S8b). The sequences of S6a through S8a and S6b through S8b are continued until a specific signal indicating to stop such sequence is input from input device 210 (FIG. 1) or via the voice recognition system (S9).

<<Audio/Video Data Capturing System—Summary>>

The foregoing invention may be summarized as the following.

(1) A communication system consisting of a first communication device and a second communication device wherein said first communication consists of a video input means to input video information, a microphone, and a first antenna, said second communication device consists of a display means to output said video information, a speaker, and a second antenna, said first communication device inputs said video information and said audio information from said video input means and said microphone respectively, said video information and said audio information are sent to said second communication device from said first antenna in a wireless fashion, said second communication device receives said video information and said audio information in a wireless fashion from said second antenna, and said video information and said audio information are output from said display means and said speaker of said second communication device respectively thereby enabling the user of said first communication device and the user of said second communication device to communicate at any location wherever they desire.

(2) A communication device consisting of a video input means to input video information, a microphone, and an antenna wherein said communication device inputs said video information and said audio information from said video input means and said microphone respectively, said video information is sent to another device in a wireless fashion from said antenna, said audio information is also sent to said other device in a wireless fashion from said antenna thereby enabling the user of said communication device to communicate with said other device by utilizing said video information and said audio information in any location wherever he/she desires.

<<Digital Mirror (1)>>

Figure 44C:
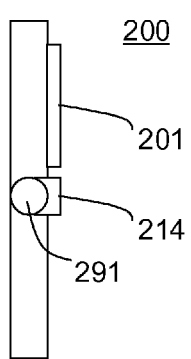
FIG. 44c is a simplified illustration illustrating an exemplary embodiment of the present invention.
Figure 44D:
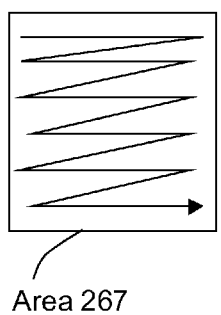
FIG. 44d is a simplified illustration illustrating an exemplary embodiment of the present invention.
Figure 44E:
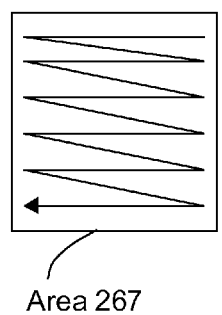
FIG. 44e is a simplified illustration illustrating an exemplary embodiment of the present invention.

FIGS. 44c through 44e illustrate the first embodiment of digital mirror function of communication device 200 (FIG. 1).

In this embodiment communication device 200 includes rotator 291 as described in FIG. 44c. Rotator 291 is fixed to the side of communication device 200 and rotates CCD unit 214 (FIG. 1) and thereby CCD unit 214 is enabled to face multi-direction. CPU 211 (FIG. 1) reads the video data stored in area 267 (FIG. 39) from left to right as described in FIG. 44d when CCD unit 214 is facing the opposite direction from LCD 201 (FIG. 1). However, when CCD unit 214 is facing the same direction with LCD 201, CPU 211 reads the video data stored in area 267 from right to left as described in FIG. 44e thereby producing a "mirror image" on LCD 201.

As another embodiment of the present invention more than one CCD units which face multi-direction may be utilized instead of enabling one CCD unit to rotate in the manner described above.

<<Digital Mirror—Summary>>

The foregoing inventions may be summarized as the following.

(1) A wireless communication device comprising a camera, a display, an image data producing means, a wireless transmitting means, wherein said camera is capable of facing a first direction and a second direction, said image data producing means is capable of producing a non-inverted image data and an inverted image data, said image data producing means produces said non-inverted image data which is displayed on said display when said camera is facing said first direction and produces said inverted image data which is displayed on said display when said camera is facing said second direction, while said non-inverted image data is transferred in a wireless fashion from said wireless transmitting means.

(2) A communication device consisting of a display and a video input means wherein said display outputs video image which is input from said video input means and said video image is output in a symmetric fashion when said video input means is facing the same direction with said display thereby enabling the user of said communication device to utilize said communication device as a digital mirror.

<<Caller ID>>

Figure 47:
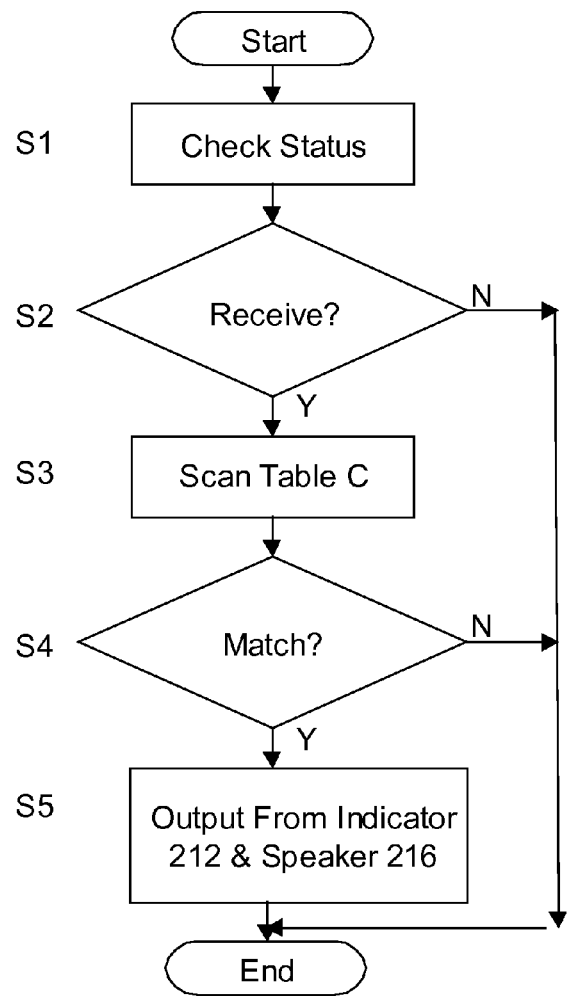
FIG. 47 is a flowchart illustrating an exemplary embodiment of the present invention.

FIGS. 45 through 47 illustrate the caller ID system of communication device 200 (FIG. 1).

As illustrated in FIG. 45, RAM 206 includes Table C. As shown in the drawing, each phone number corresponds to a specific color and sound. For example phone #1 corresponds to color A and sound E; phone #2 corresponds to color B and sound F; phone #3 corresponds to color C and sound G; and phone #4 corresponds to color D and sound H.

As illustrated in FIG. 46, the user of communication device 200 selects or inputs a phone number (S1) and selects a specific color (S2) and a specific sound (S3) designated for that phone number by utilizing input device 210 (FIG. 1). Such sequence can be repeated until there is a specific input signal from input device 210 ordering to do otherwise (S4).

As illustrated in FIG. 47, CPU 211 (FIG. 1) periodically checks whether it has received a call from other communication devices (S1). If it receives a call (S2), CPU 211 scans Table C (FIG. 45) to see whether the phone number of the caller device is registered in the table (S3). If there is a match (S4), the designated color is output from indicator 212 (FIG. 1) and the designated sound is output from speaker 216 (FIG. 1) (S5). For example if the incoming call is from phone #1, color A is output from indicator 212 and sound E is output from speaker 216.

<<Caller ID—Summary>>

The foregoing invention may be summarized as the following.

A communication device consisting of a color emitting means which outputs more than one type of color and a speaker which outputs more than one audio information wherein said communication device stores information regarding a plurality of phone numbers, a specific color and/or a specific audio information is designated to each phone number respectively, and said specific color is output from said color emitting means and/or said specific audio information is output from said speaker according to the phone number of an incoming call thereby enabling the user of said communication device to perceive the identification of the caller of said incoming call in advance of answering thereto.

<<Stock Purchase>>

FIGS. 48 through 52 illustrate the method of purchasing stocks by utilizing communication device 200 (FIG. 1).

Figure 48:
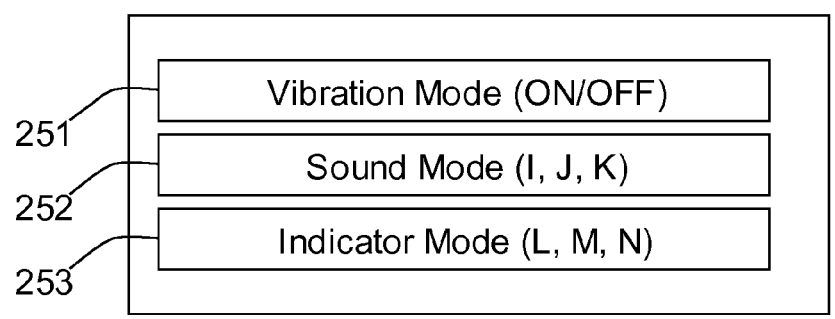
FIG. 48 is a block diagram illustrating an exemplary embodiment of the present invention.

FIG. 48 illustrates the data stored in ROM 207 (FIG. 1) necessary to set the notice mode. Area 251 stores the program regarding the vibration mode (i.e., vibration mode ON/vibration mode OFF); area 252 stores the program regarding sound which is emitted from speaker 216 (FIG. 1) and several types of sound data, such as sound data I, sound data J, and sound data K are stored therein; area 253 stores the program regarding the color emitted from indicator 212 (FIG. 1) and several types of color data, such as color data L, color data, M, and color data N are stored therein.

Figure 49:
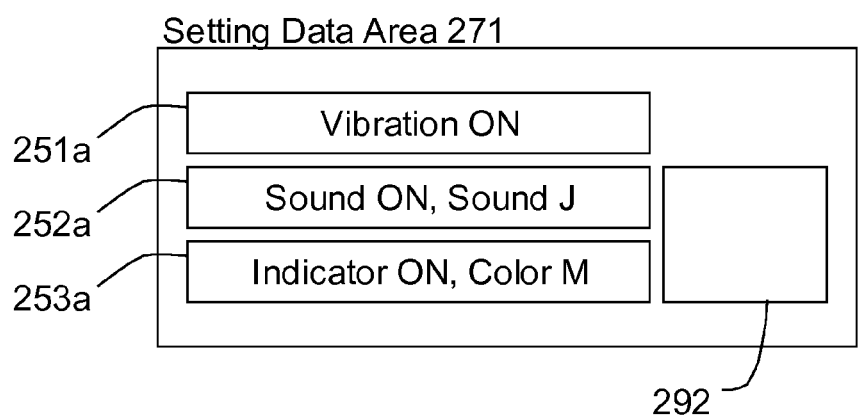
FIG. 49 is a block diagram illustrating an exemplary embodiment of the present invention.

As illustrated in FIG. 49, the notice mode is activated in the manner in compliance with the settings stored in setting data area 271 of RAM 206 (FIG. 1). In the example illustrated in FIG. 49, when the notice mode is activated, vibrator 217 (FIG. 1) is turned on in compliance with the data stored in area 251a, speaker 216 (FIG. 1) is turned on and sound data J is emitted therefrom in compliance with the data stored in area 252a, and indicator 212 (FIG. 1) is turned on and color M is emitted therefrom in compliance with the data stored in area 253a. Area 292 stores the stock purchase data, i.e., the name of the brand, the amount of limited price, the name of the stock market (such as NASDAQ and/or NYSE) and other relevant information regarding the stock purchase.

Figure 50:
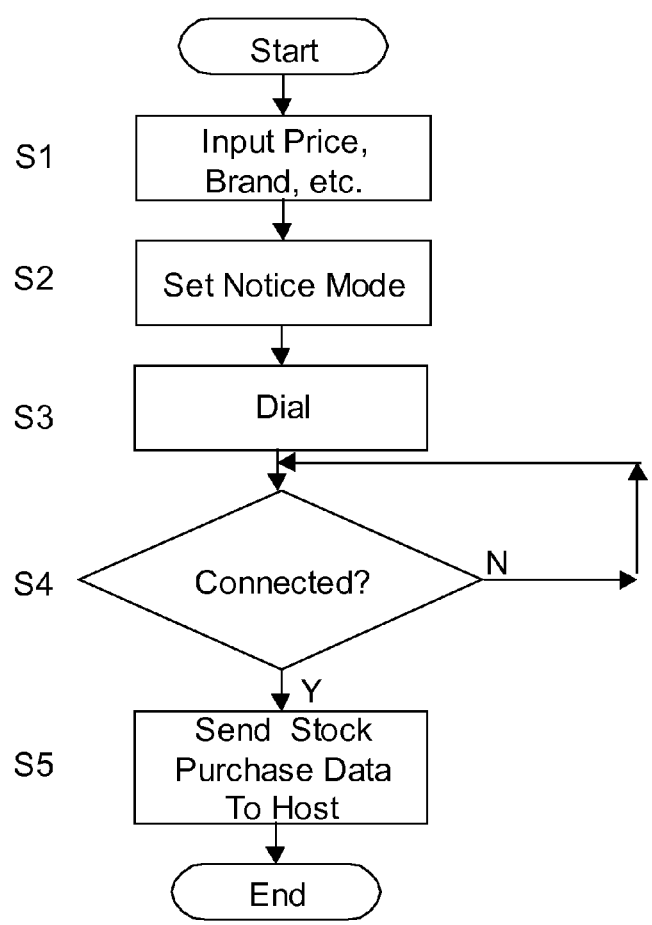
FIG. 50 is a flowchart illustrating an exemplary embodiment of the present invention.

As illustrated in FIG. 50, the user of communication device 200 inputs the stock purchase data from input device 210 (FIG. 1) or by the voice recognition system, which is stored in area 292 of RAM 206 (FIG. 49) (S1). By way of inputting specific data from input device 210, the property of notice mode (i.e., vibration ON/OFF, sound ON/OFF and the type of sound, indicator ON/OFF, and the type of color) is set and the relevant data are stored in area 271 (i.e., areas 251a, 252a, 253a) (FIG. 49) of RAM 206 by the programs stored in areas 251, 252, 253 of ROM 207 (FIG. 48) (S2). Communication device 200 initiates a dialing process (S3) until it is connected to host H (described hereinafter) (S4) and sends the stock purchase data thereto.

Figure 51:
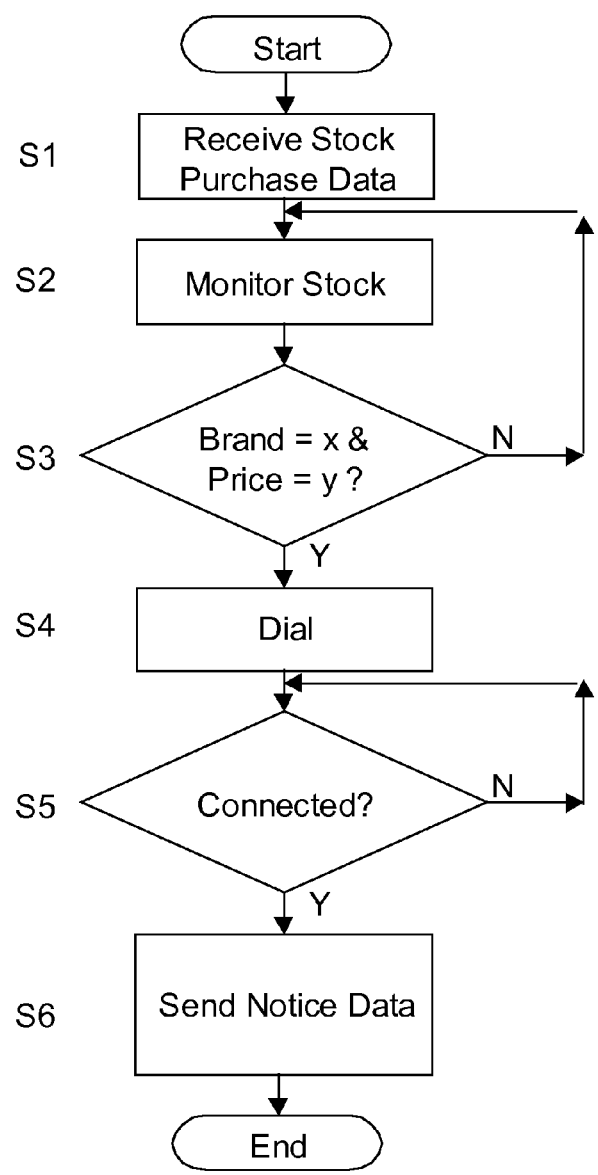
FIG. 51 is a flowchart illustrating an exemplary embodiment of the present invention.

FIG. 51 illustrates the operation of host H (not shown). As soon as host H receives the stock purchase data from communication device 200 (S1), it initiates to monitor the stock markets which is specified in the stock purchase data (S2). If host H detects that the price of the certain brand specified in the stock purchase data meets the limited price specified in the stock purchase data, (in the present example if the price of brand x is y) (S3), it initiates a dialing process (S4) until it is connected to communication device 200 (S5) and sends a notice data thereto (S6).

Figure 52:
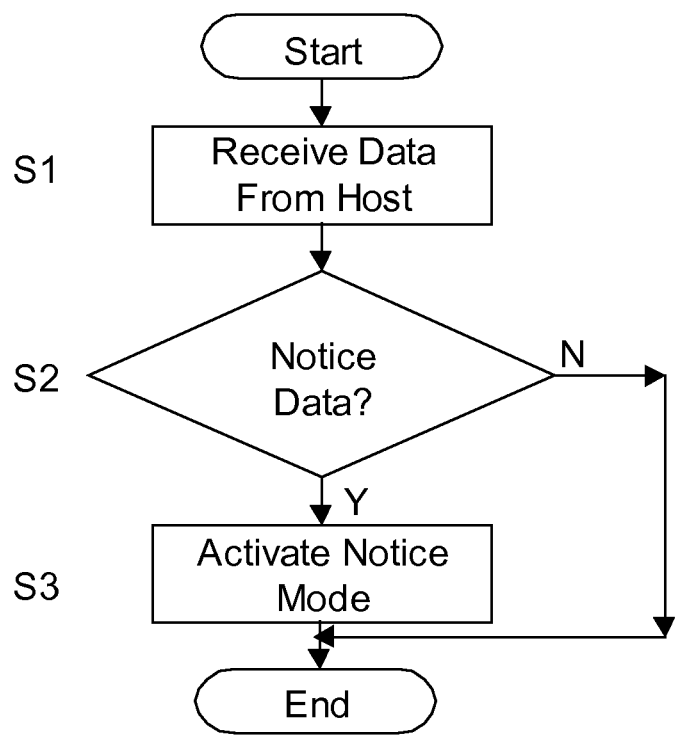
FIG. 52 is a flowchart illustrating an exemplary embodiment of the present invention.

As illustrated in FIG. 52, communication device 200 periodically monitors the data received from host H (not shown) (S1). If the data received is a notice data (S2), the notice mode is activated in the manner in compliance with the settings stored in setting data area 271 (FIG. 49) of RAM 206 (S3). In the example illustrated in FIG. 49, vibrator 217 (FIG. 1) is turned on, sound data J is emitted from speaker 216 (FIG. 1), and indicator 212 (FIG. 1) emits color M.

<<Stock Purchase—Summary>>

The foregoing invention may be summarized as the following.

A communication system consisting of a first computer and a second computer wherein said second computer is a wireless communication device including an antenna, a stock purchase data is input to said second computer, said first computer monitors one or more stock markets specified in said stock purchase data and sends a notice to said second computer, and said second computer responds in a specified manner upon receiving said notice from said antenna in a wireless fashion thereby enabling the user of said second computer to receive said notice regarding said stock purchase data in any location wherever he/she desires.

<<Timer Email>>

Figure 53A:
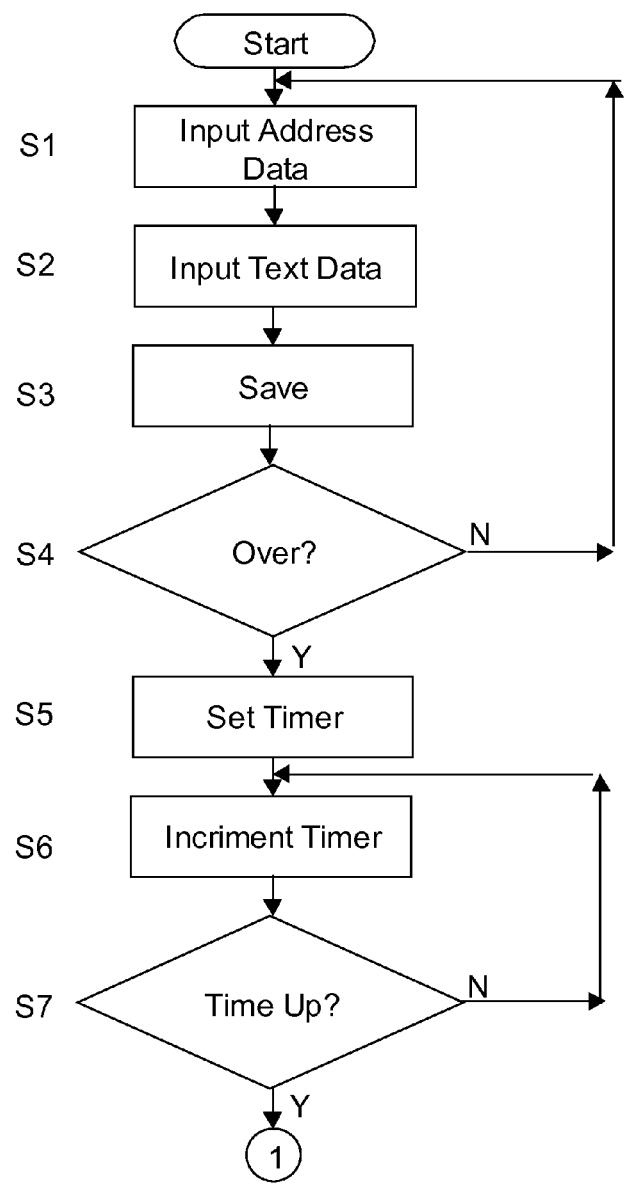
FIG. 53a is a flowchart illustrating an exemplary embodiment of the present invention.
Figure 53B:
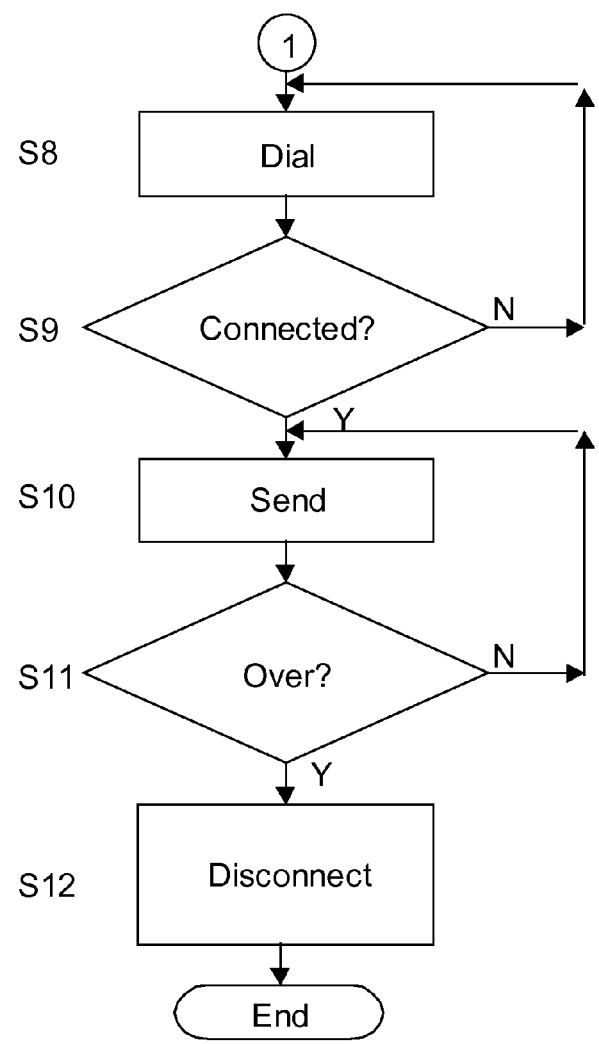
FIG. 53b is a flowchart illustrating an exemplary embodiment of the present invention.

FIGS. 53a and 53b illustrate the method of sending emails from communication device 200 (FIG. 1) by utilizing a timer.

Address data, i.e., email address is input by input device 210 or by voice recognition system explained in FIG. 3, FIG. 4, FIG. 5, FIG. 13, FIG. 14, FIG. 14a, FIG. 15, FIG. 16 and/or FIG. 17 (S1) and the text data, the text of the email message is input by the same manner (S2). The address data and the text data are automatically saved in RAM 206 (FIG. 1) (S3). The sequence of S1 through S3 is repeated (i.e., writing more than one email) until a specified input signal is input from input device 210 (FIG. 1) or by utilizing the voice recognition system explained above. Once inputting both the address data and the text data (which also includes numeric data, images and programs) are completed a timer (not shown) is set by input device 210 or by utilizing the voice recognition system (S5), and the timer is incremented periodically (S6) until the timer value equals the predetermined value specified in S5 (S7). A dialing process is continued (S8) until the line is connected (S9) and the text data are sent thereafter to email addresses specified in S1 (S10). All of the emails are sent (S11) and the line is disconnected thereafter (S12).

As another embodiment of the present invention a specific time may be input by input device 210 and send the text data on the specific time (i.e., a broad meaning of "timer").

<<Timer Email—Summary>>

The foregoing invention may be summarized as the following.

A communication device consisting of a text data input means which inputs one or more text data, a storage means which stores said text data, a sending means which sends said text data which is input by said input means, and a timer means which activates said sending means at a predetermined time wherein said text data input means input said text data, said storage means stores said text data input by said text data input means, said timer means activates said sending means at said predetermined time, and said sending means sends said text data at said predetermined time thereby enabling the user of said communication device to send said text data at said predetermined time at which said user is not able to send said text data.

<<Call Blocking>>

Figure 54:
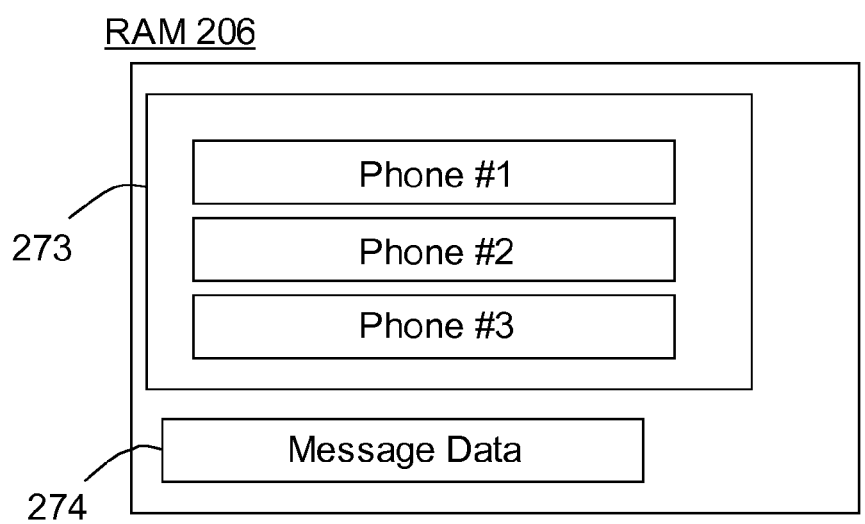
FIG. 54 is a block diagram illustrating an exemplary embodiment of the present invention.
Figure 55:
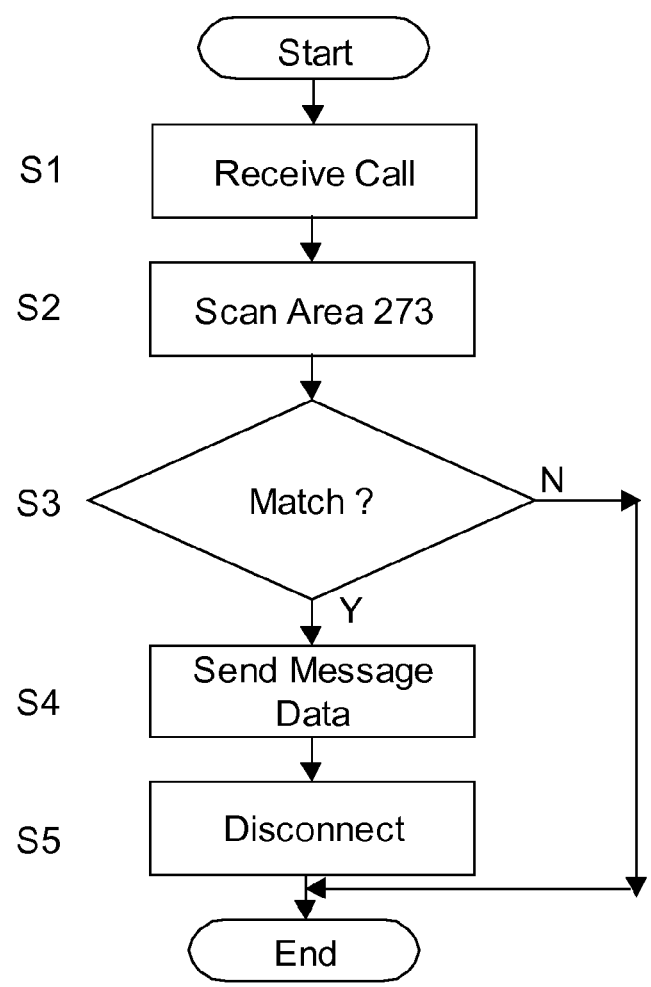
FIG. 55 is a flowchart illustrating an exemplary embodiment of the present invention.
Figure 56:
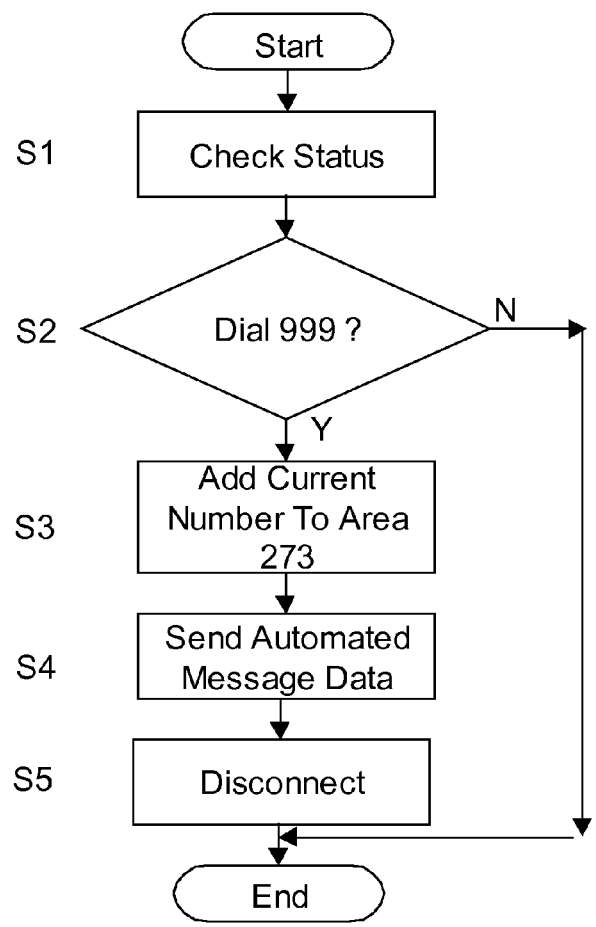
FIG. 56 is a flowchart illustrating an exemplary embodiment of the present invention.

FIGS. 54 through 56 illustrates the so-called "call blocking" function of communication device 200 (FIG. 1).

As illustrated in FIG. 54, RAM 206 (FIG. 1) includes area 273 and area 274. Area 273 stores phone numbers that should be blocked. In the example illustrated in FIG. 54, phone #1, phone #2, and phone #3 are blocked. Area 274 stores a message data, preferably a wave data, stating that the phone can not be connected.

FIG. 55 illustrates the operation of communication device 200. When communication device 200 receives a call (S1), CPU 211 (FIG. 1) scans area 273 (FIG. 54) of RAM 206 (S2). If the phone number of the incoming call matches one of the phone numbers stored in area 273 (S3), CPU 211 sends the message data stored in area 274 (FIG. 54) of RAM 206 to the caller device (S4) and disconnects the line (S5).

FIG. 56 illustrates the method of updating area 273 (FIG. 54) of RAM 206. Assuming that the phone number of the incoming call does not match any of the phone numbers stored in area 273 of RAM 206 (see S3 of FIG. 55). In that case, communication device 200 is connected to the caller device. However, the user of communication device 200 may decide to have such number "blocked" after all. If that is the case, the user dials "999" while the line is connected. Technically CPU 211 (FIG. 1) periodically checks the signals input from input device 210 (FIG. 1) (S1). If the input signal represents a numerical data "999" from input device 210 (S2), CPU 211 adds the phone number of the pending call to area 273 (S3) and sends the message data stored in area 274 (FIG. 54) of RAM 206 to the caller device (S4). The line is disconnected thereafter (S5).

Figure 57:
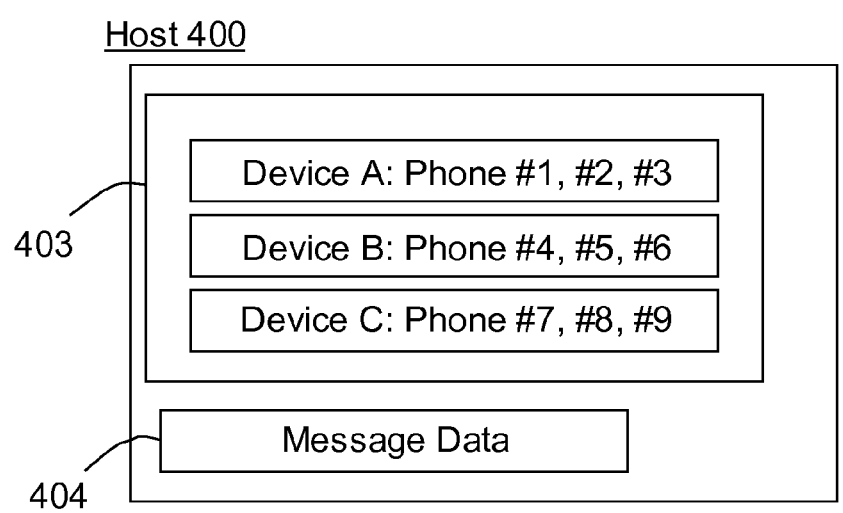
FIG. 57 is a block diagram illustrating an exemplary embodiment of the present invention.
Figure 58:
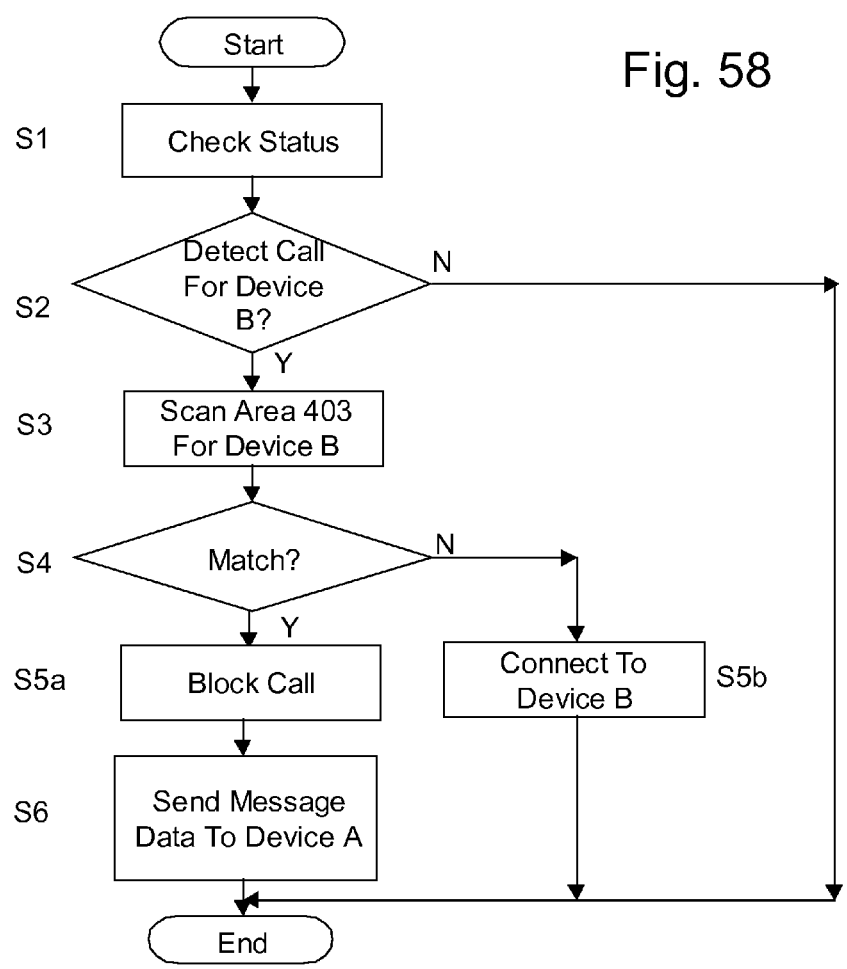
FIG. 58 is a flowchart illustrating an exemplary embodiment of the present invention.
Figure 59:
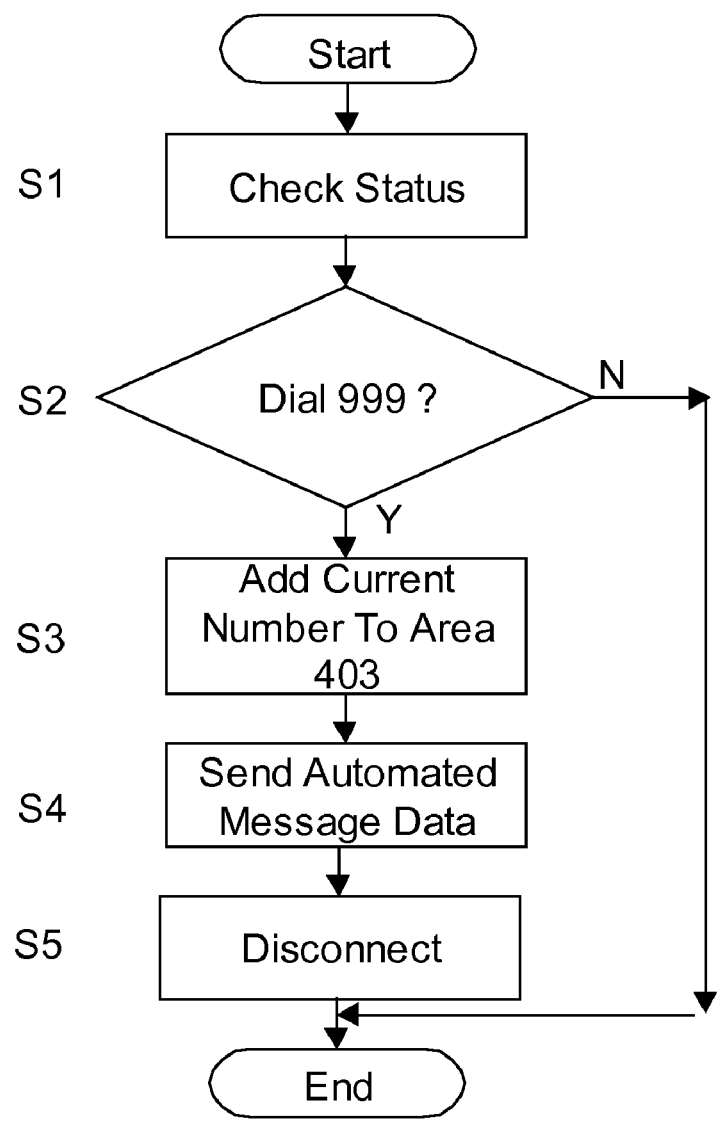
FIG. 59 is a flowchart illustrating an exemplary embodiment of the present invention.

FIGS. 57 through 59 illustrate another embodiment of the present invention.

As illustrated in FIG. 57, host H (not shown) includes area 403 and area 404. Area 403 stores phone numbers that should be blocked to be connected to communication device 200. In the example illustrated in FIG. 57, phone #1, phone #2, and phone #3 are blocked for device A; phone #4, phone #5, and phone #6 are blocked for device B; and phone #7, phone #8, and phone #9 are blocked for device C. Area 404 stores a message data stating that the phone can not be connected.

FIG. 58 illustrates the operation of host H (not shown). Assuming that the caller device is attempting to connect to device B, communication device. Host H periodically checks the signals from all communication device 200 (S1). If host H detects a call for device B (S2), it scans area 403 (FIG. 57) (S3) and checks whether the phone number of the incoming call matches one of the phone numbers stored therein for device B (S4). If the phone number of the incoming call does not match any of the phone numbers stored in area 403, the line is connected to device B (S5b). On the other hand, if the phone number of the incoming call matches one of the phone numbers stored in area 403, the line is "blocked," i.e., not connected to device B (S5a) and host H sends the massage data stored in area 404 (FIG. 57) to the caller device (S6).

FIG. 59 illustrates the method of updating area 403 (FIG. 57) of host H. Assuming that the phone number of the incoming call does not match any of the phone numbers stored in area 403 (see S4 of FIG. 58). In that case, host H allows the connection between the caller device and communication device 200, however, the user of communication device 200 may decide to have such number "blocked" after all. If that is the case, the user simply dials "999" while the line is connected. Technically host H (FIG. 57) periodically checks the signals input from input device 210 (FIG. 1) (S1). If the input signal represents "999" from input device 210 (FIG. 1) (S2), host H adds the phone number of the pending call to area 403 (S3) and sends the message data stored in area 404 (FIG. 57) to the caller device (S4). The line is disconnected thereafter (S5).

As another embodiment of the method illustrated in FIG. 59, host H (FIG. 57) may delegate some of its tasks to communication device 200 (this embodiment is not shown in drawings). Namely, communication device 200 periodically checks the signals input from input device 210 (FIG. 1). If the input signal represents a numeric data "999" from input device 210, communication device 200 sends to host H a block request signal as well as with the phone number of the pending call. Host H, upon receiving the block request signal from communication device 200, adds the phone number of the pending call to area 403 (FIG. 57) and sends the message data stored in area 404 (FIG. 57) to the caller device. The line is disconnected thereafter.

<<Call Blocking—Summary>>

The foregoing invention may be summarized as the following.

(1) A communication system consisting of a communication device and a blocked number storage means wherein an incoming call is prevented from being connected to said communication device if the phone number of said incoming call is included in said blocked number storage means thereby preventing the user of said communication device from being disturbed from unnecessary calls.

(2) A communication system consisting of a communication device and a blocked number storage means wherein a pending call is disconnected from said communication device if a predetermined signal is input to said communication device and the phone number of said pending call is included in said blocked number storage means thereby preventing the user of said communication device from being disturbed from unnecessary calls.

<<Online Payment>>

FIGS. 60 through 64 illustrate the method of online payment by utilizing communication device 200 (FIG. 1).

Figure 60:
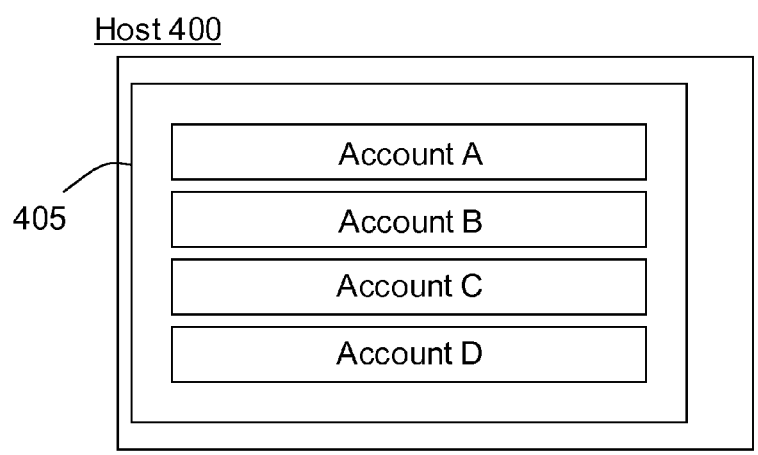
FIG. 60 is a block diagram illustrating an exemplary embodiment of the present invention.

As illustrated in FIG. 60, host H includes account data storage area 405. All of the account data of the users of communication device 200 who have signed up for the online payment service are stored in area 405. In the example described in FIG. 60, account A stores the relevant account data of the user using device A; account B stores the relevant account data of the user using device B; account C stores the relevant account data of the user using device C; and account D stores the relevant account data of the user using device D. Here, device A, B, C, and D are communication device 200.

Figure 61A:
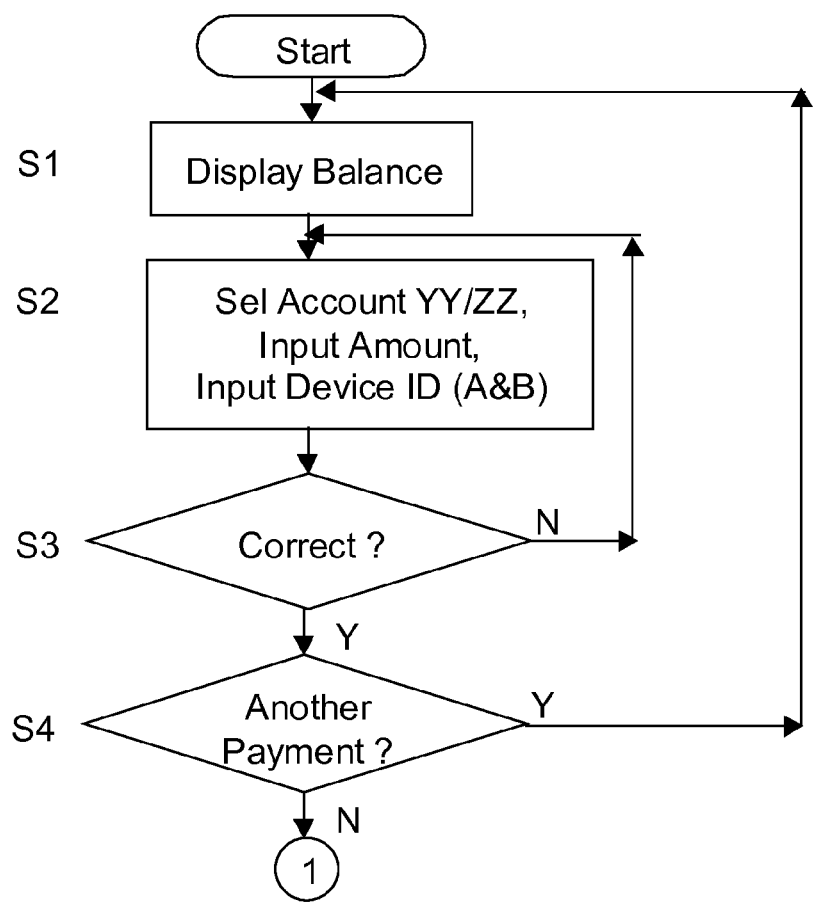
FIG. 61a is a flowchart illustrating an exemplary embodiment of the present invention.
Figure 61B:
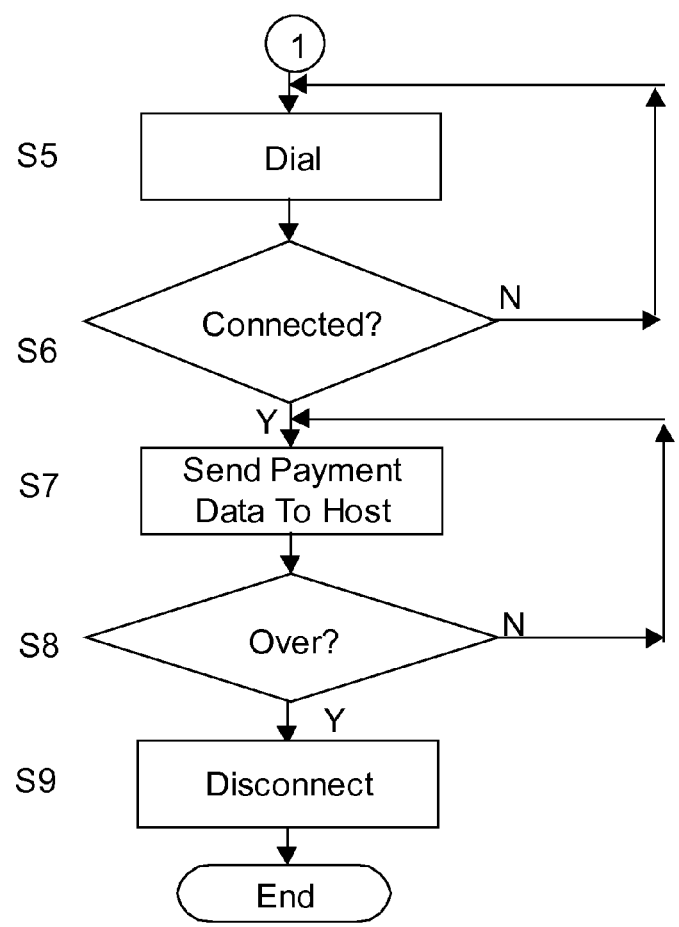
FIG. 61b is a flowchart illustrating an exemplary embodiment of the present invention.

FIGS. 61a and 61b illustrate the operation of the payer device, communication device 200. Assuming that device A is the payer device and device B is the payee device. Account A explained in FIG. 60 stores the account data of the user of device A, and account B explained in the same drawing stores the account data of the user of device B. As illustrated in FIG. 61a, LCD 201 (FIG. 1) of device A displays the balance of account A by receiving the relevant data from host H (FIG. 60) (S1). From the signal input from input device 210 (FIG. 1), the payer's account and the payee's account are selected (in the present example, account A as the payer's account and account B as the payee's account are selected), and the amount of payment and the device ID (in the present example, device A as the payer's device and device B as the payee's device) are input via input device 210 (S2). If the data input from input device 210 is correct (S3), CPU 211 (FIG. 1) of device A prompts for other payments. If there are other payments to make, the sequence of S1 through S3 is repeated until all of the payments are made (S4). The dialing process is initiated and repeated thereafter (S5) until the line is connected to host H (FIG. 60) (S6). Once the line is connected, device A sends the payment data to host H (S7). The line is disconnected when all of the payment data including the data produced in S2 are sent to host H (S8 and S9).

Figure 62:
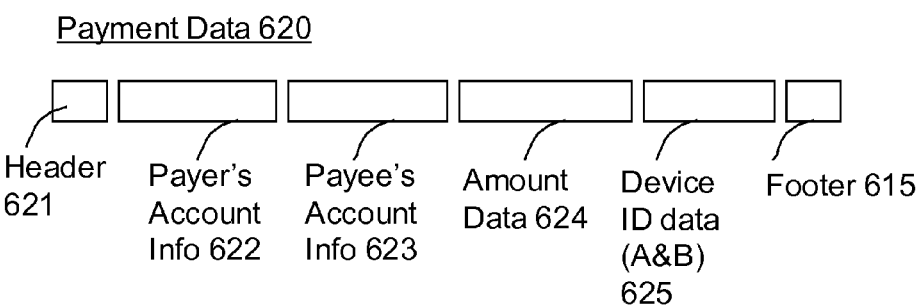
FIG. 62 is a simplified illustration illustrating an exemplary embodiment of the present invention.

FIG. 62 illustrates the payment data described in S7 of FIG. 61b. Payment data 620 is composed of header 621, payer's account information 622, payee's account information 623, amount data 624, device ID data 625, and footer 615. Payer's account information 622 represents the information regarding the payer's account data stored in host H (FIG. 60) which is, in the present example, account A. Payee's account information 623 represents the information regarding the payee's account data stored in host H which is, in the present example, account B. Amount data 624 represents the amount of monetary value either in the U.S. dollars or in other currencies which is to be transferred from the payer's account to the payee's account. The device ID data represents the data of the payer's device and the payee's device, i.e., in the present example, device A and device B.

Figure 63:
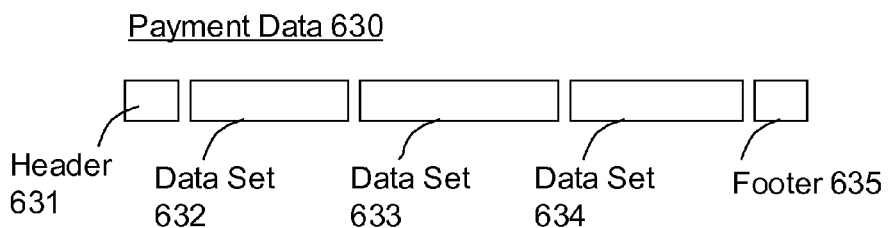
FIG. 63 is a simplified illustration illustrating an exemplary embodiment of the present invention.

FIG. 63 illustrates the basic structure of the payment data described in S7 of FIG. 61b when multiple payments are made, i.e., when more than one payment is made in S4 of FIG. 61a. Assuming that three payments are made in S4 of FIG. 61a. In that case, payment data 630 is composed of header 631, footer 635, and three data sets, i.e., data set 632, data set 633, data set 634. Each data set represents the data components described in FIG. 62 excluding header 621 and footer 615.

Figure 64:
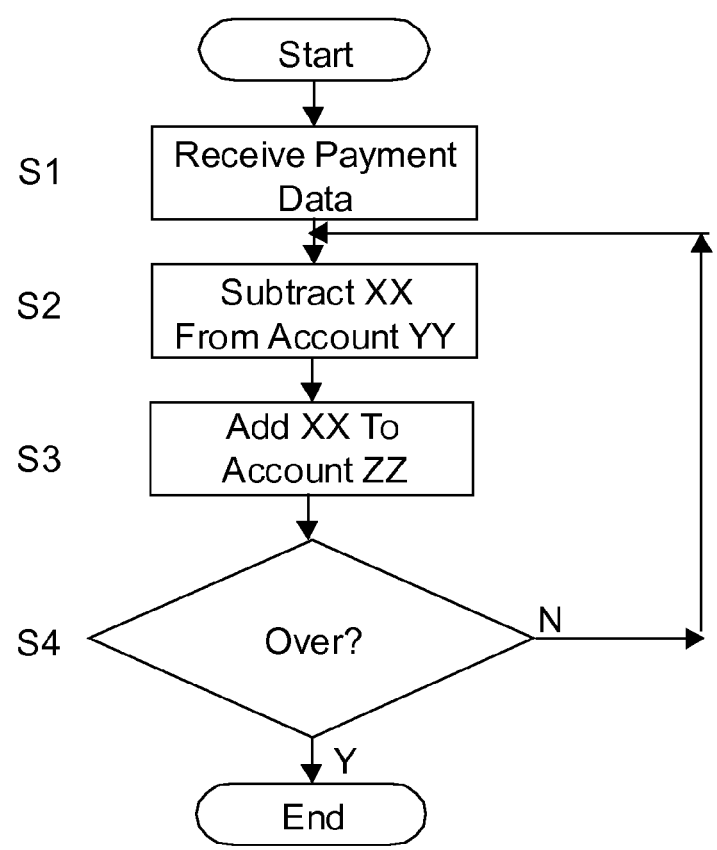
FIG. 64 is a flowchart illustrating an exemplary embodiment of the present invention.

FIG. 64 illustrates the operation of host H (FIG. 60). After receiving payment data from device A described in FIGS. 62 and 63, host H retrieves therefrom the payer's account information (in the present example account A), the payee's account information (in the present example account B), the amount data which represents the monetary value, and the device IDs of both the payer's device and the payee's device (in the present example device A and device B) (S1). Host H, based on such data, subtracts the monetary value represented by the amount data from the payer's account (in the present example account A) (S2), and adds the same amount to the payee's account (in the present example account B) (S3). If there are other payments to make, i.e., if host H received a payment data which has a structure of the one described in FIG. 63, the sequence of S2 and S3 is repeated as many times as the amount of the data sets are included in such payment data.

<<Online Payment—Summary>>

The foregoing invention may be summarized as the following.

An online payment system consisting of a host and a first device and a second device wherein said host and said first device are connected in a wireless fashion; said host and said second device are also connected in a wireless fashion; said host stores a first account data of said first device and a second account data of said second device; a payment data which includes an amount data representing monetary value, said first account data, and said second account data is input into said first device; said payment data is sent to said host in a wireless fashion; and said host subtracts the value represented by said amount data from said first account data and adds the same value to said second account data thereby enables the users of said first device and said second device to initiate transactions and payments at any location wherever they desire <<Navigation System>>

FIGS. 65 through 74 illustrate the navigation system of communication device 200 (FIG. 1).

Figure 65:
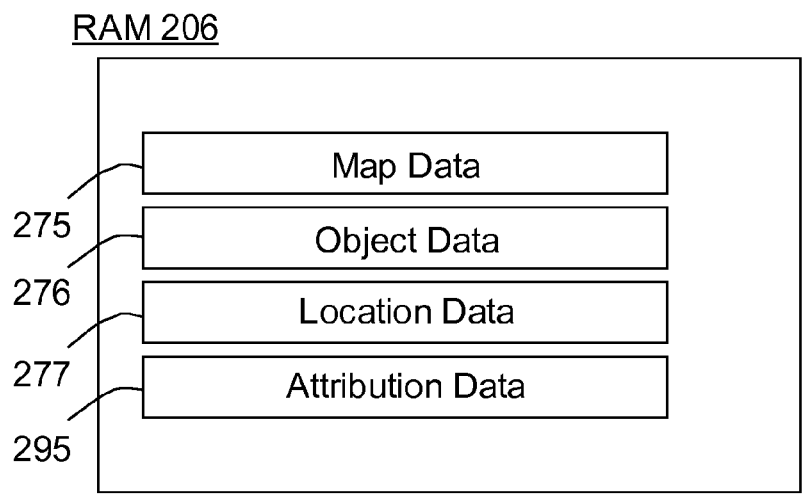
FIG. 65 is a block diagram illustrating an exemplary embodiment of the present invention.

As illustrated in FIG. 65, RAM 206 (FIG. 1) includes area 275, area 276, area 277, and area 295. Area 275 stores a plurality of map data, two-dimensional (2D) image data, which are designed to be displayed on LCD 201 (FIG. 1). Area 276 stores a plurality of object data, three-dimensional (3D) image data, which are also designed to be displayed on LCD 201. The object data are primarily displayed by a method so-called "texture mapping" which is explained in details hereinafter. Here, the object data include the three-dimensional data of various types of objects that are displayed on LCD 201, such as bridges, houses, hotels, motels, inns, gas stations, restaurants, streets, traffic lights, street signs, trees, etc. Area 277 stores a plurality of location data, i.e., data representing the locations of the objects stored in area 276. Area 277 also stores a plurality of data representing the street address of each object stored in area 276. In addition, area 277 stores the current position data of communication device 200 and the destination data which are explained in details hereafter. The map data stored in area 275 and the location data stored in area 277 are linked each other. Area 295 stores a plurality of attribution data attributing to the map data stored in area 275 and location data stored in area 277, such as road blocks, traffic accidents, and road constructions, and traffic jams. The attribution data stored in area 295 is updated periodically by receiving an updated data from a host (not shown).

Figure 66:
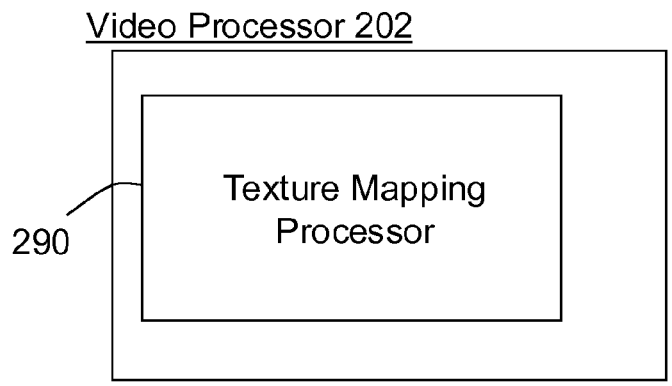
FIG. 66 is a block diagram illustrating an exemplary embodiment of the present invention.

As illustrated in FIG. 66, video processor 202 (FIG. 1) includes texture mapping processor 290. Texture mapping processor 290 produces polygons in a three-dimensional space and "pastes" textures to each polygon. The concept of such method is described in the following patents. U.S. Pat. No. 5,870,101, U.S. Pat. No. 6,157,384, U.S. Pat. No. 5,774,125, U.S. Pat. No. 5,375,206, and/or U.S. Pat. No. 5,925,127.

Figure 67:
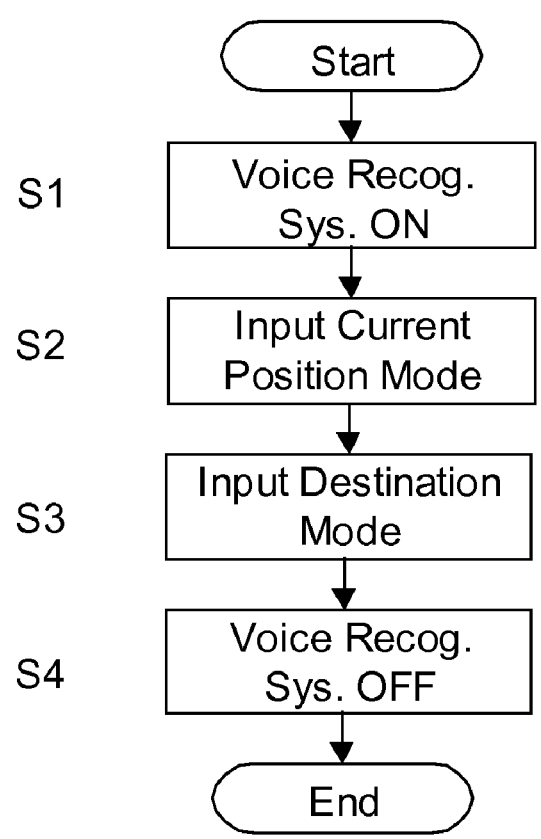
FIG. 67 is a flowchart illustrating an exemplary embodiment of the present invention.

As illustrated in FIG. 67, the voice recognition system is activated when the CPU 211 (FIG. 1) detects a specific signal input from input device 210 (FIG. 1) (S1). After the voice recognition system is activated, the input current position mode starts and the current position of communication device 200 is input by voice recognition system explained in FIG. 3, FIG. 4, FIG. 5, FIG. 13, FIG. 14, FIG. 14a, FIG. 15, FIG. 16 and/or FIG. 17 (S2). The current position can also be input from input device 210. As another embodiment of the present invention, the current position can automatically be detected by the method so-called "global positioning system" or "GPS" as illustrated in FIGS. 20a through 26 and input the current data therefrom. After the process of inputting the current data is completed, the input destination mode starts and the destination is input by the voice recognition system explained above or by the input device 210 (S3), and the voice recognition system is deactivated after the process of inputting the destination data is completed by utilizing such system (S4).

Figure 68:
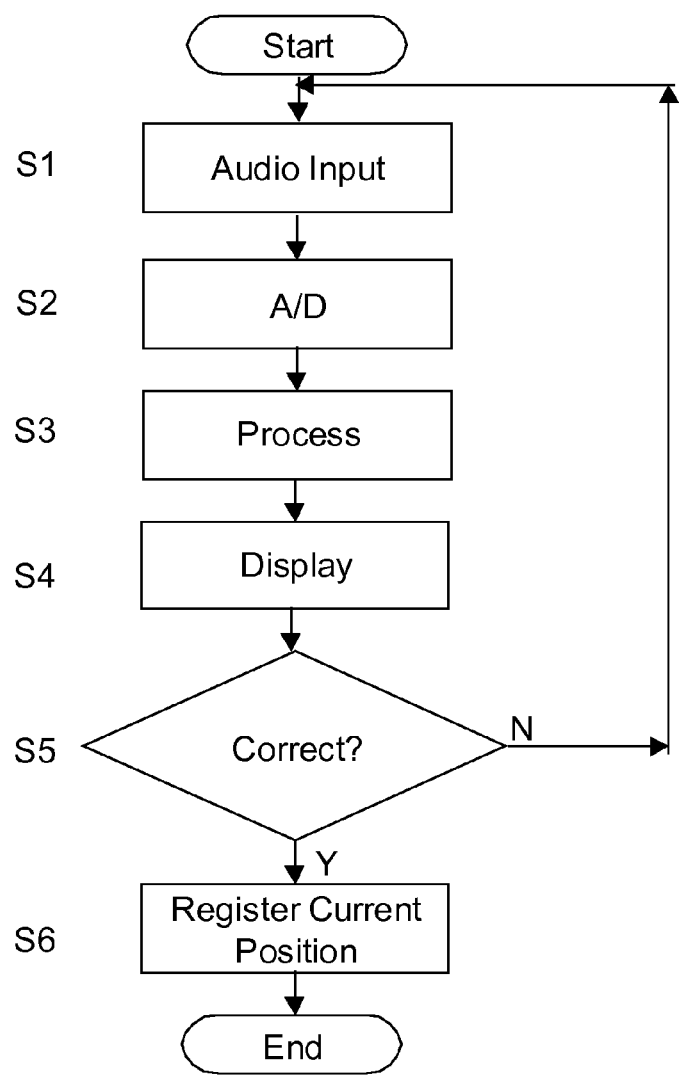
FIG. 68 is a flowchart illustrating an exemplary embodiment of the present invention.

FIG. 68 illustrates the sequence of the input current position mode described in S2 of FIG. 67. When analog audio data is input from microphone 215 (FIG. 1) (S1), such data is converted into digital audio data by A/D 213 (FIG. 1) (S2). The digital audio data is processed by sound processor 205 (FIG. 1) to retrieve text and numeric data therefrom (S3). The retrieved data is displayed on LCD 201 (FIG. 1) (S4). The data can be corrected by repeating the sequence of S1 through S4 until the correct data is displayed (S5). If the correct data is displayed, such data is registered as current position data (S6). As stated above, the current position data can be input manually by input device 210 (FIG. 1) and/or can be automatically input by utilizing the method so-called "global positioning system" or "GPS" as described hereinbefore.

Figure 69:
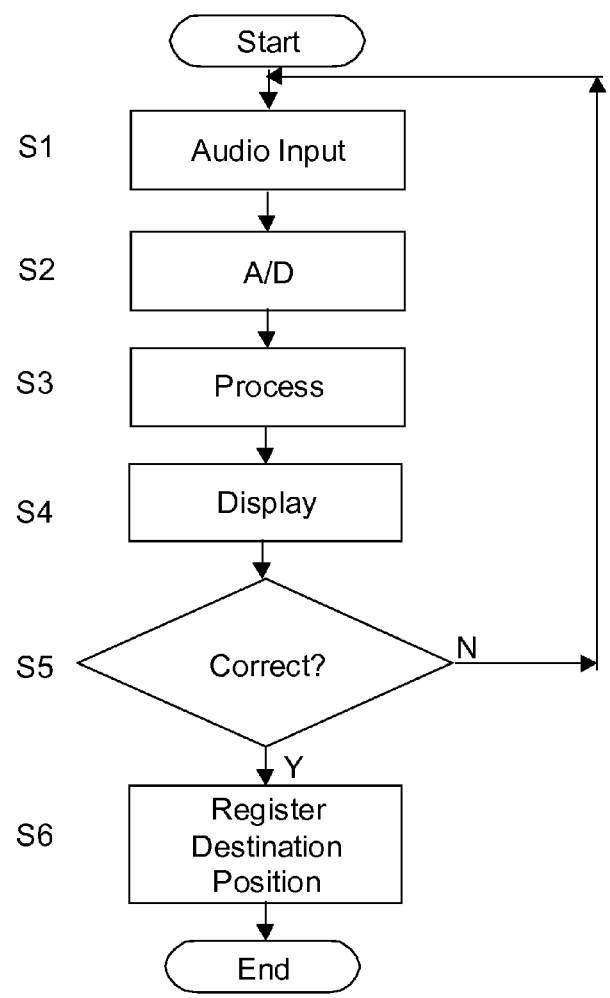
FIG. 69 is a flowchart illustrating an exemplary embodiment of the present invention.

FIG. 69 illustrates the sequence of the input destination mode described in S3 of FIG. 67. When analog audio data is input from microphone 215 (FIG. 1) (S1), such data is converted into digital audio data by A/D 213 (FIG. 1) (S2). The digital audio data is processed by sound processor 205 (FIG. 1) to retrieve text and numeric data therefrom (S3). The retrieved data is displayed on LCD 201 (FIG. 1) (S4). The data can be corrected by repeating the sequence of S1 through S4 until the correct data is displayed on LCD 201 (S5). If the correct data is displayed, such data is registered as destination data (S6).

Figure 70:
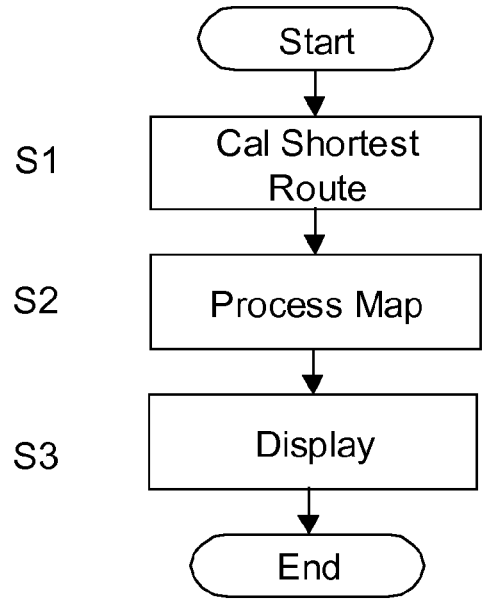
FIG. 70 is a flowchart illustrating an exemplary embodiment of the present invention.

FIG. 70 illustrates the sequence of displaying the shortest route from the current position to the destination. CPU 211 (FIG. 1) retrieves both the current position data and the destination data which are input by the method described in FIGS. 67 through 69 from area 277 (FIG. 65) of RAM 206 (FIG. 1). By utilizing the location data of streets, bridges, traffic lights and other relevant data, CPU 211 calculates the shortest route to the destination (S1). CPU 211 then retrieves the relevant two-dimensional map data which should be displayed on LCD 201 from area 275 (FIG. 65) of RAM 206 (S2).

As another embodiment of the present invention, by way of utilizing the location data stored in area 277, CPU 211 may produce a three-dimensional map by composing the three dimensional objects (by method so-called "texture mapping" as described above) which are stored in area 276 (FIG. 65) of RAM 206. The two-dimensional map and/or the three dimensional map is displayed on LCD 201 (FIG. 1) (S3).

As another embodiment of the present invention, the attribution data stored in area 295 (FIG. 65) of RAM 206 may be utilized. Namely if any road block, traffic accident, road construction, and/or traffic jam is included in the shortest route calculated by the method mentioned above, CPU 211 (FIG. 1) calculates the second shortest route to the destination. If the second shortest route still includes road block, traffic accident, road construction, and/or traffic jam, CPU 211 calculates the third shortest route to the destination. CPU 211 calculates repeatedly until the calculated route does not include any road block, traffic accident, road construction, and/or traffic jam. The shortest route to the destination is highlighted by a significant color (such as red) to enable the user of communication device 200 to easily recognize such route on LCD 201 (FIG. 1).

As another embodiment of the present invention, an image which is similar to the one which is observed by the user in the real world may be displayed on LCD 201 (FIG. 1) by utilizing the three-dimensional object data. In order to produce such image, CPU 211 (FIG. 1) identifies the present location and retrieves the corresponding location data from area 277 (FIG. 65) of RAM 206. Then CPU 211 retrieves a plurality of object data which correspond to such location data from area 276 (FIG. 65) of RAM 206 and displays a plurality of objects on LCD 201 based on such object data in a manner the user of communication device 200 may observe from the current location.

Figure 71:
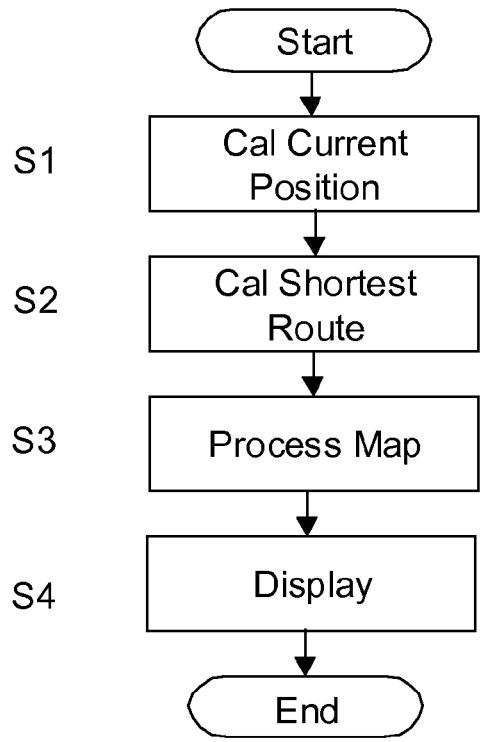
FIG. 71 is a flowchart illustrating an exemplary embodiment of the present invention.

FIG. 71 illustrates the sequence of updating the shortest route to the destination while communication device 200 is moving. By way of periodically and automatically inputting the current position by the method so-called "global positioning system" or "GPS" as described hereinbefore, the current position is continuously updated (S1). By utilizing the location data of streets and traffic lights and other relevant data, CPU 211 (FIG. 1) recalculates the shortest route to the destination (S2). CPU 211 then retrieves the relevant two-dimensional map data which should be displayed on LCD 201 from area 275 (FIG. 65) of RAM 206 (S3). Instead, by way of utilizing the location data stored in area 277 (FIG. 65), CPU 211 may produce a three-dimensional map by composing the three dimensional objects by method so-called "texture mapping" which are stored in area 276 (FIG. 65) of RAM 206. The two-dimensional map and/or the three-dimensional map is displayed on LCD 201 (FIG. 1) (S4). The shortest route to the destination is re-highlighted by a significant color (such as red) to enable the user of communication device 200 to easily recognize the updated route on LCD 201.

Figure 72:
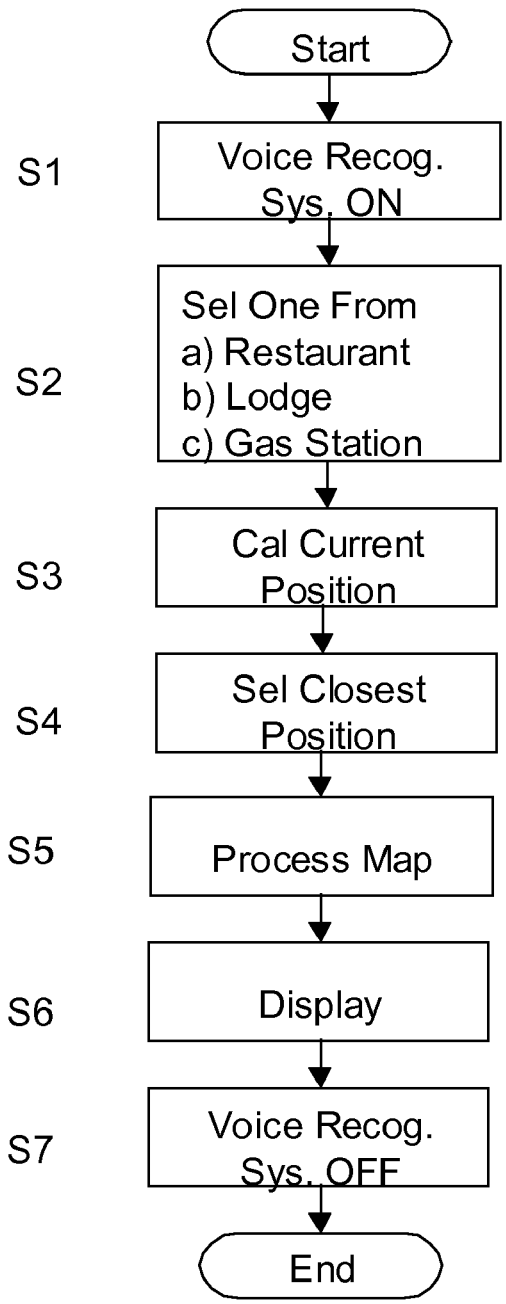
FIG. 72 is a flowchart illustrating an exemplary embodiment of the present invention.

FIG. 72 illustrates the method of finding the shortest location of the desired facility, such as restaurant, hotel, gas station, etc. The voice recognition system is activated in the manner described in FIG. 67 (S1). By way of utilizing the voice recognition system, a certain type of facility is selected from the options displayed on LCD 201 (FIG. 1). The prepared options can be a) restaurant, b) lodge, and c) gas station (S2). Once one of the options is selected, CPU 211 (FIG. 1) calculates and inputs the current position by the method described in FIG. 68 and/or FIG. 71 (S3). From the data selected in S2, CPU 211 scans area 277 (FIG. 65) of RAM 206 and searches the location of the facilities of the selected category (such as restaurant) which is the closest to the current position (S4). CPU 211 then retrieves the relevant two-dimensional map data which should be displayed on LCD 201 from area 275 of RAM 206 (FIG. 65) (S5). Instead, by way of utilizing the location data stored in 277 (FIG. 65), CPU 211 may produce a three-dimensional map by composing the three dimensional objects by method so-called "texture mapping" which are stored in area 276 (FIG. 65) of RAM 206. The two-dimensional map and/or the three dimensional map is displayed on LCD 201 (FIG. 1) (S6). The shortest route to the destination is re-highlighted by a significant color (such as red) to enable the user of communication device 200 to easily recognize the updated route on LCD 201. The voice recognition system is deactivated thereafter (S7).

Figure 73:
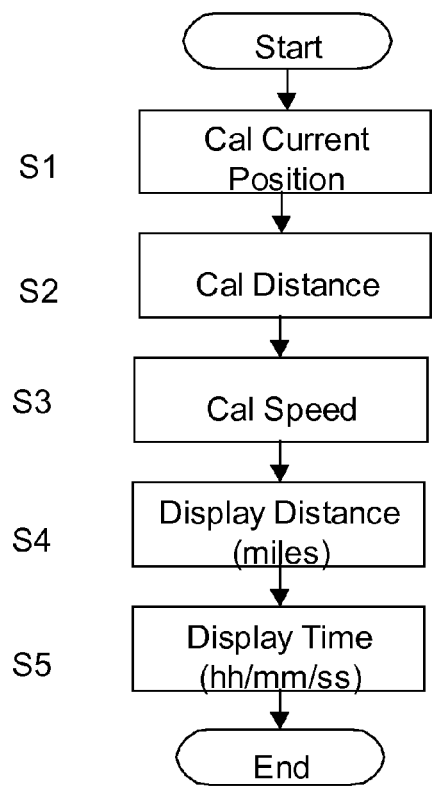
FIG. 73 is a flowchart illustrating an exemplary embodiment of the present invention.

FIG. 73 illustrates the method of displaying the time and distance to the destination. As illustrated in FIG. 73, CPU 211 (FIG. 1) calculates the current position wherein the source data can be input from the method described in FIG. 68 and/or FIG. 71 (S1). The distance is calculated from the method described in FIG. 70 (S2). The speed is calculated from the distance which communication device 200 has proceeded within specific period of time (S3). The distance to the destination and the time left are displayed on LCD 201 (FIG. 1) (S4 and S5).

Figure 74:
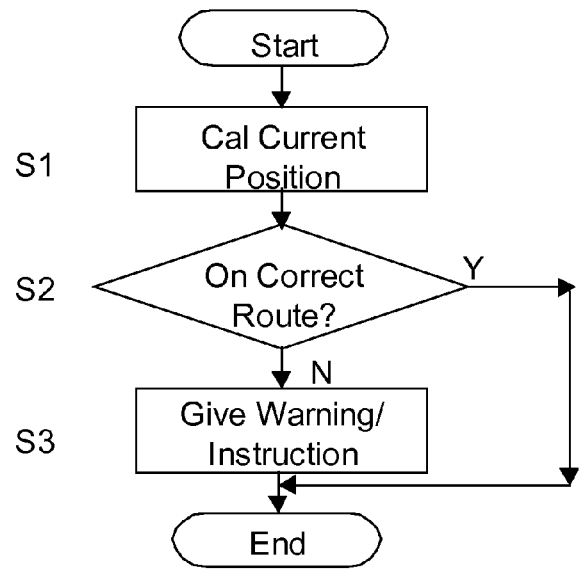
FIG. 74 is a flowchart illustrating an exemplary embodiment of the present invention.

FIG. 74 illustrates the method of warning and giving instructions when the user of communication device 200 deviates from the correct route. By way of periodically and automatically inputting the current position by the method so-called "global positioning system" or "GPS" as described hereinbefore, the current position is continuously updated (S1). If the current position deviates from the correct route (S2), a warning is given from speaker 216 (FIG. 1) and/or LCD 201 (FIG. 1) (S3). The method described in FIG. 74 is repeated for certain period of time. If the deviation still exists after such period of time has passed, CPU 211 (FIG. 1) initiates the sequence described in FIG. 70 and calculates the shortest route to the destination and display on LCD 201. The details of such sequence is as same as the one explained in FIG. 70.

Figure 74A:
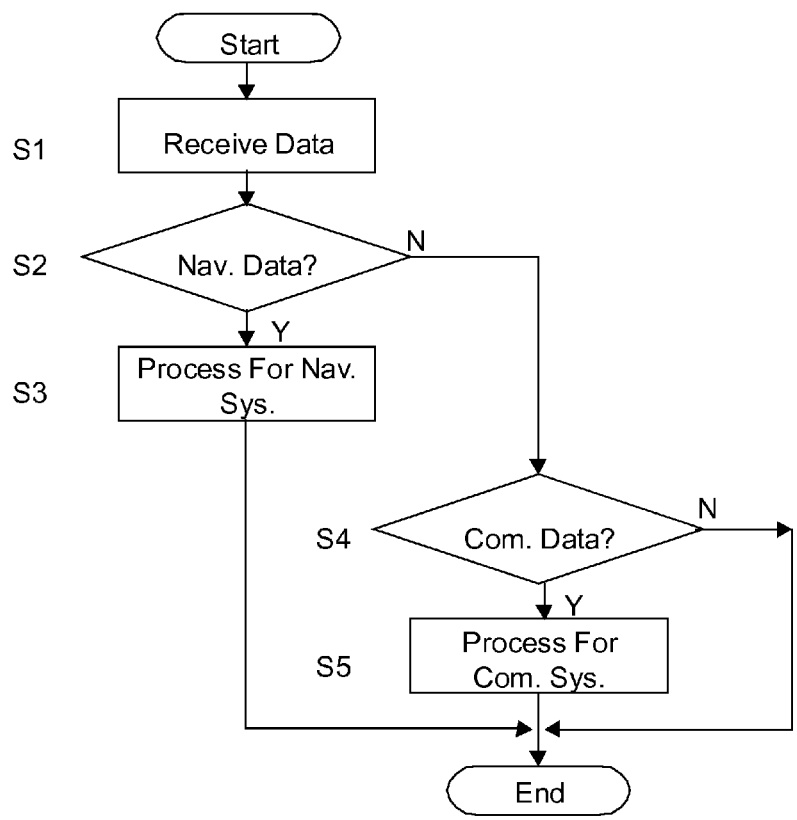
FIG. 74a is a flowchart illustrating an exemplary embodiment of the present invention.

FIG. 74*a* illustrates the overall operation of communication device 200 regarding the navigation system and the communication system. When communication device 200 receives data from antenna 218 (FIG. 1) (S1), CPU 211 (FIG. 1) determines whether the data is navigation data, i.e., data necessary to operate the navigation system (S2). If the data received is a navigation data the navigation system described in FIGS. 67 through 74 is performed (S3). On the other hand, if the data received is a communication data (S4), the communication system, i.e., the system necessary for wireless communication which is mainly described in FIG. 1 is performed (S5).

<<Navigation System—Summary>>

The foregoing inventions may be summarized as the following.

(1) A GPS navigation device consisting of a display, a microphone, a GPS navigation system which identifies the present location of said GPS navigation device, and a voice recognition system which retrieves a text and numeric data from an analog audio input from said microphone wherein said analog audio is input to said microphone, said voice recognition system retrieves said text and numeric data from said analog audio, said text and numeric data is input to said GPS navigation system thereby enabling the user of said GPS navigation device to input necessary data therein without using his/her hands and/or without physically contacting said GPS navigation device and utilizing said GPS navigation system.

(2) A communication device consisting of a GPS navigation system, a wireless communication system, and an antenna wherein said antenna receives navigation data which is necessary to operate said GPS navigation system, and said antenna also receives communication data which is necessary to operate said wireless communication system thereby enabling said communication device to be compact and also enabling the user of said communication device to find directions by utilizing said GPS navigation system as well as using said wireless communication system.

(3) A GPS navigation device consisting of a display means, a navigation system which identifies the present location of said GPS navigation device, a storage means which stores a plurality of object data which is a three-dimensional data of object that is displayed on said display means and a plurality of location data which represents the location of said object wherein based on a specific information produced by said navigation system a specific location data is selected from said storage means, a plurality of said object data which corresponds to said location data is retrieved from said storage means, and said plurality of said object data is displayed on said display means in a manner the user of said GPS navigation device observes from the current location of said GPS navigation device thereby enables said user of said GPS navigation device to have a realistic view from said current location on said display means.

(4) A GPS navigation device consisting of a display means, a navigation system which identifies the shortest route'from a first location to a second location, a storage means which stores a plurality of location data which is categorized in one or more groups wherein when a certain group is selected, said navigation system retrieves a plurality of location data pertaining to said certain group, and identifies the shortest route to one of the location data pertaining to said certain group thereby enables the user of said GPS navigation device to take the shortest route from said user's present location to the location of said certain group.

(5) A GPS navigation device consisting of a display means, a navigation system which identifies the shortest route from a first location to a second location, a storage means which stores a plurality of attribution data wherein said shortest route is calculated by referring to said plurality of attribution data thereby enabling the user of said GPS navigation device to reach said second location within shorter period time by way of avoiding road blocks, traffic accidents, road constructions, and traffic jams.

<<Remote Controlling System>>

FIGS. 75 through 83 illustrate the remote controlling system utilizing communication device 200 (FIG. 1).

Figure 75:
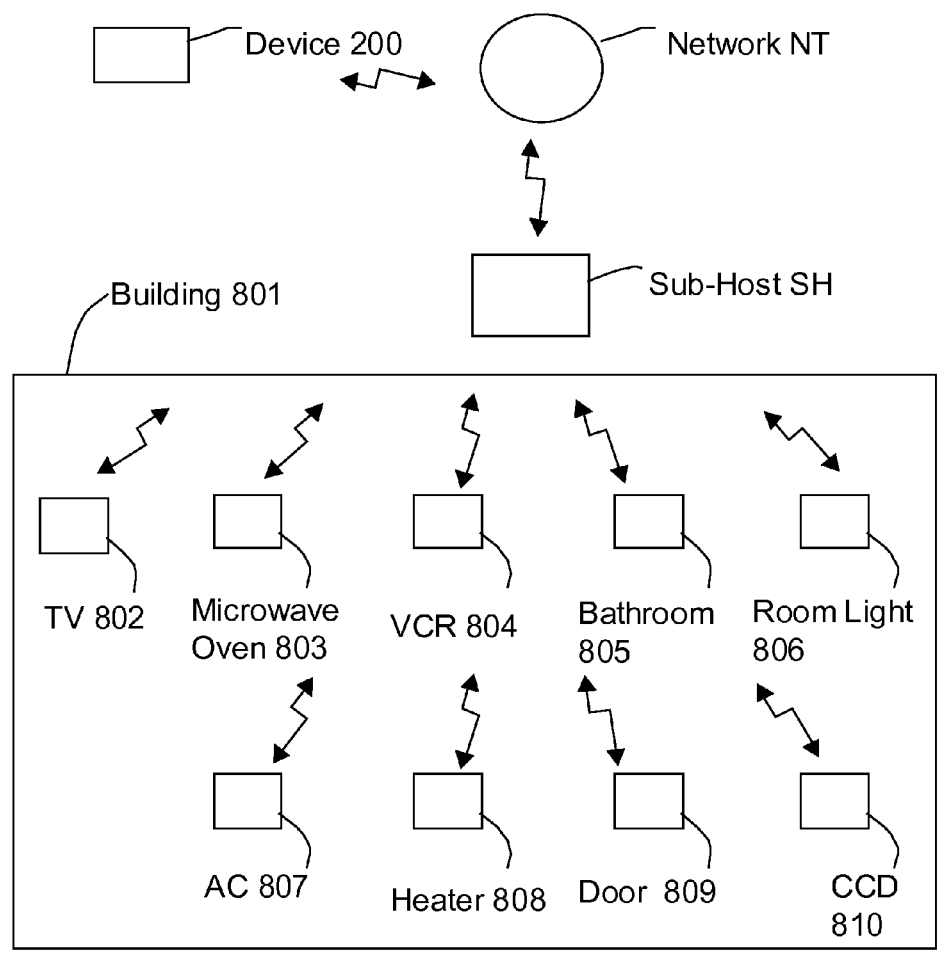
FIG. 75 is a simplified illustration illustrating an exemplary embodiment of the present invention.

As illustrated in FIG. 75, communication device 200 is connected to network NT. Network NT may be the internet or have the same or similar structure described in FIG. 2a, FIG. 2b and/or FIG. 2c except "device B" is substituted to "sub-host SH" in these drawings. Network NT is connected to sub-host SH in a wireless fashion. Sub-host SH administers various kinds of equipment installed in building 801, such as TV 802, microwave oven 803, VCR 804, bathroom 805, room light 806, AC 807, heater 808, door 809, and CCD camera 810. Communication device 200 transfers a control signal to sub-host SH via network NT, and sub-host SH controls the selected equipment based on the control signal.

Figure 76:
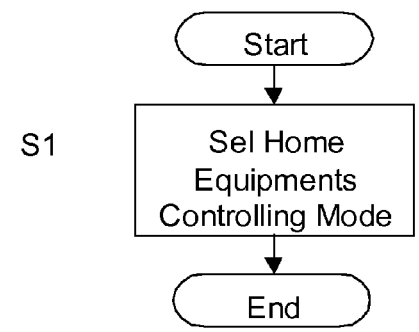
FIG. 76 is a flowchart illustrating an exemplary embodiment of the present invention.

As illustrated in FIG. 76, communication device 200 is enabled to perform the remote controlling system when the device is set to the home equipment controlling mode. Once communication device 200 is set to the home equipment controlling mode, LCD 201 (FIG. 1) displays all pieces of equipment which are remotely controllable by communication device 200. Each equipment can be controllable by the following method.

Figure 77:
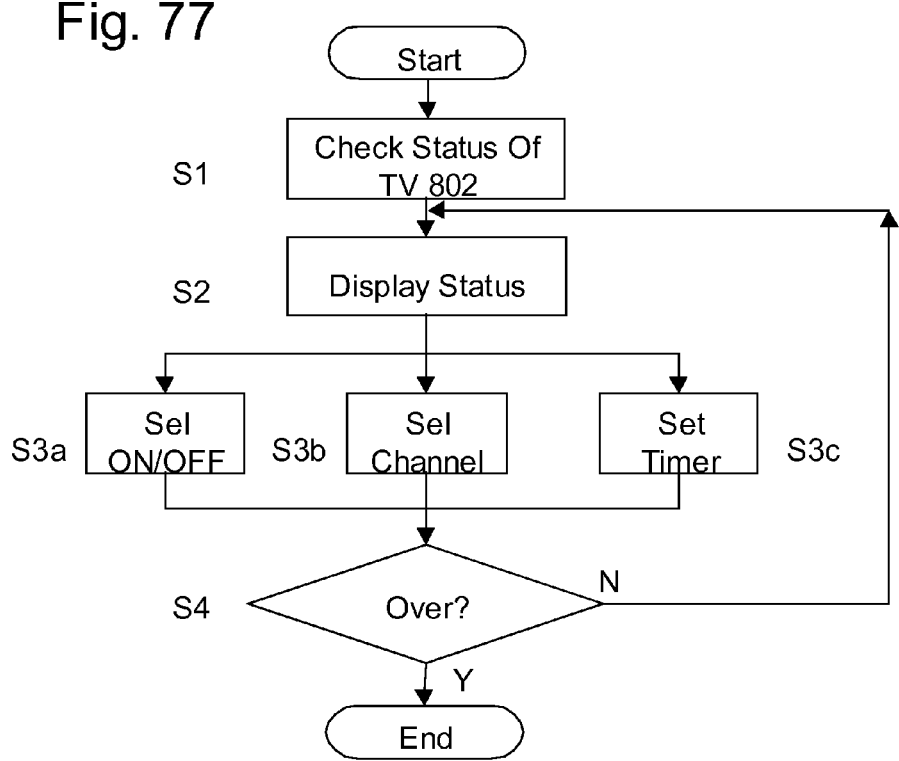
FIG. 77 is a flowchart illustrating an exemplary embodiment of the present invention.

FIG. 77 illustrates the method of remotely controlling TV 802. In order to check the status of TV 802, a specific signal is input from input device 210 (FIG. 1) or by the voice recognition system, and communication device 200 thereby sends a check request signal to sub-host SH via network NT. Sub-host SH, upon receiving the check request signal, checks the status of TV 802, i.e., the status of the power (ON/OFF), the channel, and the timer of TV 802 (S1), and returns the results to communication device 200 via network NT, which are displayed on LCD 201 (FIG. 1) (S2). Based on the control signal produced by communication device 200, which is transferred via network NT, sub-host SH turns the power on (or off) (S3a), selects the channel (S3b), and/or sets the timer of TV 802 (S3c). The sequence of S2 and S3 can be repeated (S4).

Figure 78:
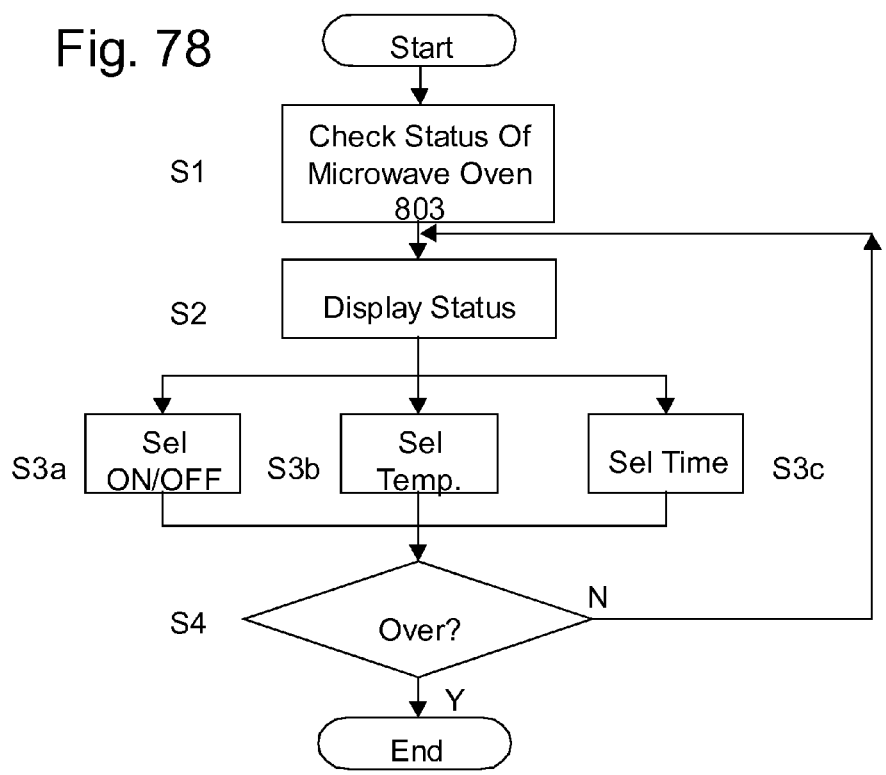
FIG. 78 is a flowchart illustrating an exemplary embodiment of the present invention.

FIG. 78 illustrates the method of remotely controlling microwave oven 803. In order to check the status of microwave oven 803, a specific signal is input from input device 210 (FIG. 1) or by the voice recognition system, and communication device 200 thereby sends a check request signal to sub-host SH via network NT. Sub-host SH, upon receiving the check request signal, checks the status of microwave oven 803, i.e., the status of the power (ON/OFF), the status of temperature, and the timer of microwave oven 803 (S1), and returns the results to communication device 200 via network NT, which are displayed on LCD 201 (FIG. 1) (S2). Based on the control signal produced by communication device 200, which is transferred via network NT, sub-host SH turns the power on (or off) (S3a), selects the temperature (S3b), and/or sets the timer of microwave oven 803 (S3c). The sequence of S2 and S3 can be repeated (S4).

Figure 79:
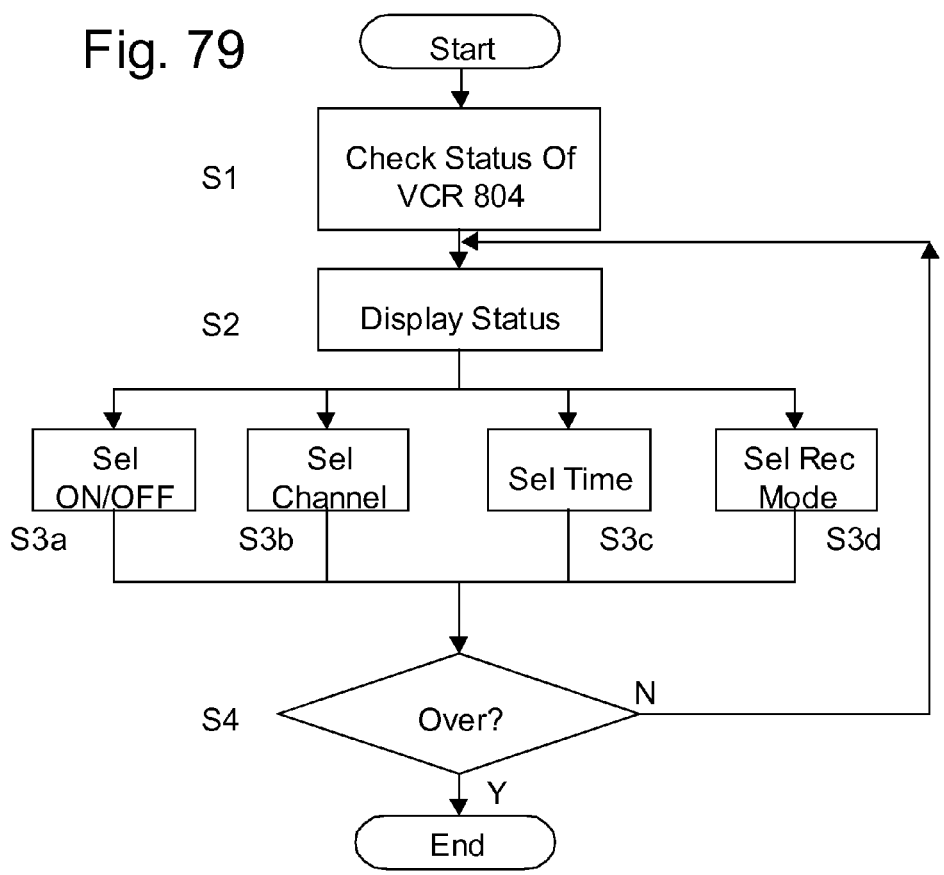
FIG. 79 is a flowchart illustrating an exemplary embodiment of the present invention.

FIG. 79 illustrates the method of remotely controlling VCR 804. In order to check the status of VCR 804, a specific signal is input from input device 210 (FIG. 1) or by the voice recognition system, and communication device 200 thereby sends a check request signal to sub-host SH via network NT. Sub-host SH, upon receiving the check request signal, checks the status of VCR 804, i.e., the status of the power (ON/OFF), the channel, the timer, and the status of the recording mode (e.g., one day, weekdays, or weekly) of VCR 804 (S1), and returns the results to communication device 200 via network NT, which are displayed on LCD 201 (FIG. 1) (S2). Based on the control signal produced by communication device 200, which is transferred via network NT, sub-host SH turns the power on (or off) (S3a), selects the TV channel (S3b), sets the timer (S3c), and/or selects the recording mode of VCR 804 (S3d). The sequence of S2 and S3 can be repeated (S4).

Figure 80:
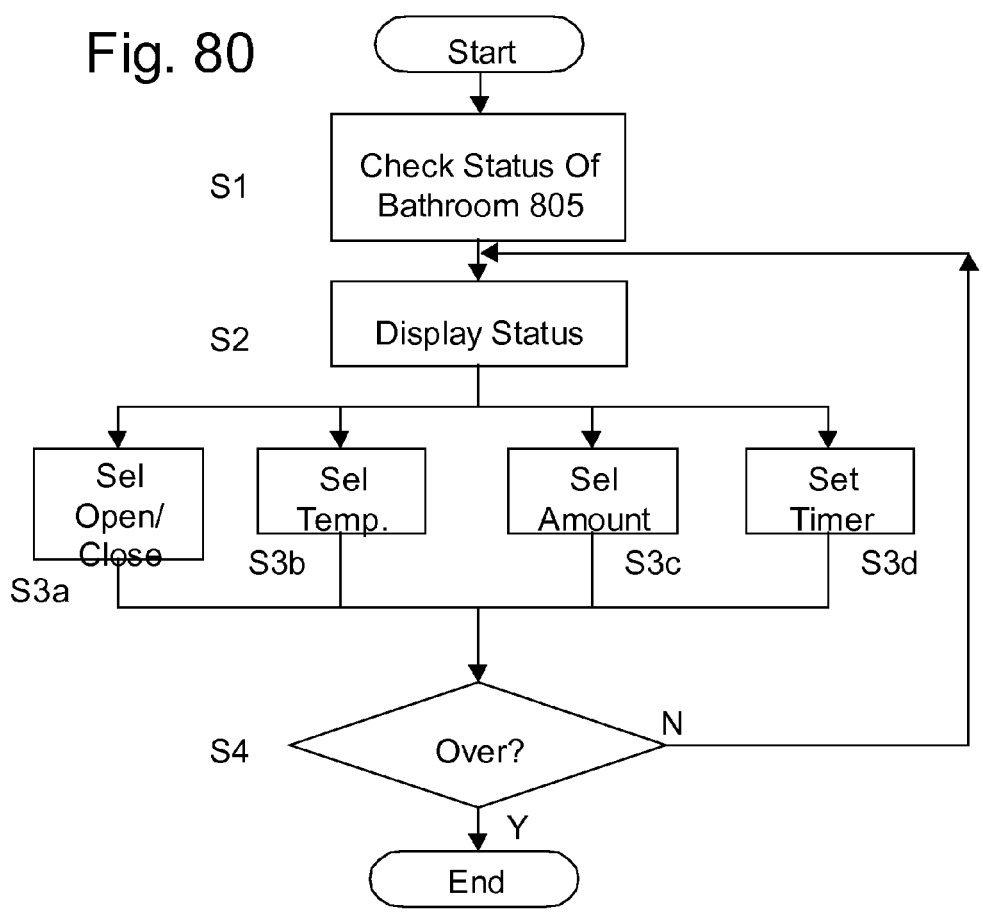
FIG. 80 is a flowchart illustrating an exemplary embodiment of the present invention.

FIG. 80 illustrates the method of remotely controlling bathroom 805. In order to check the status of bathroom 805, a specific signal is input from input device 210 (FIG. 1) or by the voice recognition system, and communication device 200 thereby sends a check request signal to sub-host SH via network NT. Sub-host SH, upon receiving the check request signal, checks the status of bathroom 805, i.e., the status of the bath plug (or the stopper for bathtub) (OPEN/CLOSE), the temperature, the amount of hot water, and the timer of bathroom 805 (S1), and returns the results to communication device 200 via network NT, which are displayed on LCD 201 (FIG. 1) (S2). Based on the control signal produced by communication device 200, which is transferred via network NT, sub-host SH opens (or closes) the bath plug (S3a), selects the temperature (S3b), selects the amount of hot water (S3c), and/or sets the timer of bathroom 805 (S3d). The sequence of S2 and S3 can be repeated (S4).

Figure 81:
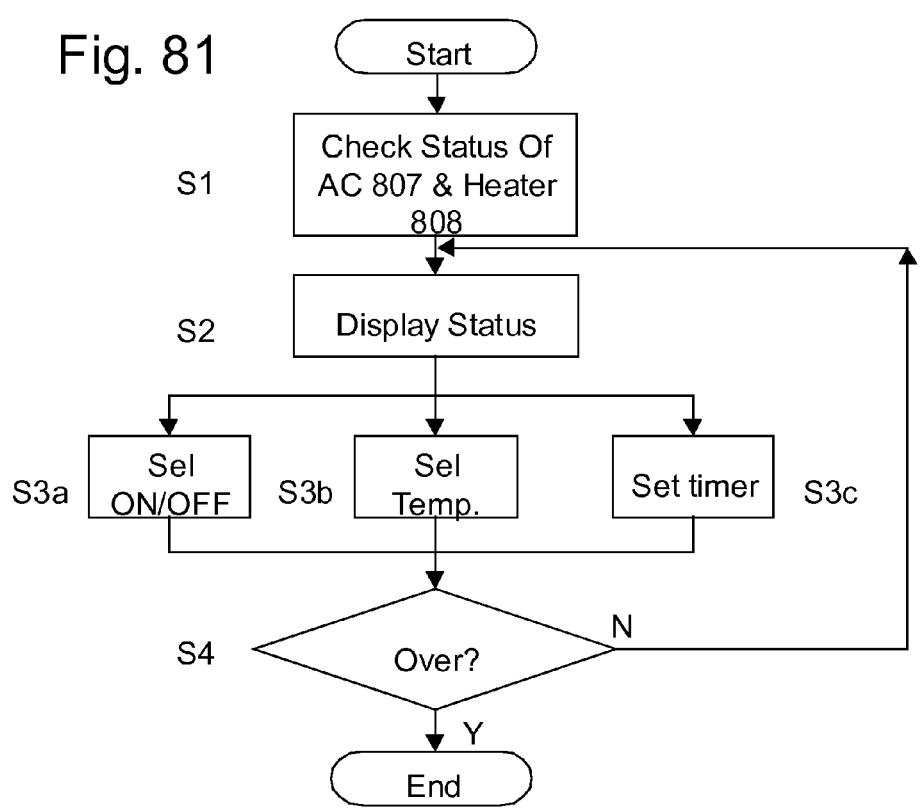
FIG. 81 is a flowchart illustrating an exemplary embodiment of the present invention.

FIG. 81 illustrates the method of remotely controlling AC 807 and heater 808. In order to check the status of AC 807 and/or heater 808 a specific signal is input from input device 210 (FIG. 1) or by the voice recognition system, and communication device 200 thereby sends a check request signal to sub-host SH via network NT. Sub-host SH, upon receiving the check request signal, checks the status of AC 807 and/or heater 808, i.e., the status of the power (ON/OFF), the status of temperature, and the timer of AC 807 and/or heater 808 (S1), and returns the results to communication device 200 via network NT, which are displayed on LCD 201 (FIG. 1) (S2). Based on the control signal produced by communication device 200, which is transferred via network NT, sub-host SH turns the power on (or off) (S3a), selects the temperature (S3b), and/or sets the timer of AC 807 and/or heater 808 (S3c). The sequence of S2 and S3 can be repeated (S4).

Figure 82:
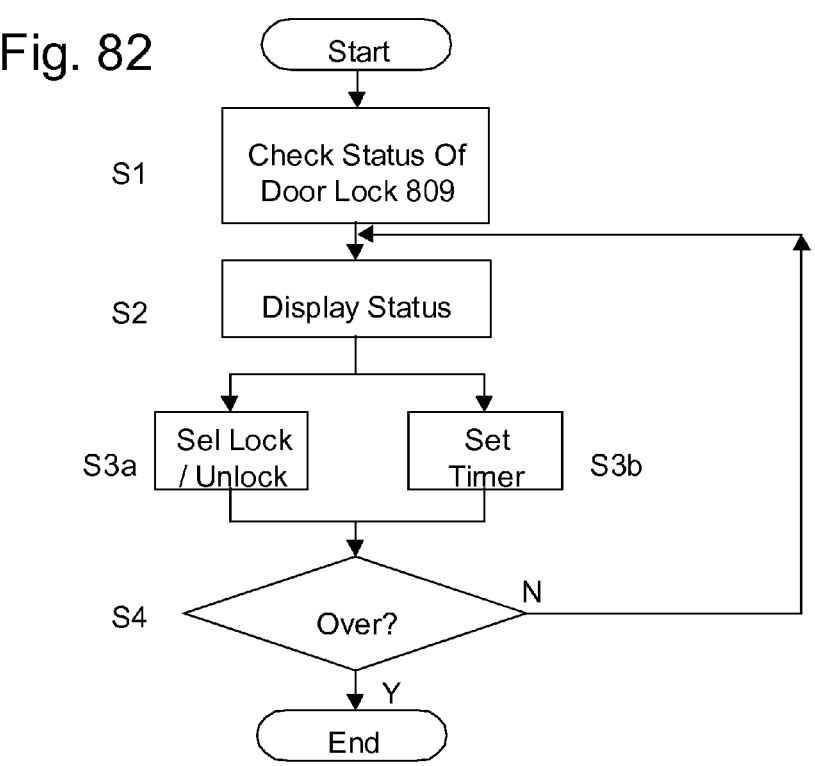
FIG. 82 is a flowchart illustrating an exemplary embodiment of the present invention.

FIG. 82 illustrates the method of remotely controlling door 809. In order to check the status of door 809 a specific signal is input from input device 210 (FIG. 1) or by the voice recognition system, and communication device 200 thereby sends a check request signal to sub-host SH via network NT. Sub-host SH, upon receiving the check request signal, checks the status of door 809, i.e., the status of the door lock (LOCKED/UNLOCKED), and the timer of door lock (S1), and returns the results to communication device 200 via network NT, which are displayed on LCD 201 (FIG. 1) (S2). Based on the control signal produced by communication device 200, which is transferred via network NT, sub-host SH locks (or unlocks) the door (S3a), and/or sets the timer of the door lock (S3b). The sequence of S2 and S3 can be repeated (S4).

Figure 83:
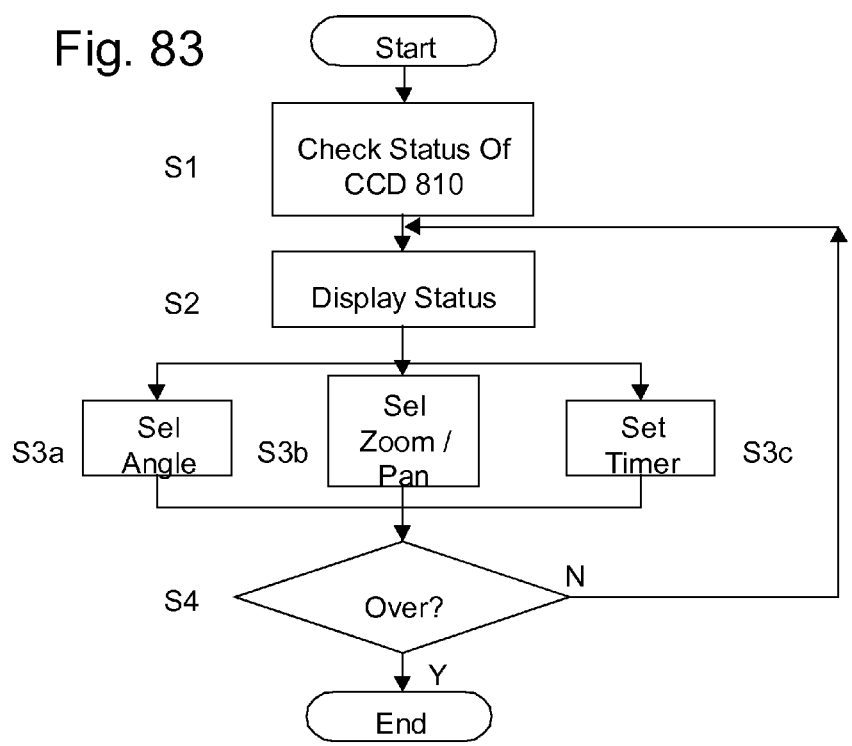
FIG. 83 is a flowchart illustrating an exemplary embodiment of the present invention.

FIG. 83 illustrates the method of CCD camera 810. In order to check the status of CCD camera 810 a specific signal is input from input device 210 (FIG. 1) or by the voice recognition system, and communication device 200 thereby sends a check request signal to sub-host SH via network NT. Sub-host SH, upon receiving the check request signal, checks the status of CCD camera 810, i.e., the status of the camera angle, zoom and pan, and the timer of CCD camera 810 (S1), and returns the results to communication device 200 via network NT, which are displayed on LCD 201 (FIG. 1) (S2). Based on the control signal produced by communication device 200, which is transferred via network NT, sub-host SH selects the camera angle (S3a), selects zoom or pan (S3b), and/or sets the timer of CCD camera 810 (S3c). The sequence of S2 and S3 can be repeated (S4).

Figure 84:
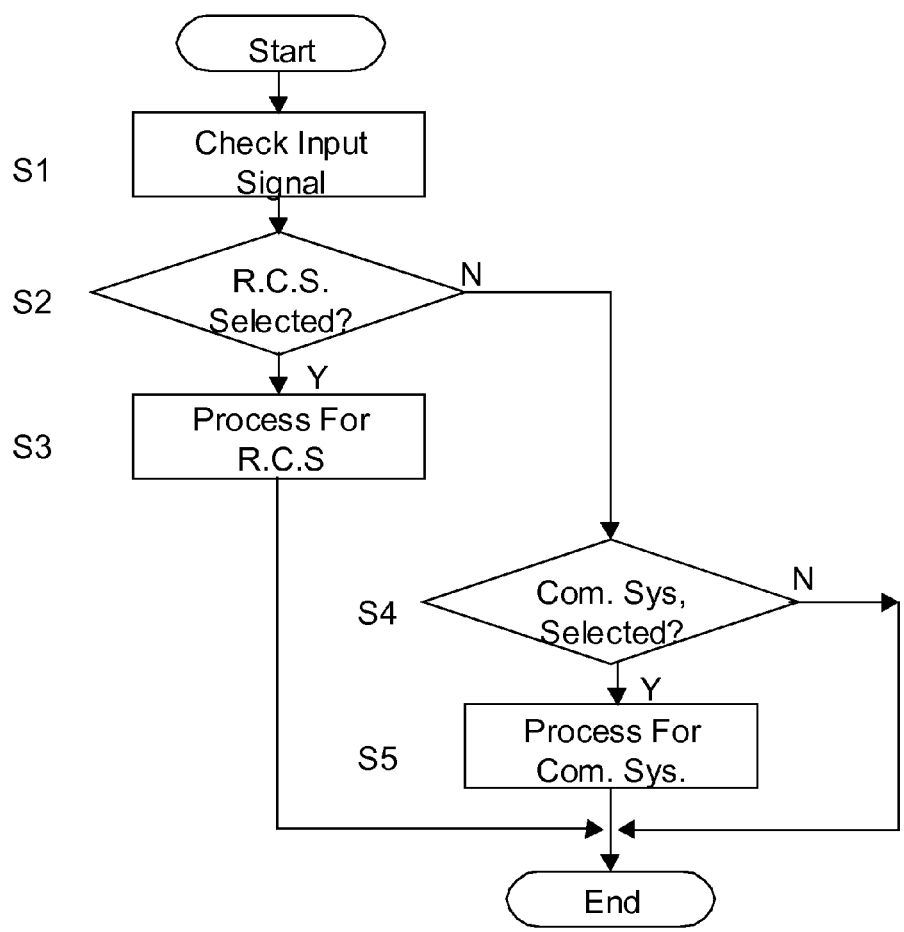
FIG. 84 is a flowchart illustrating an exemplary embodiment of the present invention.

FIG. 84 illustrates the overall operation of communication device 200 regarding the remote controlling system and communication system. CPU 211 (FIG. 1) periodically checks the input signal from input device 210 (FIG. 1) (S1). If the input signal indicates that the remote controlling system is selected (S2), CPU 211 initiates the process for the remote controlling system (S3). On the other hand, if the input signal indicates that the communication system is selected (S4), CPU 211 initiates the process for the communication system (S5).

Figure 85:
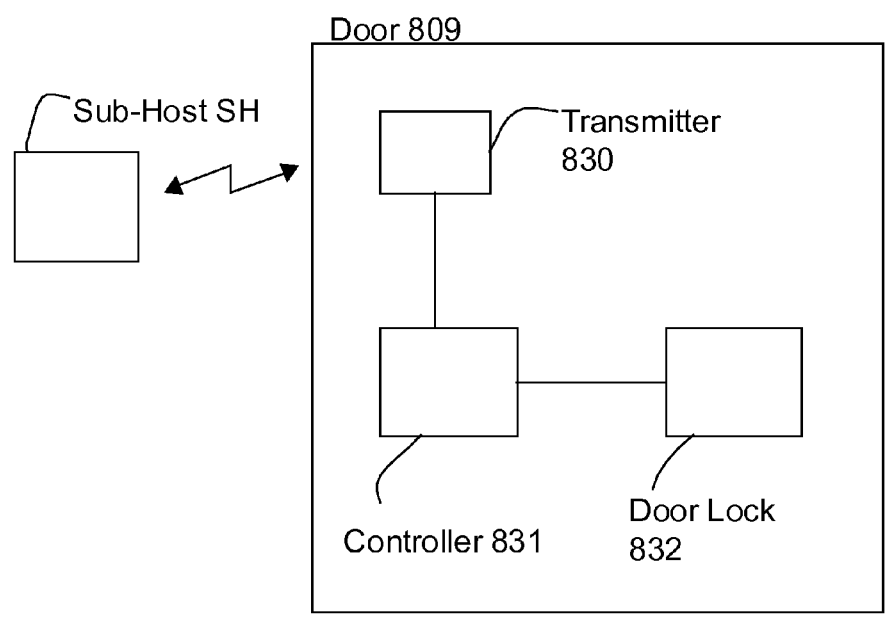
FIG. 85 is a block diagram illustrating an exemplary embodiment of the present invention.

FIG. 85 is a further description of the communication performed between sub-host SH and door 809 which is described in FIG. 82. When sub-host SH receives a check request signal as described in FIG. 82, sub-host SH sends a check status signal which is received by controller 831 via transmitter 830. Controller 831 checks the status of door lock 832 and sends back a response signal to sub-host SH via transmitter 830 in a wireless fashion indicating that door lock 832 is locked or unlocked. Upon receiving the response signal from controller 832, sub-host SH sends a result signal to communication device 200 in a wireless fashion as described in FIG. 82. When sub-host SH receives a control signal from communication device 200 in a wireless fashion as described in FIG. 82, it sends a door control signal which is received by controller 831 via transmitter 830. Controller 831 locks or unlocks door lock 832 in conformity with the door control signal. As another embodiment of the present invention, controller 831 may owe the task of both sub-host SH and itself and communicate directly with communication device 200 via network NT.

As another embodiment of the present invention each equipment, i.e., TV 802, microwave oven 803, VCR 804, bathroom 805, room light 806, AC 807, heater 808, door lock 809, and CCD camera 810, may carry a computer which directly administers its own equipment and directly communicates with communication device 200 via network NT instead of sub-host SH administering all pieces of equipment and communicate with communication device 200.

The above-mentioned invention is not limited to equipment installed in building 801 (FIG. 75), i.e., it is also applicable to the ones installed in all carriers in general, such as automobiles, airplanes, space shuttles, ships, motor cycles and trains.

<<Remote Controlling System—Summary>>

The foregoing inventions may be summarized as the following.

(1) A remote controlling system consisting of a wireless communication device, an administration device which is capable of communicating with said communication device in a wireless fashion, a plurality of equipment which are subject to control of said administration device wherein said communication device sends a controlling signal to said administration device, said administration device controls said plurality of equipment in conformity with said control signal thereby enabling the user of said remote controlling system to remotely control one or more of said equipment in a wireless fashion from any location he/she desires and enabling said user to remotely control one or more said equipment as well as using said remote controlling system to communicate with other devices.

(2) A communication device consisting of a remote controlling system which locks or unlocks a door, a wireless communication system, and an antenna wherein said antenna sends a door control signal which is necessary to lock or unlock said door, and said antenna also sends a communication signal which is necessary to operate said wireless communication system thereby enabling said communication device to be compact and also enabling the user of said communication device to lock or unlock said door as well as using said wireless communication system.

<<Auto Emergency Calling System>>

Figure 86:
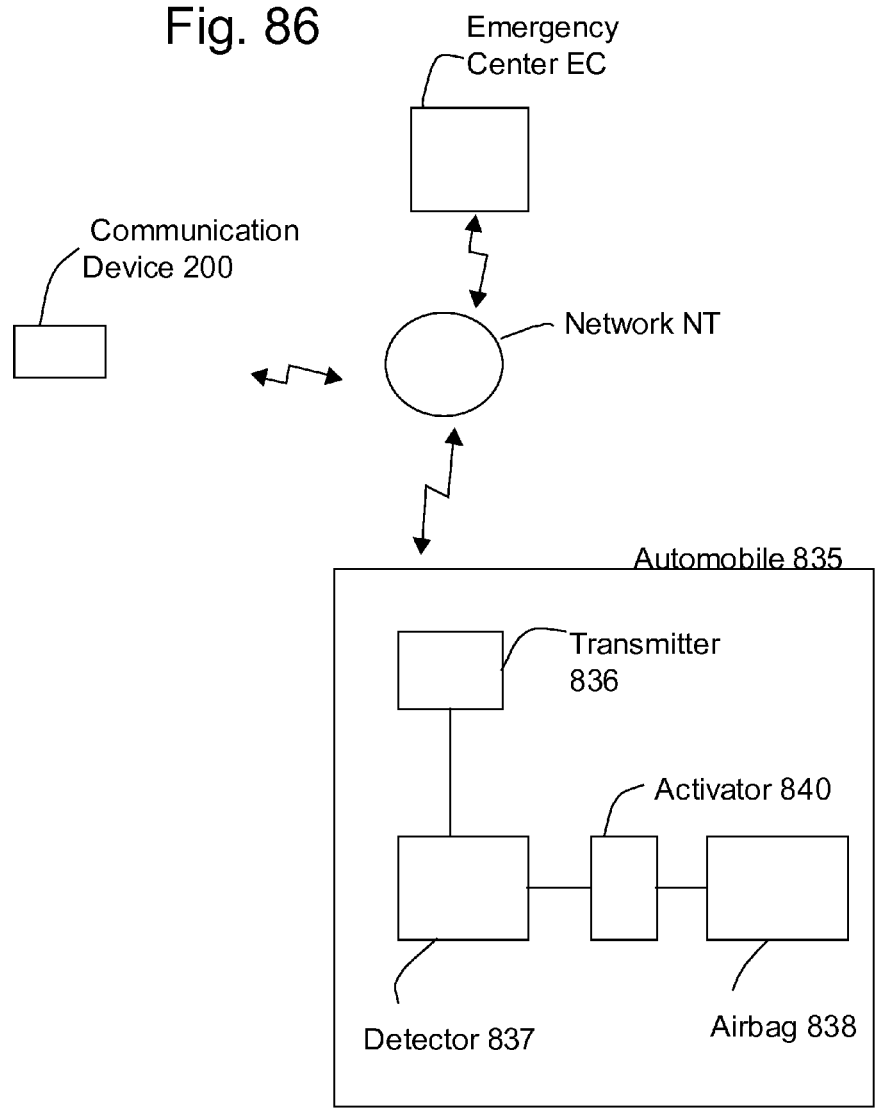
FIG. 86 is a simplified illustration illustrating an exemplary embodiment of the present invention.
Figure 87:
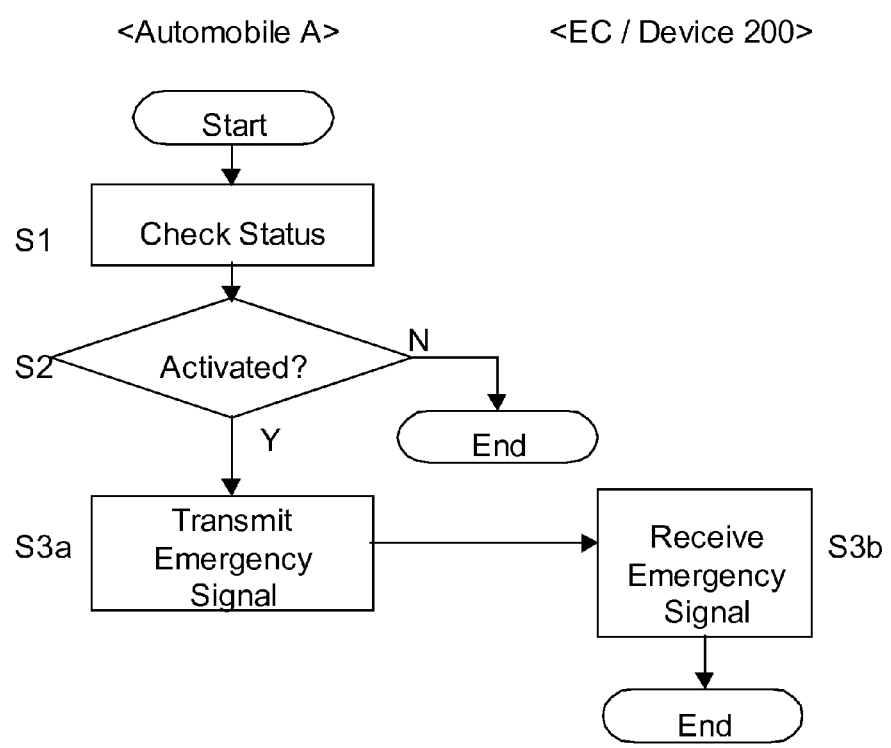
FIG. 87 is a flowchart illustrating an exemplary embodiment of the present invention.

FIGS. 86 and 87 illustrate the automatic emergency calling system utilizing communication device 200 (FIG. 1).

FIG. 86 illustrates the overall structure of the automatic emergency calling system. Communication device 200 is connected to network NT in a wireless fashion. Network NT may be the Internet or have the same or similar structure described in FIG. 2a, FIG. 2b and/or FIG. 2c. Network NT is connected to automobile 835 thereby enabling automobile 835 to communicate with communication device 200 in a wireless fashion. Emergency center EC, a host computer, is also connected to automobile 835 in a wireless fashion via network NT. Airbag 838 which prevents persons in automobile 835 from being physically injured or minimizes such injury in case traffic accidents occur is connected to activator 840 which activates airbag 838 when it detects an impact of more than certain level. Detector 837 sends an emergency signal via transmitter 836 in a wireless fashion when activator 840 is activated. The activation signal is sent to both emergency center EC and communication device 200. In lieu of airbag 838 any equipment may be used so long as such equipment prevents from or minimizes physical injuries of the persons in automobile 835.

FIG. 87 illustrates the overall process of the automatic emergency calling system. Detector 837 (FIG. 86) periodically checks the status of activator 840 (FIG. 86) (S1). If the activator 840 is activated (S2), detector 837 transmits an emergency signal via transmitter 836 in a wireless fashion (S3a). The emergency signal is transferred via network NT and received by emergency center EC (FIG. 86) and by communication device 200 in a wireless fashion (S3b).

As another embodiment of the present invention, the power of detector 837 (FIG. 86) may be usually turned off, and activator 840 (FIG. 86) may turn on the power of detector 837 by the activation of activator 840 thereby enabling detector 837 to send the emergency signal to both emergency center EC (FIG. 86) and to communication device 200 as described above.

This invention is also applicable to any carriers including airplanes, space shuttles, ships, motor cycles and trains.

<<Auto Emergency Calling System—Summary>>

The foregoing invention may be summarized as the following.

An automatic emergency calling system consisting of a carrier, a network and a host wherein said carrier consists of a physical injury prevention means which prevents persons in said carrier from being physically injured or minimizes such injury, a detector which sends an emergency signal, said detector sends said emergency signal when said physical injury prevention means is activated, said emergency signal is received by said host via said network thereby enabling to minimize the duration of time of said persons to be rescued.

Having thus described a presently preferred embodiment of the present invention, it will not be appreciated that the aspects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are

33 intended to be illustrative and are not in any sense limiting of the invention, more preferably defined in scope by the following claims.

The invention claimed is:

1. A communication device comprising:
   an input device to operate said communication device;
   a microphone to retrieve audio data;
   a speaker to output audio data;
   a display to display a plurality of images;
   a wireless communication system which sends and receives wireless signals;
   a voice communication mode implementer;
   a multiple & simultaneous speech-to-text mode implementer; and
   a current location indication implementer;
   wherein said voice communication mode implementer transfers a 1st voice data which indicates a 1st voice retrieved from said microphone via said wireless communication system and outputs a 2nd voice indicated by a 2nd voice data received via said wireless communication system from said speaker;
   wherein said multiple & simultaneous speech-to-text mode implementer converts said 1st voice data to a 1st text data and said 2nd voice data to a 2nd text data, and said 1st text data and said 2nd text data are displayed on said display, wherein said 1st text data includes alphanumeric data indicated by said 1st voice and said 2nd text data includes alphanumeric data indicated by said 2nd voice; and
   wherein said current location indication implementer indicates the current geographic location of said communication device on said display.

2. The communication device of claim 1, wherein said 1st text data is displayed with a 1st color and said 2nd text data is displayed with a 2nd color on said display.

3. The communication device of claim 1, wherein said 1st text data is displayed with a 1st font and said 2nd text data is displayed with a 2nd font on said display.

4. The communication device of claim 1, wherein a 1st tag and a 2nd tag are displayed on said display, wherein said 1st tag is an identifier of said 1st text data and said 2nd tag is an identifier of said 2nd text data.

5. The communication device of claim 1, wherein a 1st tag and a 2nd tag are displayed on said display, wherein said 1st tag is an identifier of said 1st text data and said 2nd tag is an identifier of said 2nd text data, wherein said 2nd tag indicates a name of a person.

6. The communication device of claim 1, wherein a 1st tag is displayed adjacent to said 1st text data and a 2nd tag is displayed adjacent to said 2nd text data, wherein said 1st tag indicates a caller and said 2nd tag indicates a callee.

7. A communication system which includes a communication device comprising:
   an input device to operate said communication device;
   a microphone to retrieve audio data;
   a speaker to output audio data;
   a display to display a plurality of images;
   a wireless communication system which sends and receives wireless signals;
   a voice communication mode implementer;
   a multiple & simultaneous speech-to-text mode implementer; and
   a current location indication implementer;
   wherein said voice communication mode implementer transfers a 1st voice data which indicates a 1st voice retrieved from said microphone via said wireless communication system and outputs a 2nd voice indicated by

34 a 2nd voice data received via said wireless communication system from said speaker;
   wherein said multiple & simultaneous speech-to-text mode implementer converts said 1st voice data to a 1st text data and said 2nd voice data to a 2nd text data, and said 1st text data and said 2nd text data are displayed on said display, wherein said 1st text data includes alphanumeric data indicated by said 1st voice and said 2nd text data includes alphanumeric data indicated by said 2nd voice; and
   wherein said current location indication implementer indicates the current geographic location of said communication device on said display.

8. The communication system of claim 7, wherein said 1st text data is displayed with a 1st color and said 2nd text data is displayed with a 2nd color on said display.

9. The communication system of claim 7, wherein said 1st text data is displayed with a 1st font and said 2nd text data is displayed with a 2nd font on said display.

10. The communication system of claim 7, wherein a 1st tag and a 2nd tag are displayed on said display, wherein said 1st tag is an identifier of said 1st text data and said 2nd tag is an identifier of said 2nd text data.

11. The communication system of claim 7, wherein a 1st tag and a 2nd tag are displayed on said display, wherein said 1st tag is an identifier of said 1st text data and said 2nd tag is an identifier of said 2nd text data, wherein said 2nd tag indicates a name of a person.

12. The communication system of claim 7, wherein a 1st tag is displayed adjacent to said 1st text data and a 2nd tag is displayed adjacent to said 2nd text data, wherein said 1st tag indicates a caller and said 2nd tag indicates a callee.

13. A method for a communication device which includes an input device, a microphone, a speaker, a display, and a wireless communication system, said method comprising:
   a voice communication mode implementing step, wherein a 1st voice data which indicates a 1st voice retrieved from said microphone is transferred via said wireless communication system and a 2nd voice indicated by a 2nd voice data received via said wireless communication system is output from said speaker when said voice communication mode implementing step is implemented;
   a multiple & simultaneous speech-to-text mode implementing step, wherein said 1st voice data is converted to a 1st text data and said 2nd voice data is converted to a 2nd text data, and said 1st text data and said 2nd text data are displayed on said display, wherein said 1st text data includes alphanumeric data indicated by said 1st voice and said 2nd text data includes alphanumeric data indicated by said 2nd voice, when said multiple & simultaneous speech-to-text mode implementing step is implemented; and
   a current location identifying step, wherein the current geographic location of said communication device is identified when said current location identifying step is implemented.

14. The method of claim 13, wherein said 1st text data is displayed with a 1st color and said 2nd text data is displayed with a 2nd color on said display.

15. The method of claim 13, wherein said 1st text data is displayed with a 1st font and said 2nd text data is displayed with a 2nd font on said display.

16. The method of claim 13, wherein a 1st tag and a 2nd tag are displayed on said display, wherein said 1st tag is an identifier of said 1st text data and said 2nd tag is an identifier of said 2nd text data.

17. The method of claim 13, wherein a 1st tag and a 2nd tag are displayed on said display, wherein said 1st tag is an identifier of said 1st text data and said 2nd tag is an identifier of said 2nd text data, wherein said 2nd tag indicates a name of a person.

18. The method of claim 13, wherein a 1st tag is displayed adjacent to said 1st text data and a 2nd tag is displayed adjacent to said 2nd text data, wherein said 1st tag indicates a caller and said 2nd tag indicates a callee.

* * * * *